US011700147B2

(12) United States Patent
Barco et al.

(10) Patent No.: US 11,700,147 B2
(45) Date of Patent: Jul. 11, 2023

(54) COMMISSIONING LOAD CONTROL SYSTEMS

(71) Applicant: Lutron Technology Company LLC, Coopersburg, PA (US)

(72) Inventors: Kyle Thomas Barco, Bethlehem, PA (US); Bryan Robert Barnes, Lansdale, PA (US); Erica L. Clymer, Northampton, PA (US); Brian Michael Courtney, Bethlehem, PA (US); Jordan H. Crafts, Bethlehem, PA (US); William Bryce Fricke, Bethlehem, PA (US); Galen Edgar Knode, Macungie, PA (US); Sanjeev Kumar, Harleysville, PA (US); Jonathan T. Lenz, Waltham, MA (US); Stephen M. Ludwig, Jr., Coopersburg, PA (US); Sandeep Mudabail Raghuram, Breinigsville, PA (US); Richard M. Walsh, III, Bethlehem, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

(21) Appl. No.: 17/717,221

(22) Filed: Apr. 11, 2022

(65) Prior Publication Data

US 2022/0239529 A1  Jul. 28, 2022

Related U.S. Application Data

(60) Continuation of application No. 16/902,945, filed on Jun. 16, 2020, now Pat. No. 11,303,471, which is a
(Continued)

(51) Int. Cl.
*H04L 12/46* (2006.01)
*H05B 47/19* (2020.01)
(Continued)

(52) U.S. Cl.
CPC .......... *H04L 12/4625* (2013.01); *G05B 15/02* (2013.01); *H02J 13/00* (2013.01); *H05B 47/19* (2020.01); *G05B 2219/23312* (2013.01)

(58) Field of Classification Search
CPC ............... H04L 12/4625; G05B 15/02; G05B 2219/23312; G05B 19/4185;
(Continued)

(56) References Cited

U.S. PATENT DOCUMENTS 5,248,919 A   9/1993 Hanna et al.
6,791,467 B1  9/2004 Ben-Ze'ev et al.
(Continued)

*Primary Examiner* — Yasser A Abdelaziez
(74) *Attorney, Agent, or Firm* — Michael Czarnecki; Glen Farbanish; Philip Smith

(57) ABSTRACT

A load control system may include control devices for controlling power provided to an electrical load. The control devices may include a control-source device and a control-target device. The control-target device may control the power provided to the electrical load based on digital messages received from the control-source device. The control devices may include a load control discovery device capable of sending discovery messages configured to discover control devices within a location. The discovered control devices may be organized by signal strength and may be provided to a network device to enable association of the discovered control devices within a location. The discovery messages may be transmitted within an established discovery range. The discovery range may be adjusted to discover different control devices. Different control devices may be identified as the load control discovery device for discovering different control devices.

24 Claims, 26 Drawing Sheets

Related U.S. Application Data division of application No. 16/457,126, filed on Jun. 28, 2019, now Pat. No. 10,705,495, which is a continuation of application No. 15/338,029, filed on Oct. 28, 2016, now Pat. No. 10,379,505.

(60) Provisional application No. 62/326,466, filed on Apr. 22, 2016, provisional application No. 62/279,409, filed on Jan. 15, 2016, provisional application No. 62/249,117, filed on Oct. 30, 2015.

(51) Int. Cl.
*G05B 15/02* (2006.01)
*H02J 13/00* (2006.01)

(58) Field of Classification Search
CPC ......... G05B 19/4186; G05B 2219/2642; H02J 13/00; H05B 47/19; H05B 47/10; H05B 47/175
See application file for complete search history.

(56) References Cited

U.S. PATENT DOCUMENTS

| | | |
|---|---|---|
| 7,363,028 B2 | 4/2008 | De et al. |
| 7,656,308 B2 | 2/2010 | Atkins |
| 8,009,042 B2 | 8/2011 | Steiner et al. |
| 8,199,010 B2 | 6/2012 | Sloan et al. |
| 8,228,184 B2 | 7/2012 | Blakeley et al. |
| 8,410,706 B2 | 4/2013 | Steiner et al. |
| 8,461,116 B2 | 5/2013 | Steiner et al. |
| 8,471,779 B2 | 6/2013 | Mosebrook |
| 9,413,171 B2 | 8/2016 | Neyhart |
| 9,585,226 B2 | 2/2017 | Gajurel et al. |
| 9,801,263 B2 | 10/2017 | Siegel et al. |
| 2011/0140864 A1 | 6/2011 | Bucci |
| 2012/0080944 A1* | 4/2012 | Recker ............... H05B 47/16 307/25 |
| 2012/0082062 A1* | 4/2012 | Mccormack ......... H04W 48/14 370/254 |
| 2012/0306621 A1 | 12/2012 | Muthu |
| 2013/0030589 A1 | 1/2013 | Pessina et al. |
| 2014/0001977 A1 | 1/2014 | Zaharchuk et al. |
| 2014/0132475 A1 | 5/2014 | Bhutani et al. |
| 2014/0265568 A1 | 9/2014 | Crafts et al. |
| 2014/0265870 A1 | 9/2014 | Walma et al. |
| 2015/0137699 A1 | 5/2015 | Killo et al. |
| 2015/0178421 A1 | 6/2015 | Borrelli et al. |
| 2015/0223152 A1 | 8/2015 | Van Leeuwen |
| 2016/0150390 A1* | 5/2016 | Chen ..................... H04W 8/24 370/328 |

* cited by examiner

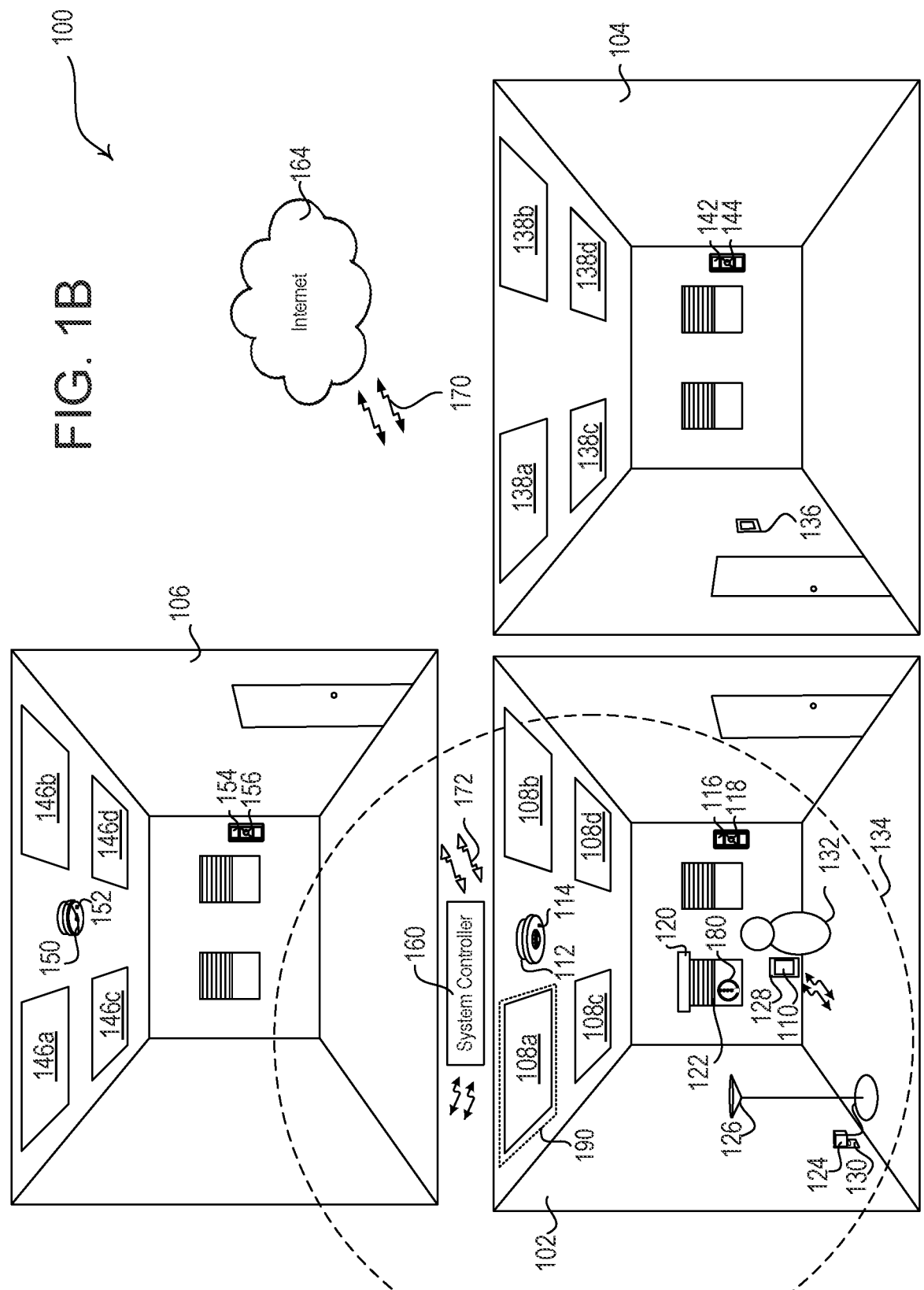

FIG. 8A

Areas

+ Create an area ← 802

An area is a room or space in your building, i.e. Conference Room, Office, Hallway, Atrium, Lobby, etc.

< Areas          Next

Please give your area a descriptive name.

Area 1

A good, descriptive name will help you and others identify this area later.

810

812

[QWERTY keyboard]

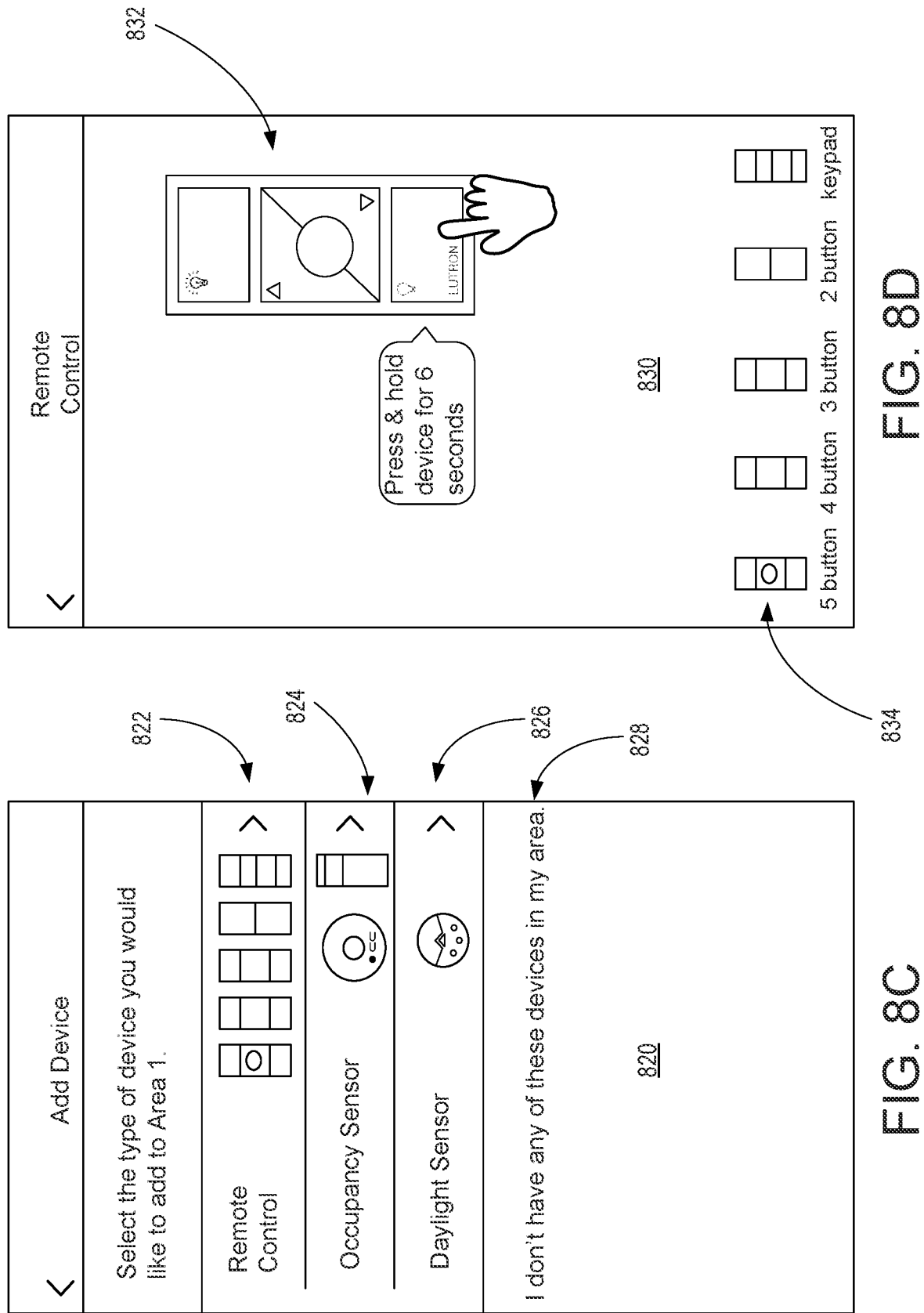

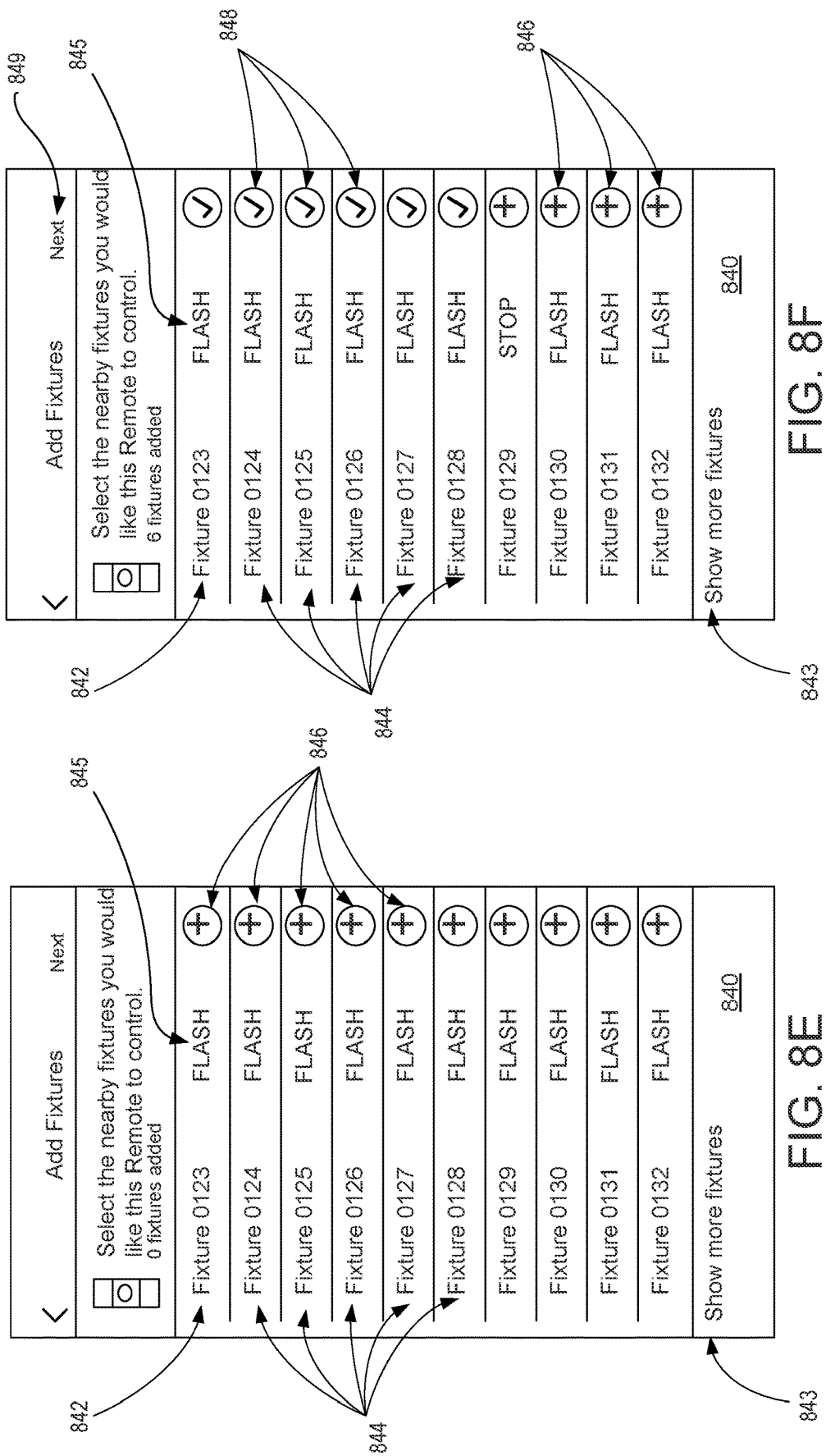

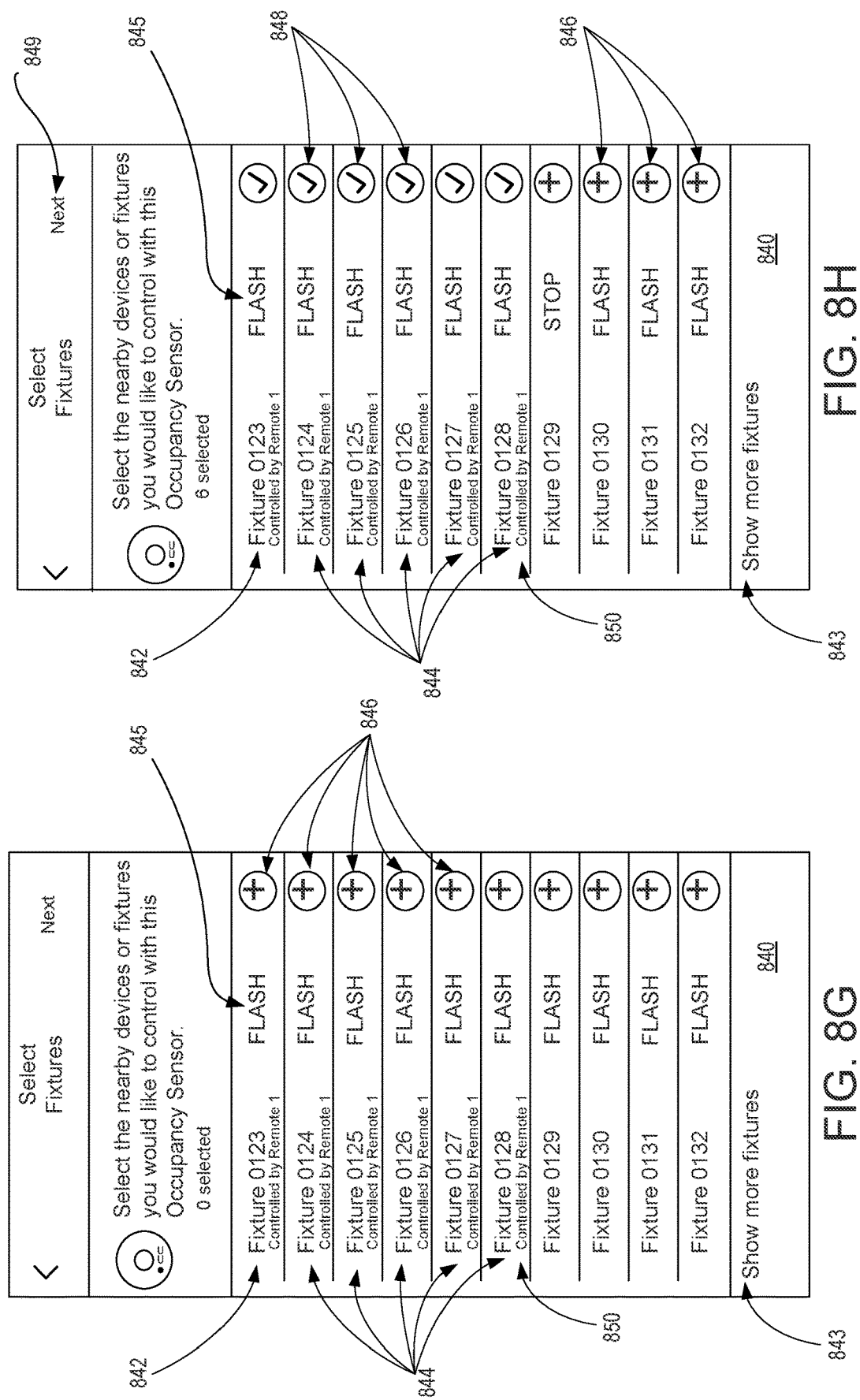

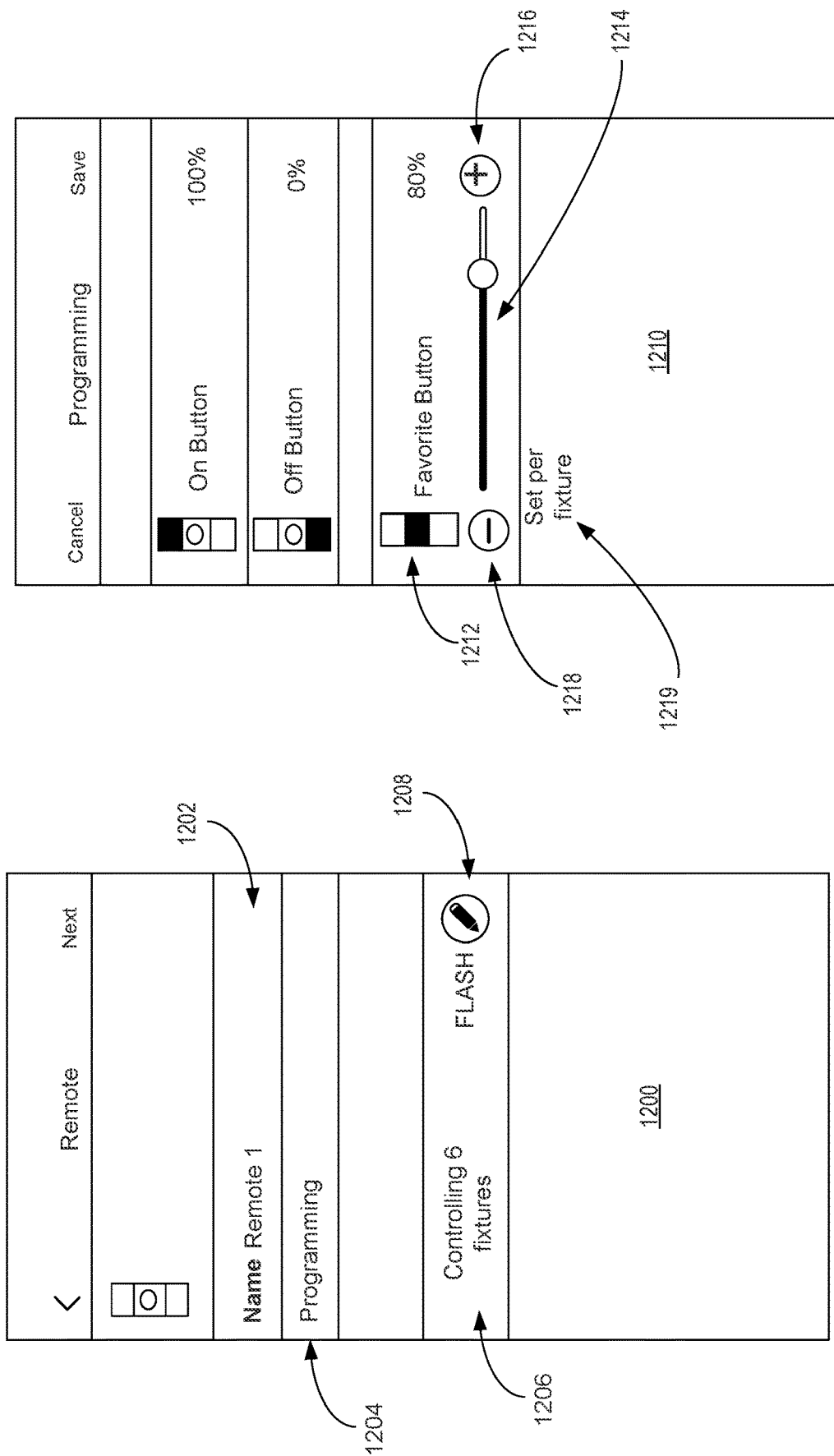

COMMISSIONING LOAD CONTROL SYSTEMS

CROSS-REFERENCE TO RELATED APPLICATIONS

This application is a continuation of U.S. patent application Ser. No. 16/902,945 filed Jun. 16, 2020; which is a divisional of U.S. patent application Ser. No. 16/457,126, filed Jun. 28, 2019, now U.S. Pat. No. 10,705,495, issued Jul. 7, 2020; which is a continuation of U.S. patent application Ser. No. 15/338,029, filed Oct. 28, 2016, now U.S. Pat. No. 10,379,505 issued Aug. 13, 2019; which claims the benefit of U.S. Provisional Patent Application No. 62/249,117, filed Oct. 30, 2015; U.S. Provisional Patent Application No. 62/279,409, filed Jan. 15, 2016; and U.S. Provisional Patent Application No. 62/326,466, filed Apr. 22, 2016, which are incorporated by reference herein as if fully set forth.

BACKGROUND

A user environment, such as a residence or an office building for example, may be configured using various types of load control systems. A lighting control system may be used to control the lighting loads in the user environment. A motorized window treatment control system may be used to control the natural light provided to the user environment. A heating, ventilation, and air-conditioning (HVAC) system may be used to control the temperature in the user environment.

Each load control system may include various control devices, including input devices and load control devices. The load control devices may receive digital messages, which may include load control instructions, for controlling an electrical load from one or more of the input devices. The load control devices may be capable of directly controlling an electrical load. The input devices may be capable of indirectly controlling the electrical load via the load control device.

Examples of load control devices may include lighting control devices (e.g., a dimmer switch, an electronic switch, a ballast, or a light-emitting diode (LED) driver), a motorized window treatment, a temperature control device (e.g., a thermostat), an AC plug-in load control device, and/or the like. Examples of input devices may include remote control devices, occupancy sensors, daylight sensors, temperature sensors, and/or the like.

To enable a load control device to recognize instructions received from an input device, the load control system may be commissioned, such that the load control device may recognize the digital messages received from the input device. As part of the commissioning of the load control system, the load control devices and the input devices may be configured such that the devices are associated with one another for recognizing messages communicated between associated devices and performing load control based on such messages.

Some prior art commissioning procedures allow for advanced features during normal operation of the load control system (e.g., demand response, whole building control, energy reporting, etc.). However, these procedures can be very time consuming and complicated, and require highly-trained commissioning agents to complete the commissioning procedure. Before the commissioning procedure may be initiated, a database defining the control devices, the relationships (e.g., associations) between the control devices, and the operation of the control devices of the load control system must be created using, for example, a computer. Accordingly, a highly-trained worker must identify each of the control devices to be installed in the building for performing load control, generate the associations between the control devices, and program the operation of the control devices using the computer to generate the database prior to the commissioning procedure. Then during the commissioning procedure, one or more highly-trained commissioning agents must download the database to the control devices of the load control system and then map the programming in the database to the physical control devices installed in the building, which can be a very time consuming and expensive task.

Other prior art commissioning procedures can be less complicated, can be completed in less time, and do not require highly-skilled commissioning agent. The load control systems that may be commissioned using such procedures, however, lack the advanced features provided by the more complicated load control systems described above. In addition, the less-complicated commissioning procedures may require a contractor who is configuring the load control system to press a button on the load control device (which may be located in the ceiling or some other remote location) and a corresponding input device (e.g., a remote control device) to cause the two devices to associate with one another for enabling load control. During normal operation of these load control systems, the load control devices may receive messages from associated input devices and perform a limited number of predefined commands according to the predefined messages that may be transmitted from the input devices. Though associating the devices may be completed more quickly in such a commissioning procedure, the ultimate control is less advanced. The association of a large group of devices by performing a button press on each device can also be time consuming, as the contractor may have to climb a ladder and press a button on devices in the ceiling (or other locations in the room, such as the walls) multiple times.

The commissioning procedures described above require knowledge of each of the devices being associated in a load control system. Some of the above commissioning procedures also require physically actuating buttons on each input device and/or knowledge of the location of each of the control devices being associated in the load control system. Identifying the location of each of the control devices in a load control system may be particularly difficult, as the location of the control devices are generally installed prior to assigning a communication address for communicating load control instructions to the devices. Such difficulties may cause individuals commissioning the system to spend a lot of time searching for particular devices to be configured and, once the devices have been found, performing lengthy configuration methods to enable the devices to control electrical loads in a location. Accordingly, current commissioning procedures of load control systems may be time consuming and inconvenient.

SUMMARY

Commissioning procedures may be implemented that use a network device (e.g., mobile computing device) to configure a load control system efficiently and allow for advanced features to be configured. The use of network device may eliminate, or at least limit, the pressing of a button on load control devices (e.g., that maybe located in hard to reach places). Even though the commissioning procedures may use a network device, the configuration procedure may provide instructions and be very intuitive to those individuals who are implementing the commissioning procedures (e.g., contractors who may have performed prior commissioning procedures).

The commissioning procedures described herein may also aid in the discovery of control devices in the load control system. The discovery of the control devices in the system may be performed using control devices that are already a part of the load control system. For example, discovery of the load control devices (e.g., load control devices in lighting fixtures and/or in the ceiling) may be initiated by actuating a button on an input device (e.g., a remote control device), that is located near the load control devices to be discovered and may be used to control the load control devices during normal operation of the load control system. The discovered load control devices may be displayed on a visual display of the network device (e.g., in an organized list or dataset) and the contractor may select load control devices to be associated with the selected input device from the list displayed on the network device. The remote control device may be located within easy reach of the contractor, and the contractor may not need to climb a ladder to complete the discovery and association of the control devices.

The commissioning procedures described herein may allow for advanced features without the time-consuming and advanced steps of the prior art complicated commissioning procedures. The input devices and load control devices that are discovered may be organized into areas on-the-fly while the contractor is executing the commissioning procedure. The defined areas that each include input devices and load control devices may be used by the load control system during normal operation to provide the advanced features. The commissioning procedures described herein may also allow for flexibility and scalability in the design of the load control system since additional features and programming may be easily added and/or adjusted at a later date (e.g., after the completion of the commissioning procedure).

The commissioning procedure may be use to configure a load control system that may include control devices for controlling an amount of power provided to an electrical load. The control devices may include a control-source device and/or a control-target device. The control-target device may be capable of controlling the amount of power provided to the electrical load based on digital messages received from the control-source device. The control-source devices and/or control-target devices may also be implemented to assist in discovery of other control devices in the load control system, which may avoid the incorporation of additional devices into the load control system.

The digital messages may include load control instructions or another indication that causes the control-target device to determine load control instructions for controlling an electrical load. The load control system may also include a system controller for monitoring the operation of the control-source devices and/or the control-target devices and transmitting digital messages including global commands (e.g., demand response commands, on commands, off commands, timeclock event commands, etc.) to the control-target devices and/or the control-source devices.

The load control system may be commissioned to enable control of the electrical loads based on the commands. For example, the load control devices may be associated with one another and stored in association information that may be used to communicate digital commands for controlling electrical devices in the system. The association information may include the unique identifier of one or more of the associated devices. The load control system may include a load control discovery device for sending discovery messages to control devices when the control devices are within an established discovery range associated with the load control discovery device. The load control discovery device may be a control-target device and/or a control-source device installed in the system for performing load control. The load control discovery device may be used to discover control-target devices and/or control-source devices. The load control discovery device may be a dedicated load control discovery device. The load control discovery device may broadcast a message (e.g., a discovery message) within the established discovery range. Control-target devices and/or control-source devices may be associated with one another based on the broadcasted message.

A system controller may receive acknowledgement messages from the control devices that receive the messages (e.g., the discovery messages). The acknowledgement messages may include an identification of the control devices that receive the messages (e.g., the discovery messages) and/or the signal strengths (e.g., received signal strength indication) at which the message (e.g., the discovery message) is received at the control devices. The acknowledgement messages may be received in response to a query from the system controller after the system controller has identified that the message (e.g., the discovery message) has been broadcasted. The signal strengths may be automatically transmitted from the control devices upon receipt of the message (e.g., the discovery message). The system controller and/or the network device may filter the discovered devices according to defined discovery criteria.

The system controller may define an organized dataset of the discovered control devices. The dataset may be organized according to the signal strengths at which the discovered control devices received the discovery message. The dataset may be organized according to the signal strengths at which the load control discovery device sends the discovery messages. Discovered control devices may be added to and/or removed from the dataset. For example, discovered control devices may be added to and/or removed from the dataset by increasing and/or decreasing the transmission power and/or a threshold value (e.g., the reception power threshold value) of the message (e.g., the discovery message). Other discovery criteria may be used to filter the discovered devices and organize a subset of the control devices in the dataset. The system controller may send the organized dataset to a network device. The network device may generate a user interface that includes the organized dataset, and/or a portion of the organized dataset. The user interface may allow a user to assign a control device as a load control discovery device, associate and/or disassociate the control device with another control device, associate and/or disassociate the control device with a location, and/or to identify the control device.

The discovery message may include an indication of a device type that may respond to the discovery message. The discovery message may include a device identifier (e.g., the identifier of the load control discovery device). The control devices may identify the device identifier to trigger a message that identifies the signal strength at which the discovery message was received. The discovery message may be transmitted from a dedicated discovery device. A dedicated discovery device may be a device that may be used for sending discovery messages to control devices during a discovery mode (e.g., a dedicated discovery mode). The dedicated discovery mode may be enabled for a period of time, may be enabled/disabled upon receipt of an indication by a user, and/or may be configured as a static mode on the dedicated discovery device. The discovery message may be a message used for one or more activities. For example, the discovery message may be a message that is used for associating control devices, controlling control devices, and/or discovering control devices.

The discovery range in which the discovery message may be sent may be established based on a transmission power, a signal strength at which the discovery message may be received, and/or a threshold value (e.g., the reception power threshold value). For example, the discovery range in which the discovery message may be sent may be established based on a transmission power, a received signal strength, and/or a threshold value indicated at the network device and/or stored at the system controller. The discovery range may be partitioned according to one or more discovery zones. The discovery zones may be identified by the transmission power, the received signal strength, and/or the threshold value (e.g., the reception power threshold value). The discovery messages may be transmitted within the discovery range and may identify a discovery zone within which control devices may respond. The discovery zone may be identified by a received signal strength for which control devices may respond if the discovery message is received at the identified signal strength. The discovery range may be adjustable (e.g., incrementally adjustable). For example, the discovery range may be adjusted at the network device and/or at the system controller. The established discovery range may be determined by disregarding information received from a control device outside of the established discovery range.

Different control devices may be identified as load control discovery devices. The control devices may have different transmission powers for establishing different discovery ranges. The control devices may be in different locations for discovering different control devices within the discovery ranges. The established discovery range for discovering and/or associating control devices may correspond to the transmission power of the system controller. The system controller may adjust a transmission power to discover the control devices within the established discovery range.

The control-source devices may be associated with the control-target devices during a configuration procedure, such that the control-target devices are responsive to the associated control-source devices during normal operation. The configuration procedure may be executed using a network device having a visual display for associating the control-source devices and control-target devices. The control-source devices may be associated with the control-target devices on an area-by-area basis using an area configuration procedure. For example, the area configuration procedure may be repeated for each load control area (e.g., a load control environment and/or a room) of a building. Each control-source device located in the area may be associated (e.g., individually associated) with the control-target devices that are to be responsive to the control-source device (e.g., by stepping through each control-source device in the area one-by-one). Each control-source device may be associated with the control-target devices in the area. The control-source devices may be associated with the control-target devices of an area in any order. For example, a first control-source device may be first associated with one or more control-target devices and then a second control-source device may be associated with one or more control-target devices, or vice versa.

A control-source device may be selected to be associated with one or more control-target devices in an area by actuating a button on the control-source device. The network device may display a list of control-target devices that are discovered to be with a discovery range of the control-source device on which the button was actuated. The network device and/or the system controller may associate the control-source device with one or more of the control-target devices upon selection of the control-target devices from the list displayed on the network device.

The network device may store association information of the control-source devices and control-target devices in each area and may transmit the association information to the system controller, which may store the association information. The system controller and/or the network device may build and store a control-source device list of the control-source devices in each area and a control-target device list of the control-target devices associated with the control-source devices in each area. The system controller and/or the network device may build the lists of control-source devices and control-target devices as the control-source devices are associated with the control-target devices as part of the area configuration procedure.

BRIEF DESCRIPTION OF THE DRAWINGS

FIGS. 1A-1C are diagrams depicting perspective views of example environments for associating control devices.

FIGS. 8A-8J illustrate example GUIs that may be displayed by a visual display of a network device during an area configuration procedure.

FIGS. 12A-12C illustrate example GUIs that may be displayed by a visual display of a network device for configuring a control device of area.

DETAILED DESCRIPTION

Figure 1A:
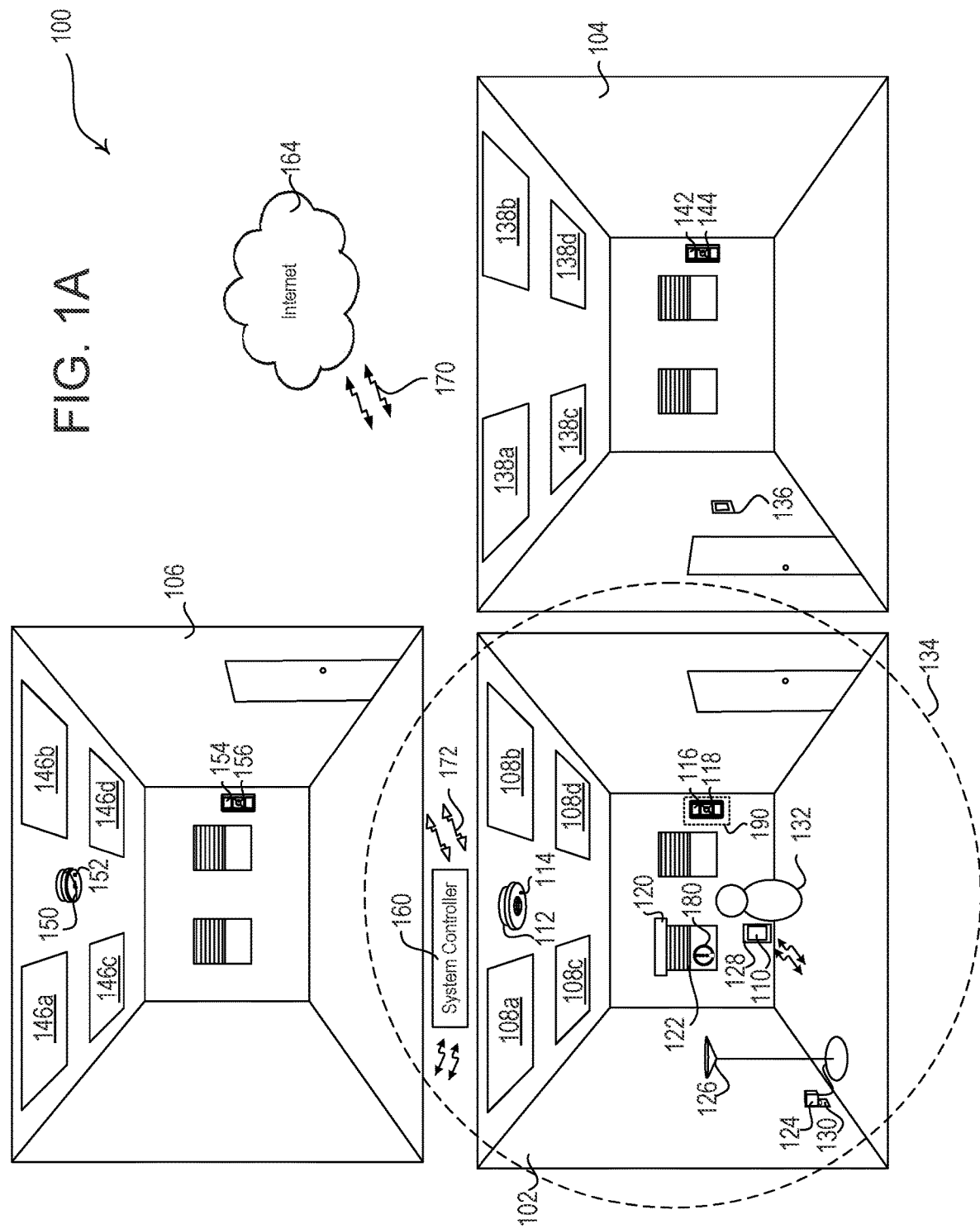

FIG. 1A depicts a representative load control environment 100 (e.g., a load control area) comprising a load control system. The load control system may be commissioned for enabling control of electrical devices in the load control system. The commissioning of the load control system may include associating control devices, which may include control-source devices and/or control-target devices. As shown in FIG. 1A, rooms 102, 104, and 106 in a building may be installed with one or more control-target devices, e.g., load control devices for controlling the electrical loads within a room or building. Each load control device may be capable of directly controlling the amount of power provided to an electrical load and may be controlled by a control-source device. Example control-target devices may include lighting fixtures 108a, 108b, 108c, 108d in room 102; lighting fixtures 138a, 138b, 138c, 138d in room 104; and lighting fixtures 146a, 146b, 146c, 146d in room 106. Each lighting fixture may include a lighting load (e.g., an LED light source) and a respective lighting control device (e.g., an LED driver, ballast, dimming or switching module that may interface with a driver or ballast, or other lighting control device) for controlling the respective lighting load of the lighting fixture. Other example control-target devices may include a motorized window treatment 120 having a motor drive unit (e.g., including a motor) for controlling the position of covering material 122, a temperature control device (e.g., thermostat 136) for controlling an HVAC system, and/or an AC plug-in load control device 124 for controlling a plug-in electrical load, such as a floor lamp 126, a table lamp or another electrical device that is plugged in to the AC plug-in load control device 124. The AC plug-in load control device 120 may be plugged into an electrical receptacle 130.

Control devices (e.g., a control-source device and/or a control-target device) may communicate with each other and/or other devices via a wired and/or a wireless communication link. For example, the control devices may communicate via a radio frequency (RF) signal 172. The RF signal 172 may be transmitted via any known RF communication technology and/or protocol (e.g., near field communication (NFC); BLUETOOTH®; WI-FI®; ZIGBEE® a proprietary communication channel, such as CLEAR CONNECT™, etc.). A control device may be both a control-target and a control-source device.

A control-source device may be an input device that indirectly controls the amount of power provided to an electrical load by transmitting digital messages to the control-target device. The digital messages may include control instructions (e.g., load control instructions) or another indication that causes the control-target device to determine load control instructions for controlling an electrical load. Example control-source devices may include a remote control devices 116, 142, and 154, an occupancy sensor 112, a daylight sensor 150, a window sensor 180, and/or a network device 128. The control-source devices may include a wired or wireless device. The control-source devices may include a control device, such as a dimmer switch, an electronic switch, or the like.

The load control system 100 may be commissioned to enable control of electrical loads based on commands communicated between control devices (e.g., control-source devices and control-target devices) configured to control the electrical loads. For example, control devices may be associated with one another and association information may be stored thereon, or at other devices, which may be used to communicate and identify digital commands at associated devices for controlling electrical devices in the system. The association information may include the unique identifier of one or more of the associated devices. The association information may be stored at the control devices, or at other devices that may be implemented to enable communication and/or identification of digital commands between the control devices.

The remote control devices 116, 142, and 154 may be wireless devices capable of controlling a control-target device via wireless communications. The remote control devices 116, 142, and 154 may be attached to the wall or detached from the wall. Examples of remote control devices are described in greater detail in U.S. Pat. No. 5,248,919, issued Sep. 28, 1993, entitled LIGHTING CONTROL DEVICE; U.S. Pat. No. 8,471,779, issued Jun. 25, 2013, entitled WIRELESS BATTERY POWERED REMOTE CONTROL WITH LABEL SERVING AS ANTENNA ELEMENT; and U.S. Patent Application Publication No. 2014/0132475, published May 15, 2014, entitled WIRELESS LOAD CONTROL DEVICE, the entire disclosures of which are hereby incorporated by reference.

The occupancy sensor 112 may be configured to detect occupancy and/or vacancy conditions in the load control environment 100 in which the load control system is installed. The occupancy sensor 112 may transmit digital messages to control-target devices via the RF communication signals 172 in response to detecting the occupancy or vacancy conditions. The occupancy sensor 112 may operate as a vacancy sensor, such that digital messages are transmitted in response to detecting a vacancy condition (e.g., digital messages may not be transmitted in response to detecting an occupancy condition). The occupancy sensor 112 may enter an association mode and may transmit association messages via the RF communication signals 172 in response to actuation of a button 114 on the occupancy sensor 112. Examples of RF load control systems having occupancy and/or vacancy sensors are described in greater detail in U.S. Pat. No. 8,009,042, issued Aug. 10, 2011, entitled RADIO-FREQUENCY LIGHTING CONTROL SYSTEM WITH OCCUPANCY SENSING; U.S. Pat. No. 8,199,010, issued Jun. 12, 2012, entitled METHOD AND APPARATUS FOR CONFIGURING A WIRELESS SENSOR; and U.S. Pat. No. 8,228,184, issued Jul. 24, 2012, entitled BATTERY-POWERED OCCUPANCY SENSOR, the entire disclosures of which are hereby incorporated by reference.

The daylight sensor 150 may be configured to measure a total light intensity in the visible area of the load control environment 100 in which the load control system is installed. The daylight sensor 150 may transmit digital messages including the measured light intensity via the RF communication signals 172 for controlling control-target devices in response to the measured light intensity. The daylight sensor 150 may enter an association mode and may transmit association messages via the RF communication signals 172 in response to actuation of a button 152 on the daylight sensor 150. Examples of RF load control systems having daylight sensors are described in greater detail in U.S. Pat. No. 8,410,706, issued Apr. 2, 2013, entitled METHOD OF CALIBRATING A DAYLIGHT SENSOR; and U.S. Pat. No. 8,451,116, issued May 28, 2013, entitled WIRELESS BATTERY-POWERED DAYLIGHT SENSOR, the entire disclosures of which are hereby incorporated by reference.

The window sensor 180 may be configured to measure an exterior light intensity coming from outside the load control environment 100 in which the load control system is installed. The window sensor 180 may be mounted on a façade of a building, such as the exterior or interior of a window, to measure the exterior natural light intensity depending upon the location of the sun in the sky. The window sensor 180 may detect when direct sunlight is directly shining into the window sensor 180, is reflected onto the window sensor 180, or is blocked by external means, such as clouds or a building, and may send digital messages indicating the measured light intensity. The window sensor 180 may transmit digital messages including the measured light intensity via the RF communication signals 172. The digital messages may be used to control an electrical load via one or more control-target devices. The window sensor 180 may enter an association mode and may transmit association messages via the RF communication signals 172 in response to actuation of a button on the window sensor 180.

The load control environment 100 may include other types of control-source devices, such as, for example, temperature sensors, humidity sensors, radiometers, cloudy-day sensors, shadow sensors, pressure sensors, smoke detectors, carbon monoxide detectors, air-quality sensors, motion sensors, security sensors, proximity sensors, fixture sensors, partition sensors, keypads, multi-zone control units, slider control units, kinetic or solar-powered remote controls, key fobs, cell phones, smart phones, tablets, personal digital assistants, personal computers, laptops, timeclocks, audio-visual controls, safety devices, power monitoring devices (e.g., power meters, energy meters, utility submeters, utility rate meters, etc.), central control transmitters, residential controllers, commercial controllers, industrial controllers, or any combination of control-source devices.

The load control environment 100 may include a system controller 160 operable to transmit and/or receive digital messages via wired and/or wireless communications. For example, the system controller 160 may be configured to transmit and/or receive the RF communication signals 172, to communicate with one or more control devices (e.g., control-source devices and/or control-target devices). The system controller 160 may communicate digital messages between associated control devices, for example. The system controller 160 may be coupled to one or more wired control devices (e.g., control-source devices and/or control-target devices) via a wired digital communication link. The system controller 160 may be on-site at the load control environment 100 or at a remote location. Though the system controller 160 is shown as a single device, the load control environment 100 may include multiple system controllers and/or the functionality thereof may be distributed across multiple devices.

The system controller 160 may also, or alternatively, communicate via RF communication signals 170 (e.g., NFC; BLUETOOTH®; WI-FI®; cellular; a proprietary communication channel, such as CLEAR CONNECT™, etc.). The system controller 160 may communicate over the Internet 164, or other network, using RF communication signals 170. The RF communication signals 170 may be transmitted using a different protocol and/or wireless band than the RF communication signals 172. For example, the RF communication signals 170 may be transmitted using WI-FI® or cellular signals and the RF communication signals 172 may be transmitted using another RF communication protocol, such as BLUETOOTH®, ZIGBEE®, or a proprietary communication protocol. The RF communication signals 170 may be transmitted using the same protocol and/or wireless band as the RF communication signals 172. For example, the RF communication signals 170 and the RF communication signals 172 may be transmitted using WI-FI® or a proprietary communication protocol.

The system controller 160 may be configured to transmit and receive digital messages between control devices. For example, the system controller 160 may transmit digital messages to the control-target devices in response to the digital messages received from the control-source devices. The digital messages may include association information for being stored at the control devices or control instructions for controlling an electrical load. The control instructions may be used to control the electrical load of a control-target device or to control the electrical load according to control configuration information. The system controller 160 may receive control instructions from a control-source device and may perform a lookup of the control-target devices associated with the control-source device. The system controller 160 may send digital messages that include control instructions to the associated control-target devices for controlling electrical loads. The system controller 160 may store the association information from association messages communicated between control devices, or may query control devices for association information stored thereon.

Once a control-source device is associated with a control-target device, the control-source device may send digital messages to the control-target device to cause the control-target device to control an amount of power provided to an electric load. For example, the associated remote control device 116 may instruct the lighting control devices of the lighting fixtures 108a, 108b, 108c, 108d to increase or decrease the lighting level of the respective lighting loads, instruct the motorized window treatment 120 to raise or lower the covering material 122, instruct the AC plug-in load control device 124 to raise or lower the lighting level of the floor lamp 126, and/or instruct the temperature control device 136 to raise or lower the temperature in one or more rooms. The associated occupancy sensor 112 may send similar instructions to a control-target device based on the detection of an occupancy or vacancy condition within the room 102. The daylight sensor 150 may send similar digital messages to a control-target device based on the detection of an amount of natural light within the room 106.

The control devices, including a load control discovery device 190, may discover and/or perform association with the system controller 160. The control devices may send an association message to the system controller 160 and/or the system controller 160 may send an association message to the control devices. An identifier of the system controller 160 may be stored at the control devices for detecting communications from the system controller 160. An identifier of the control devices may be stored at the system controller 160 for detecting communications from other control devices.

The system controller 160 may include control configuration information according to which one or more control-target devices may be controlled. For example, control configuration information may include preset configurations. The system controller 160 may generate digital messages according to the preset configurations to set a dimming level of the lighting fixtures to a predefined level, to set a level of the covering material 122 to a predefined level, to set a dimming level of the lamp 126 to a predefined level, or to set a temperature of the temperature control device 136 to a predefined level. Different presets may be configured to control different control-target devices to control a corresponding electrical load differently. Example preset configurations may include bedtime preset for when a user is going to bed, a movie watching preset for when the user is watching television or a movie, an away preset for when a user is away from the building, a home preset for when the user is in the building, or other preset configurations a user may define for an occasion.

The control configuration information may include zone configurations. The zone configurations may define one or more zones in which control-target devices are defined for being controlled. The zones may be a group of control devices for being associated that have a group identifier. The control-target devices in different zones may be separately controlled by sending digital messages having control instructions for controlling each zone. Different zones may be identified by a zone identifier (e.g., group identifier) that may be stored at the system controller 160 and/or the control devices in the zone. Each zone may be defined as a location having a zone identifier that is a location identifier. Though the zone may be described herein as a location having a location identifier, other zone configurations may be similarly implemented as described herein for locations.

The load control environment 100 may include a network device 128. The network device 128 may perform wired and/or wireless communications. Examples of the network device 128 may include a wireless phone, a tablet, a laptop, a personal digital assistant (PDA), a wearable device (e.g., a watch, glasses, etc.), or another computing device. The network device 128 may be a user device operated by a user 132. The network device 128 may communicate wirelessly by sending digital messages on RF communication signals 170 (e.g., WI-FI® signals, WI-MAX® signals, cellular signals, etc.). The network device 128 may communicate digital messages in response to a user actuation of one or more buttons on the network device 128. Examples of load control systems having WI-FI®-enabled devices, such as smart phones and tablet devices, are described in greater detail in U.S. Patent Application Publication No. 2013/0030589, published Jan. 11, 2013, entitled LOAD CONTROL DEVICE HAVING INTERNET CONNECTIVITY; and U.S. Pat. No. 9,413,171, issued Aug. 9, 2016, entitled NETWORK ACCESS COORDINATION OF LOAD CONTROL DEVICES, the entire disclosures of which are incorporated herein by reference.

The network device 128 may communicate with the system controller 160 using digital messages transmitted via RF communication signals 170 (e.g., WI-FI® signals, WI-MAX® signals, cellular signals, etc.) to allow the network device 128 to associate control devices (e.g., control-source devices and/or control-target devices) and/or control electrical loads. When the RF communication signals 170 and the RF communication signals 172 communicate on the same communication protocol and/or the same band, the network device 128 may operate as the system controller 160, as described herein.

The network device 128 may execute an application locally for displaying information received from the system controller 160 and/or receiving user input for communicating information to the system controller 160. The network device 128 may comprise a visual display 110 for displaying information for the user 132 and may be configured to receive user inputs from the user 132. The system controller 160 may be accessed from the network device 128 via a web interface (e.g., a web browser) and/or via a control application (e.g., a load control application and/or configuration application) at the network device 128, for example. The user 132 may generate and store association information on the network device 128 for associating control-source devices and control-target devices.

The association information may be stored in the form of a table or database that associates a unique identifier (e.g., serial number) of a control-target device with a location and/or a unique identifier (e.g., serial number) of one or more control-source devices. The association information may include a device type identifier that indicates a device type of the control-target device (e.g., lighting control device, motorized window treatment, plug-in load control device, temperature control device, etc.) and/or a device type of the control-source devices (e.g., remote control device, occupancy sensor, daylight sensor, window sensor, etc.). The association information may be sent from the network device 128 to the system controller 160. The system controller 160 may store the association information. The system controller 160 may identify the association information corresponding to each control-target device by identifying the unique identifier of the control-target device and the corresponding associated devices (e.g., unique identifiers of the control-source devices) to transmit the association information to each control-target device for storage thereon. The system controller 160 may identify other information, such as control configuration information, corresponding to each control-target device and may transmit the information to each control-target device for storage thereon, such that the control-target devices may respond according to the information.

The control devices may be associated with a location for enabling control of electrical loads in the location. The control devices may also be associated with other control devices in the location for enabling the control of the electrical loads. For example, a control device may be associated with a location by storing a location identifier at the control device, such that the control device may detect digital messages sent to control devices in the identified location. The control device (e.g., control-target device) may be associated with other control devices (e.g., control-source devices) by storing an identifier of the control devices, such that the control device (e.g., control-target device) may detect digital messages sent from associated control devices (e.g., control-source devices) for controlling an electrical load. When a control-target device is associated with a control-source device, the control-target device may be responsive to the control-source device.

The location of control devices may be discovered relative to the location of other control devices in the load control environment 100. As shown in FIG. 1A, control devices (e.g., control-source devices and/or control-target devices) may send a message within a discovery range 134 that may be received by other control devices within the discovery range 134. The message may be a dedicated discovery message that may be identified by a receiving device as a discovery message or another message that may be transmitted in the load control environment 100 and may be interpreted as a discovery message. For example, the message may be an association message for associating devices in the load control environment 100, and/or the message may be a control message for controlling devices in the load control environment 100.

A control device that sends a discovery message (e.g., dedicated discovery message or a message otherwise interpreted as a discovery message) may be identified as a load control discovery device 190. The load control discovery device 190 may be a device that performs one or more activities. For example, the load control discovery device 190 may be a control-source device (e.g., a remote control device 116) that controls the amount of power provided to an electrical load by transmitting digital messages to the control-target device and/or a control device that sends a discovery message to one or more control devices.

The load control discovery device 190 may be a dedicated load control discovery device 190. For example, the dedicated load control discovery device 190 may be a device (e.g., a control device) that may be used for sending a discovery message to control devices and/or system controller 160 during a dedicated discovery mode. The dedicated discovery mode may be enabled for a period of time, may be enabled/disabled upon receipt of an indication by a user, and/or may be configured as a static mode on the dedicated discovery device. The discovery message may be a message used for discovering control devices and/or system controller 160. The discovery message may be a message used for one or more activities. For example, the discovery message may be a message configured to discover control devices and/or system controller 160, and the discovery message may be a message configured to associate a control device with another control device and/or the system controller 160. The discovery message may be a control message configured to discover control devices and to control a control device that receives the discovery message.

FIG. 1A shows an example in which a control-source device (e.g., remote control device 116) is assigned as the load control discovery device 190 that may send a discovery message within discovery range 134, though other control devices may also be assigned as the load control discovery device 190. The discovery range 134 may correspond to a transmission power (e.g., an adjustable transmission power) of the load control discovery device 190. The load control discovery device 190 may be preconfigured for a location. For example, the load control discovery device 190 may be stored as the load control discovery device for an identified location at the system controller 160, at the load control discovery device 190, and/or other devices at an identified location. The discovery message sent by the load control discovery device 190 may be received by other devices, such as other control devices and/or the system controller 160.

Devices may receive the discovery message and determine whether the discovery message is received at a signal strength that is above a reception power threshold (e.g., a predefined signal strength). The predetermined signal strength may be received from the system controller 160 and/or may be preconfigured at the time of manufacture. The control devices that receive the discovery message may report the receipt of the discovery message. The control devices that receive the discovery message may report the received signal strength of the discovery message. The control devices may report the receipt of the discovery message and/or the received signal strength to another control device (e.g., control-source device, control-target device, etc.). The control devices that receive the discovery message may report the receipt of the discovery message and/or the received signal strength to the system controller 160. The control device and/or the system controller 160 may store the control devices that receive the discovery message and provide an identifier of the control devices to the network device 128. The network device 128 may display the control devices to the user 132 for association with a location and/or other control devices.

As each control device may be associated with a location, the list of control devices in a given location may be recalled at the network device 128 (e.g., from direct storage or from the system controller 160. The control devices may be associated with other devices, disassociated with other devices, or disassociated with the location. The association and disassociation of devices may enable for configuration and/or reconfiguration of control devices in a defined area. Locations may be defined and/or redefined by discovering devices and updating associations. The control devices may be installed and/or associated by a different person than the user 132 that operates or manages the operation of the control devices in that space. The discovery of control-target devices by a control-source device may enable configuration or reconfiguration of a location to optimize the control of the control devices according to the use of the space. The use of a location may be changed, or may be different than originally identified in the plans (e.g., such as when the devices were installed in the rooms 102, 104, 106). As such, the discovery of devices within a discovery range 134 of a load control discovery device 190 may enable the user 132 to redefine associated devices for a given location.

Devices may receive the discovery message and determine whether the discovery message is received within a discovery range and/or a discovery zone. The discovery range may be partitioned into one or more discovery zones. The discovery zones may be identified by the received signal strength at which the discovery message may be received, and/or the discovery zones may be identified by another identifier, such as the transmission power of the discovery message and/or a threshold value (e.g., the reception power threshold value). The discovery messages may be transmitted within the discovery range and may identify a discovery zone within which devices may respond. The discovery zone may be identified by a received signal strength or range of received signal strengths for which control devices may respond if the discovery message is received at the identified signal strength.

The discovery message transmitted by the load control discovery device 190 may be a broadcast message that may be broadcast within the established discovery range 134. The discovery message my include information identifying the load control discovery device 190 from which the discovery message was transmitted. The discovery message may indicate the type of control device (e.g., remote control device, occupancy sensor, lighting control device, etc.), a unique identifier (e.g., serial number) that may identify the load control discovery device 190, the link address for communicating with the load control discovery device 190 directly, whether the device is a control-target device or a control-source device, and/or other information about the device.

The discovery range 134 may be dependent upon the transmission power and/or a range of transmission powers of the transmitting device. For example, the discovery range 134 may be based on a transmission power at which digital messages are transmitted from the load control discovery device 190 or a distance for which the digital messages are to be transmitted. The transmission power of the transmitting device may be adjustable in order to adjust the area of the discovery range 134.

The discovery range 134 may also, or alternatively, be dependent on a threshold. For example, the discovery range 134 may be dependent on a reception power threshold of the receiving device. For example, the discovery range 134 may be dependent upon the signal strength at which the control devices receive digital messages from the load control discovery device 190. The signal strength may be a signal strength indicated as a received signal strength indicator (RSSI) at each of the receiving devices. The RSSI may be defined as a measure of the power level that a receiving device is receiving digital messages from the transmitting device. The receiving devices may each compare the RSSI of a received message to the reception power threshold (which may be stored in memory in each receiving device) and may respond to the received message if the RSSI is greater than the reception power threshold. The reception power threshold of each receiving device may be adjustable in order to adjust the area of the discovery range 134. For example, the discovery message may include a reception power threshold to which the receiving control device may compare the RSSI of the received signal (e.g., the discovery message).

The discovery range 134 may be partitioned into multiple discovery zones having different RSSI values and/or ranges. For example, the discovery range 134 may be broken up into discovery zones that each correlate to different groups of devices (e.g., devices that receive the discovery message at the same signal strength and/or within the same range of signal strengths). Selecting control devices within a particular discovery zone or zones may limit the number of devices transmitting a response at the same time to reduce or preclude interference from occurring between devices located within different discovery zones. The control devices in different zones that respond to discovery messages may be aggregated by selecting control devices from more than one discovery zone. The control devices in different zones may be displayed to the user 132 and/or provided to the control devices independently, e.g., based upon the location of the control devices in the different zones.

As shown on FIG. 1A, the transmission power of the load control discovery device 190 may define the discovery range 134. The discovery range 134 may be defined according to a minimum signal strength (e.g., minimum RSSI) to a maximum signal strength (e.g., maximum RSSI). The minimum signal strength may define the outer edge of the discovery range 134. The maximum signal strength may define an inner region (e.g., region inside of the discovery range 134), inside of which devices may be prevented from responding to the discovery message. The maximum signal strength may be set such that the inner region is relatively smaller (e.g., zero feet from the load control discovery device 190). The transmission of the discovery message at the load control discovery device 190 may begin at the inner region, e.g., the load control discovery device may begin transmission at zero feet from the load control discovery device 190, and incrementally transmit beyond zero feet from the load control discovery device 190.

Control devices within the discovery range 134 may respond to a discovery message transmitted from the load control discovery device 190. Each control device may calculate the RSSIs of each respective discovery message received. One or more control devices may organize the control devices according to the RSSIs of each respective discovery message received. The system controller 160 and/or the network device 128 may organize the control devices. For example, system controller 160 and/or the network device 128 may organize the control devices according to the RSSIs of each respective discovery message received. Control devices that receive the discovery message in a signal having an RSSI above the reception power threshold may be within the discovery range 134, and control devices that receive the discovery message in a signal having an RSSI below the reception power threshold may be outside the discovery range 134.

The load control discovery device 190 may be a control device (e.g., control-source or control-target) that is pre-installed in the load control system for performing load control. As the load control discovery device 190, and/or the control devices for being discovered, may communicate using a different protocol than the network device 128, the system controller 160 may identify the responses to the discovery message and provide the discovered devices to the network device 128. The use of the control devices that are installed for performing load control as the load control discovery device 190 may reduce the number of devices used to perform discovery and/or association.

The discovery range 134 may be affected by interference. For example, a wall, floor, or ceiling separating rooms 102, 104, 106 may cause interference. A control device receiving the discovery message within a same discovery range and/or a same discovery zone as another control device may cause interference. Interference may degrade the signal strength of a discovery message. Such degradation may reduce the discovery range 134 of a discovery message transmitted from a load control discovery device 190, e.g., among rooms 102, 104, and/or 106. As shown in FIG. 1A, the discovery range 134 may be degraded by the wall between room 102 and 104, as well as by the ceiling and floor between the room 102 and 106, such that the discovery range 134 projects further into the room 102 in which there exists less interference. Even though the discovery range 134 is illustrated by a circle in FIG. 1A, the discovery range 134 may define an area other than a circular area.

The RSSI or signal strength may be one discovery criteria that may be used to discover devices in the load control environment 100. One or more discovery criteria may be used to discover devices in the load control environment 100. The discovery criteria may include an amount of time since power up of the device. If a control device was powered up before or after the amount of time indicated in the discovery criteria, the control device may be filtered out of the discovered devices. The control devices may start an internal timer upon being powered up and may identify when the threshold amount of time for being discovered has been met. In another example, the control devices may provide the amount of time since the internal timer began and another device, such as the system controller 160 or the network device 128, may identify when the threshold amount of time for being discovered has been met.

The discovery criteria may include a load state of an electronic load controlled by a control device. For example, the load state may be an on/off state of an electrical load controlled by a load control device. The load state may be the dimming level, or a dimming level range, of a lighting load. The control devices may identify a load state of an electrical load and identify when the load state has been met for discovery. In another example, the control devices may provide the load state to another device, such as the system controller 160 or the network device 128, which may identify when the load state for being discovered has been met. The load state being included in the discovery criteria may allow the user 132 to adjust the load state of electrical loads using devices the user 132 wishes to discover. For example, the user 132 may change the on/off state of the lighting fixtures 108a and 108b to the "on" state for being discovered and the user 132 may leave the on/off state of the lighting fixtures 108c and 108d in the "off" state for being filtered out by the discovery criteria.

The discovery criteria may include an occupancy state or a level of activity identified by an occupancy sensor, such as occupancy sensor 112. For example, the occupancy sensor 112 may identify an occupancy condition or a vacancy condition, which may be used for discovering the occupancy sensor 112. The occupancy sensor 112 may identify different levels of activity. For example, the occupancy sensor may identify major motion events (e.g., above a predefined level of motion) and minor motion events (e.g., below a predefined level of motion) within the visible area of the occupancy sensor 112. The major motion events or minor motion events may be used to discover the occupancy sensor 112. The occupancy sensor 112 may send a response message upon identifying the defined occupancy sate or the defined level of activity. The occupancy state and/or the level of activity may be used to discover devices other than occupancy sensors. The occupancy state and/or the level of activity may be identified by the occupancy sensor 112 and the occupancy sensor 112 may send a discovery message to devices within a discovery range. The discovery message from the occupancy sensor 112 may identify the occupancy state and/or level of activity identified at the occupancy sensor 112.

The discovery criteria may include devices that have been previously associated with a location and/or device. For example, the discovered devices may include devices that have been previously discovered and/or previously stored in association information at another device. The discovery message may include a request for associated devices and the identifier of the associated devices may be returned in response. The discovery message may include the identifier of a particular device (e.g., a previously discovered device) and the discovery message may ask the control devices whether they are already associated with the device. The response to the discovery message may include an answer to the request, or the devices that are unassociated with the identified control device may not respond.

The discovery criteria may be stored at the control devices for deciding whether to respond to discovery messages according to the defined criteria. Each discovery criteria may be responded to independently, or a combination of criteria may be identified for response. The discovery criteria may be updated at the load control devices in update messages from the system controller 160 and/or the network device 128. The discovery criteria may be defined at the network device and sent to the control devices for determining whether to respond to a discovery message. The discovery message may define the discovery criteria for being responded to when identified at the control devices.

The discovery message may request the control devices to provide identified discovery criteria and the system controller 160 and/or the network device 128 may filter out discovered devices based on the discovery criteria provided by the control devices. For example, the discovery message may request the control devices to provide an RSSI at which the discovery message is received, an amount of time since power up, a load state, and/or an occupancy state or a level of activity identified by an occupancy sensor. The control device may provide the requested information, or null values where the requested information is unidentified at the control device, and the sys and/or one or more criteria may be provided to the system controller 160 and/or the network device 128 for filtering discovered devices.

One of the discovery criteria may be used to discover the devices initially and the criteria may be further filtered based on other criteria. For example, the control devices that receive the discovery message with a certain signal strength (e.g., RSSI) may be used to generate the initial dataset. The initial dataset may be further filtered using the other discovery criteria. The discovery criteria may be provided to a user 132 on the network device 128 for selection to further filter the number of discovered devices in a dataset. The discovery criteria may be provided sequentially to a user 132 and/or in a randomly generated order. Instructions may be provided to the user 132 on the network device 128 to instruct the user 132 in the manner to further filter the discovered devices. For example, the network device 128 may instruct the user 132 to enter the room 102 to discover devices in the room 102. The network device 128 may instruct the user 132 to enter the room 102 to discover devices in the room 102. The network device 128 may instruct the user 132 to make a major motion near the devices to be discovered, such that the occupancy sensor 112 may detect the major motion event and send a digital message that is used by the system controller 160 and/or the network device 128 for filtering discovered devices. The discovery criteria may be user-selected for limiting the number of discovered devices.

The transmission of the discovery message may be triggered by actuation of a button on the load control discovery device 190 and/or receipt of a discovery trigger message. For example, the load control discovery device 190 may be identified as remote control device 116. The load control discovery device 190 may be identified as a dedicated load control discovery device. The user 132 may actuate a button (e.g., for a predefined period of time), a sequence of buttons, and/or perform other commands on the load control discovery device 190 to transmit the discovery message. Actuation of a button for different periods of time may cause the load control discovery device 190 to be set to different modes. For example, actuating a button for three seconds on load control discovery device 190 (e.g., remote control device 116) may cause load control discovery device 190 to be set to an association mode, in which load control discovery device 190 may send an association message to control-target devices. Actuating a button for six seconds on load control discovery device 190 (e.g., remote control device 116), in the example, may cause load control discovery device 190 to be set to a discovery mode, in which load control discovery device 190 may send a discovery message to control-target devices. The load control discovery device 190 may also, or alternatively, receive a discovery trigger message from the system controller 160 or the network device 128. The network device 128 may receive an actuation of a button by the user 132 and may transmit a discovery trigger message to the load control discovery device 190 or an indication to the system controller 160 to transmit the discovery trigger message.

The transmission of the discovery message may be performed by sensors in the load control environment. For example, the load control discovery device may be an occupancy sensor that may transmit digital messages upon identification of an occupancy condition (e.g., occupied room) and/or a vacancy condition (e.g., unoccupied room). The occupancy condition and/or the vacancy condition may be interpreted by other devices as a discovery message (e.g., when the devices are in a discovery mode). A user may enter or leave a room to trigger transmission of a discovery message in a location of the occupancy sensor to discover devices in that location.

The control devices receiving the discovery message from the load control discovery device 190 may be two-way communication devices (e.g., the lighting control devices in the lighting fixtures 108a, 108b, 108c, 108d, the motorized window treatment 120, the AC plug-in load control device 124, etc.) that may receive the discovery message and may acknowledge receipt of the discovery message to the system controller 160. The control devices may identify the discovery message as being from the load control discovery device 190 and may store an indication of receipt of the discovery message. The control devices may identify the discovery message by a device identifier of the load control discovery device 190 that is unassociated with the control devices, a device identifier of the load control discovery device 190 that is associated with the control devices and identified as the load control discovery device 190, and/or a discovery message identifier. The control devices may store the signal strength (e.g., received signal strength indication (RSSI)) at which the discovery message is received and/or the control devices may store a threshold value (e.g., the reception power threshold value). The control devices may report the signal strength to one or more other devices, and/or the control devices may report to one or more devices whether the signal strength is below or above the reception power threshold. For example, the control devices may report the signal strength to other control devices, to network device 128, and/or to system controller 160. The control devices may also, or alternatively, report whether the signal strength is below or above the reception power threshold. The receipt of the discovery message may be reported if the signal strength (e.g., the RSSI) is above the threshold (e.g., the predefined reception power threshold).

The control devices that are one-way communication devices (e.g., the occupancy sensor 112, the window sensor 180, daylight sensor 150, remote control device 154, remote control device 142, etc.) may be unable to receive the discovery message. The one-way communication devices may transmit a discovery message to the load control discovery device 190 and/or the system controller 160 for being detected and/or associated. The discovery messages may include the identifier of the transmitting device. To transmit the discovery message, the user 132 may actuate a button on the one-way communication device. The user 132 may actuate a button 118 on the remote control device, a button 144 on the remote control device 142, a button 156 on the remote control device 154, a button 152 on the daylight sensor 150, a button 114 on the occupancy sensor 112, and/or the like. To trigger the transmission of discovery information at the daylight sensor 150, the user 132 may also, or alternatively, transmit a laser signal identifiable by the daylight sensor 150. Though some control devices may be described as two-way communication devices, any control device may include a button for transmitting a discovery message.

As the load control discovery device 190 may receive messages from control devices, the two-way communication devices may also send a discovery message or a response to the discovery message transmitted from the load control discovery device 190. The load control discovery device 190 may determine the signal strength at which the messages from the control devices are received. The load control discovery device 190 may internally record the identified devices and/or the signal strengths. The load control discovery device 190 may provide the identified devices and/or the signal strengths to the system controller 160 and/or the network device 128. Though certain devices may be described as one-way communication devices or two-way communication devices, the devices may be configured for either one-way or two-way communication.

The system controller 160 and/or the network device 128 may be used to coordinate the discovery and association of control devices in a location. The user 132 may actuate a button on the network device 128 to discover devices in a location and the network device 128 may request discovery information from the system controller 160. The system controller 160 may receive the request and may transmit a digital message to put the control devices in a discovery mode. The digital message that puts the control devices in the discovery mode may be the same message as the discovery trigger message for triggering the discovery message at the load control discovery device 190, or may be a different message. Once in the discovery mode, the control devices may know to listen for the discovery message. The user 132 may actuate a button on a control device to enter the discovery mode. For example, the user may actuate a button or buttons (e.g., for a predefined period of time) on the load control discovery device 190 to send a digital message to the system controller 160 and/or other control devices to enter the discovery mode.

The control devices may transmit a digital message to the system controller 160 to acknowledge receipt of the discovery message. The digital messages may include the device identifier of the load control discovery device 190 and/or a signal strength at which the discovery message was received. The digital messages may be sent to the system controller 160 in response to a request from the system controller 160 (e.g., after the system controller 160 receives the discovery message itself). The request from the system controller 160 may include a request to acknowledge receipt of a message from a device having the device identifier of the load control discovery device 190 and/or the received signal strength of the message. The request from the system controller 160 may include a request to acknowledge receipt of the discovery message from the load control discovery device 190 and/or the received signal strength of the message if the discovery message was received at a signal strength above a predefined threshold (e.g., the reception power threshold). The request from the system controller 160 may include a request for device identifiers of unassociated devices from which messages have been received (e.g., since entering the discovery mode) and/or the received signal strength of the messages. The request from the system controller 160 may include a request for device identifiers of load control discovery devices from which messages have been received (e.g., since entering the discovery mode) and/or the received signal strength of the message.

The system controller 160 may provide the discovered devices to the network device 128 for display to the user 132. The system controller 160 may organize the discovered devices for display to the user 132 for performing association. The system controller 160 may organize the discovered control devices in an organized dataset (e.g., ascending or descending list) that is organized by the signal strength at which the discovery message was received at each device. The system controller 160 may remove any devices from the dataset that receive the discovery message at a signal strength below a predefined threshold (e.g., the reception power threshold). The system controller 160 may include a predefined number of devices in the dataset that have the greatest signal strength. The system controller 160 may send the organized dataset to the network device 128 for displaying to the user 132.

Though the coordination of discovery and/or association of control devices is described herein as being performed at the system controller 160, such functionality may be implemented in the control devices themselves. One or more control devices (e.g., lighting control devices in the lighting fixtures 108a, 108b, 108c, 108d, remote control device 116, etc.) may be used to coordinate the discovery and/or association of control devices (e.g., control devices within a location). A central control device or control devices may receive the request to put the control devices in a discovery mode and may transmit a digital message to put the control devices in the discovery mode. The digital message may be sent to control devices neighboring the central control device or control devices. The digital message that puts the control devices in the discovery mode may be the same message as the discovery trigger message for triggering the discovery message at the load control discovery device 190, or may be a different message. Once in the discovery mode, the control devices may know to listen for the discovery message. The central control device or control devices may collect the discovery information (e.g., acknowledgement of receipt of the discovery message and/or the signal strength at which the discovery message was received) from the other control devices and may provide the discovery information to the network device 128. The central control device or control devices may receive association information from the network device 128 and send the association information, or relevant portions thereof, to the other control devices.

The network device 128 may organize the discovered devices for display to the user 132 for performing association. The network device 128 may organize the discovered control devices in an organized dataset (e.g., ascending or descending list) that is organized by the signal strength at which the discovery message was received at each device. For example, the network device 128 may first display control devices that received the discovery message with the highest RSSIs, followed in descending order by the devices that received the discovery message with lower RSSIs. The network device 128 may remove any devices from the dataset that received the discovery message at a signal strength below a predefined threshold (e.g., the reception power threshold). The network device 128 may include a predefined number of devices in the dataset that have the greatest signal strength.

The user 132 may select control devices (e.g., lighting control devices in the lighting fixtures 108a, 108b, 108c, 108d) from the discovered devices displayed on the network device 150. The selected control devices may be associated with the load control discovery device 190 that was used to discover the control devices with the discovery range 134. The network device 150 may generate association information regarding the load control discovery device 190 and the selected control devices in response to the inputs received from the user 132. The selected control devices may also be associated with a control device (e.g., a control-source device) other than the load control discovery device 190.

The user 132 may configure association information and/or control configuration information for discovered control devices at the network device 128. The discovered control devices may be associated with one or more location identifiers that identify locations in the load control environment 100. The locations may be identified by the user 132 (e.g., from a list of predefined locations) or may be a predefined location or locations associated with the load control discovery device 190 (e.g., the location in which the load control discovery device is installed).

The network device 128 may access the association information stored at the system controller 160. The association information may include device identifiers of the discovered devices, location identifiers of the discovered devices, and/or identifiers of associated control devices. The user 132 may disassociate discovered control devices from previously associated control devices by making selections on the network device 128. The user 132 may associate discovered control devices with other control devices by making selections on the network device 128.

The user 132 may access the control configuration information stored at the system controller 160. The user 132 may edit currently stored control configuration information for discovered control devices by making selections on the network device 128. The user 132 may generate and store control configuration information for discovered control devices by making selections on the network device 128.

The network device 128 may transmit the association information and/or control configuration information to the system controller 160 (e.g., upon actuation of a button by the user 132). The system controller 160 may store the updated association information and/or control configuration information thereon. The system controller 160 may transmit the association information and/or control configuration information to the control devices to update the association information and/or control configuration information stored at the control devices. The system controller 160 may broadcast the updated association information and/or control configuration information to the control devices for the control devices to identify updated corresponding association information and/or control configuration information, if any, for being stored locally thereon.

FIG. 1B shows the example load control environment 100 having a control-target device being identified as the load control discovery device 190. For example, the lighting control device in the lighting fixture 108a may be identified as the load control discovery device 190 at the system controller 160 and/or at the lighting control device 108 itself. The load control discovery device 190 may be predefined for a location or switched between control devices. The load control discovery device 190 may be switched between control devices via a command from the network device 128 (e.g., a command from the network device 128 to the system controller 160). The user 132 may select the control device to be identified as the load control discovery device 190, and the identifier of the selected control device may be stored as the load control discovery device 190 (e.g., at the system controller 160, the network device 128, the control device identified as the load control discovery device 190, and/or other control devices). The lighting control device of the lighting fixture 108a may be identified as the load control discovery device 190 to discover a different set of control devices than the remote control device 116 that was identified as the load control discovery device 190 in FIG. 1A.

The organized dataset of discovered devices may be deleted, reorganized, and/or rebuilt after the load control discovery device 190 is switched. For example, the organized dataset may be deleted if a load discovery device 190 is disassociated from one or more control devices, and/or if the load control discovery device 190 is configured in a manner that would affect signal strengths at which the control devices receive the discovery message from a different load control discovery device 190.

The organized dataset may also be reorganized, e.g., if control devices are associated and/or disassociated with the load control discovery device 190, and/or if signal strengths at which the control devices receive the discovery message from a different load control discovery device 190 change over time. For example, the organized dataset may be reorganized to account for a device being associated with another load control discovery device 190, wherein the discovery messages received from an associated load control discovery device 190 has a signal strength that is greater than, or less than, discovery messages from previously associated load control discovery devices. The organized dataset may be reorganized if the same control devices are disassociated from a load control discovery device, e.g., if a load control discovery device is removed from a room or control devices are associated with another load control discovery device.

The organized dataset of discovered devices may be rebuilt. The rebuilt organized dataset may be in addition to, or, in place of, pre-existing organized datasets. For example, the organized dataset may be rebuilt if one control device is removed as the load control device, and another control device is assigned as the load control device. The organized dataset may be rebuilt, e.g., to account for the load control device having associations that are different than previous associations.

The discovery range 134 for different types of load control discovery devices may be the same or different. The user 132 may establish the discovery range 134 at the network device 128 or the discovery range 134 may be predefined. If the discovery range 134 is established at the network device 128, the established range may be communicated to the system controller 160, and/or the load control discovery device 190 for being stored thereon.

Any control device (e.g., control-source devices and/or control-target devices) may be identified as the load control discovery device 190. The control devices may be assigned as the load control discovery device 190 at the system controller 160, at the network device 128, and/or at the control device itself. The load control discovery device 190 may be switched between control devices. As shown in FIG. 1B, the load control discovery device 190 may be switched among the lighting control device of the lighting fixture 108a, the lighting control device of the lighting fixture 108b, the lighting control device of the lighting fixture 108c, the lighting control device of the lighting fixture 108d, the motorized window treatment 120, the occupancy sensor 112, the AC plug-in load control device 124, and/or other control devices. For example, the load control discovery device 190 may be switched from the lighting control device of the lighting fixture 108a to the lighting control device of the lighting fixture 108d to discover and associate devices in a different location within the room 102. The load control discovery device 190 may be switched between control devices via a command from the network device 128. For example, the load control discovery device 190 may be switched between control devices in response to the user 132 selecting one of the control devices on the network device 128. The network device 128 may send a message to the system controller 160. The system controller 160 and/or the network device 128 may send a message to the remote control device 116, which was previously assigned as the load control discovery device 190 as shown in FIG. 1A, that the device has been unassigned as the load control discovery device 190. The system controller 160 and/or the network device 128 may send a message to the lighting control device of the lighting fixture 108a that the device has been assigned as the load control discovery device 190. The load control discovery device 190 may be switched between control devices by the user 132 actuating a button (e.g., button 114 on the occupancy sensor) on the respective control device for being assigned as the load control discovery device 190.

The discovery range 134 may be calculated from the load control discovery device 190, such that identifying different control devices as the load control discovery device 190 may allow for discovery of different devices. As described above, the load control discovery device 190 may switch among control devices (e.g., from a previous load control discovery device to another load control discovery device). As the load control discovery device 190 switches among control devices, the discovery messages may be transmitted within the discovery range 134 of different control devices. For example, if the load control discovery device 190 switches from the remote control device 116 to the lighting control device of the lighting fixture 108a, the center of the discovery range 134 may move from the location of the remote control device 116 to the lighting control device of the lighting fixture 108a (e.g., in response to a user selection of the control device for being assigned as the load control discovery device 190 on the network device). As the load control discovery device 190 may be a movable device (e.g., remote control device 116, which may be detachable from the wall and carried by the user 132), the discovery range 134 may move with the same load control discovery device 190.

The discovery message may be sent multiple times. For example, the discovery message may be sent multiple times to identify the control devices located within a moving discovery range 134 and/or to identify control devices that were previously unidentified due to interference. The control devices identified as a result of the transmission of multiple messages may be aggregated. The aggregated control devices may be provided to the user 132. For example, the aggregated control devices may be provided to the user 132 via network device 128. Control devices that previously responded to discovery messages may be ignored when responding to subsequent discovery messages. The control devices may respond to a first discovery message received and omit response thereafter, or respond to each received discovery message. Subsequent discovery messages may identify control devices that previously responded to a discovery message, e.g., to prevent the discovered control devices from having to respond again.

There may be more than one load control discovery device 190. A load control discovery device 190 may be defined for different groups of control devices, such as different groups of control devices in a physical space. For example, a control device located in a first portion of room 102 may be identified as the load control discovery device 190 to discover control devices in the first portion of the room 102 and another control device located in a second portion of the room 102 may be identified as another load control discovery device to discover control devices in the second portion of the room 102. In another example, a control device in each of rooms 102, 104, and 106 may be identified as a respective load control discovery device for the room in which the device is located. The control device that is most centrally located in the room, or a portion of a room, may be identified as the load control discovery device 190.

Digital messages may be sent to the control devices to instruct the control devices to identify themselves and/or corresponding electrical loads, such that the user 132 may identify the control devices for being assigned as the load control discovery device 190. The identified control devices may be the discovered control devices at a location. The user 132 may actuate a button on the network device 128 to instruct a control device to perform an identification. The identification message may be sent from the system controller 160 to the identified device. The identified control device may receive the identification message and control an electrical load according to control instructions for identifying the device. The system controller 160 may know the type of control device for being identified and may send the control instructions corresponding to the type of control device. The system controller 160 may send a generic identification message that may be detected by the identified device, and the control instructions may be looked up locally.

The user 132 may actuate a button on control devices to assign control devices as the load control discovery device 190. For example, the user 132 may actuate a button 118 (e.g., for a predetermined period of time) on the remote control device 116 or the load control discovery device 190 to send a digital message to the system controller 160 to instruct the system controller 160 to identify the remote control device 116 as the load control discovery device 190. The identification message may be sent from the system controller 160 to the identified control device. The remote control device 116 or the load control discovery device 190 may also, or alternatively, communicate with the control devices directly to request identification. The identified device may receive the identification message and control an electrical load according to control instructions for identifying the device.

The user 132 may actuate a button (e.g., for a predetermined period of time) on the remote control device 116 or the load control discovery device 190 to identify (e.g., by flashing or otherwise identifying the device) another control device as the load control discovery device 190 or to assign the identified control device as the load control discovery device 190. This may allow the user 132 to iterate through control devices and select a control device as the load control discovery device 190. The control devices that are iterated through for being identified as the load control discovery device 190 may be control devices that have been discovered during the discovery mode or other devices (e.g., devices within the discovery range of the remote control device 116 or the load control discovery device 190).

Different control devices may perform identification differently. Load control devices may increase and/or decrease an amount of power provided to a corresponding electrical load. Lighting control devices in the lighting fixtures may turn on, turn off, raise a dimming level, lower a dimming level, or flash a respective lighting load. Motorized window treatment 120 may raise the level of the covering material 122 up or down, or wiggle with window treatment at the current level. AC plug-in load control device 124 may turn on, turn off, raise, lower, or flash the floor lamp 126, or otherwise increase and/or decrease an amount of power provided to an electrical load controlled by the plug-in load control device 124. Control devices may also, or alternatively, include an LED that may be turned on, turned off, or flashed for identification.

After a control device has been identified, the user 132 may select the identified device on the network device 128 for identifying the control device as the load control discovery device 190. The user 132 may identify different control devices as the load control discovery device 190 and discover different devices by moving the established discovery range 134 within a location or to different locations.

Figure 1C:
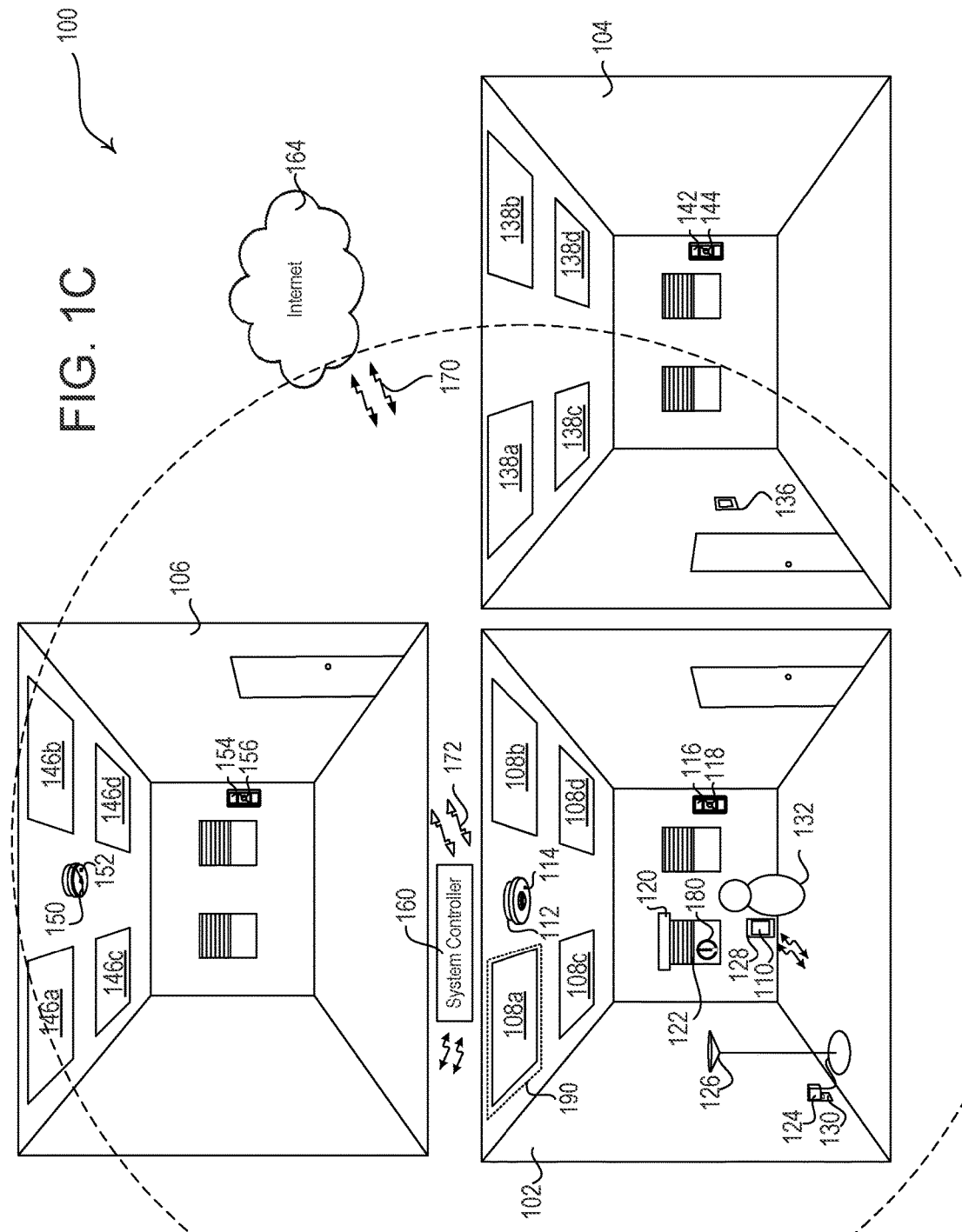

As the control devices in room 104 and room 106 are outside of the established discovery range 134, these control devices may be unable to receive a discovery message from the load control discovery device 190. As shown in FIG. 1C, the established discovery range 134 may be configurable. For example, the established discovery range 134 may be configurable by adjusting (e.g., incrementally increasing or decreasing) the signal strength (e.g., transmission power) of the load control discovery device 190, and/or by adjusting (e.g., increasing or decreasing) a threshold value (e.g., the reception power threshold value). The discovery range 134 may be increased (e.g., incrementally increased) as the transmission power of the load control discovery device 190 is increased and/or as the reception power threshold is decreased. As the discovery range 134 is increased, the number of control devices within the discovery range may increase. As shown in FIGS. 1A and 1B, the discovery range 134 may be adjusted to the adjusted discovery range 158. Using the established adjusted discovery range 158, the load control discovery device 190 may discover and/or associate other control devices that come within the adjusted discovery range 158, such as the temperature control device 136 and/or remote control device 154.

Though FIG. 1C shows the adjusted discovery range 158 as a larger discovery range than the discovery range 134, the discovery range 134 may also be adjusted to a smaller discovery range, which may include less control devices. The discovery range 134 may be made smaller to avoid discovering control devices in other locations, such as room 104 and/or room 106 when attempting to discover devices in room 102. The user 132 may adjust the discovery range or move the discovery range to another location depending on the size of the room or the location of various control devices to discover the control devices within a location. When the discovery range is increased, decreased, and/or moved, the display provided on the network device 128 may update accordingly. For example, when the discovery range is moved from one location to another location, the network device 128 may show the control devices in the updated discovery range. In addition, or alternatively, when the discovery range is moved from one location to another location, an aggregation of the control devices from each of the discovery ranges may be identified. The devices may be displayed on the network device in an ordered list according to signal strength.

The temperature control device 136 and/or remote control device 154 may be detected by sending a discovery message within the adjusted discovery range 158. The daylight sensor 150, the lighting control devices of the lighting fixtures 146a, 146b, 146c, 146d, and the lighting control devices of the lighting fixtures 138a, 138c may also be in the adjusted discovery range 158. The lighting control devices of the lighting fixtures 138b, 138d and the remote control device 142 may be outside of the adjusted discovery range 158 and may not receive discovery messages transmitted within the adjusted discovery range 158. The control devices outside of the discovery range 158 may transmit (e.g., upon actuation of a button or receipt of a trigger message) discovery information to the load control discovery device 190 and/or the system controller 160, as control devices outside of the discovery range 158 may have a greater transmission power, for example.

A discovery range may be selected that corresponds to the size of the location in which devices are to be discovered. For example, the transmission power of the load control discovery device 190 may be adjusted (e.g., increased or decreased) such that the transmission power of the load control discovery device 190 corresponds to a size of a location. A control device with a greater transmission power may be identified as the load control discovery device 190, to increase the discovery range in larger rooms. Each location may have a size identifier that indicates the size of each respective location. The transmission power of the load control discovery device 190 may be assigned, or a control device with a corresponding transmission power may be identified as the load control discovery device 190, to enable the discovery of control devices in a location having the identified size. The system controller 160 and/or the network device 128 may store the transmission power of the control devices and perform the assignment of the load control discovery device 190 based on the transmission power of the control devices and the size of the location. The size of the location may be entered on the network device 128.

The transmission power of the load control discovery device 190 and/or other control devices may be adjusted (e.g., increased or decreased) by a predetermined amount during the discovery mode. The adjusted (e.g., increased and/or decreased) transmission power may be greater than and/or less than the transmission power of the load control discovery device 190 and/or control devices in operation for controlling electrical loads. The adjusted transmission power during the discovery mode may enable the control devices and/or load control discovery device 190 to discover more and/or less devices, while preserving the power at the control devices and/or load control discovery device 190 during other usage (e.g., communication of load control messages). The adjusted transmission power may be sent from the network device 128 (e.g., directly, or via the system controller 160).

The load control discovery device 190 may communicate with the control devices via one or more intermediary devices. For example, discovery messages may be received at a control device and the acknowledgement and/or signal strength may be communicated via one or more other control devices in the system. The one or more intermediary devices may be used to ensure a greater likelihood that the acknowledgement and/or signal strength are received at the load control discovery device 190. When the control device is transmitting a discovery message to the load control discovery device 190 (e.g., for a one-way communication device), the signal strengths at which each message is received at an intermediary device may be appended to the messages being communicated. The load control discovery device 190 and/or the system controller 160 may add the signal strengths together to determine the relative distance of the control devices.

A control device may interact with other control device and/or store information (e.g., location information, signal strength information, device identifiers, as well as other identification information) of the other control devices. For example, control devices may store information about neighboring control devices to enable the control devices to forward information of the neighboring devices. The neighboring control devices may be the control devices from which digital messages are received with a predefined signal strength. Neighboring control devices may be configured by the network device 128 and/or the system controller 160 and may be communicated to control devices for being stored thereon.

A control device may receive a discovery message and store the signal strength related to the received discovery message. The control device may communicate the signal strength at which the discovery message was received to neighboring devices, which may forward the signal strength to other devices, such as the system controller 160. Control devices that receive the discovery message may also, or alternatively, forward the discovery message to neighboring devices, such that control devices outside of the discovery range 134 may still be discovered. The control device may add the signal strength at which a digital message is received from a neighboring device to the signal strength at which the discovery message was received and report the combined signal strength to the system controller 160.

Control devices may be ordered and/or grouped, according to respective signal strengths. For example, a control device that determines a signal strength of a received discovery message may determine assumed signal strengths of other control devices, based on the control device's determined signal strength. Neighboring control devices may be assumed to have similar signal strengths. Assumed signal strengths of the control devices may be dependent upon where the control devices for which the signal strengths that are being assumed are located within a predefined distance of the source (e.g., the load control discovery device 190) of the discovery message. For example, by determining signal strengths of a control device's neighboring control devices, the system controller 160 may directionally calculate the difference between a control device that is −50 dB away from the system controller 160 and a control device that is −50 dB away from the system controller 160 and −20 dB from control devices that were selected as having satisfactory signal strengths.

Existing association information may be discovered by system controller 160 and/or the load control discovery device 190. The control devices may send association information (e.g., associated device identifiers) that indicates the devices with which the control devices are associated. The association information may be in the discovery messages or in response requests for discovery information. The network device 128 may make a request for a specific control-source device identifier to determine whether a control-target device is associated with a specific control-source device.

The system controller 160 may discover one or more control devices within a broadcast control group. A broadcast control group may include one or more control devices of an identified device type, one or more control devices within a defined location, and/or one or more control devices that share another group characteristic. The group characteristic may be a discovery criteria on which control devices may be filtered for discovery. The control devices in a broadcast control group may be controlled at the same time by the system controller 160. The control devices that are included in a broadcast control group may receive a group identifier and store the group identifier such that the control devices included within the broadcast control group may respond to digital messages that are sent to the group and include the group identifier. For example, the system controller 160 may create a lighting control device group that includes lighting control devices of the lighting fixtures 108a, 108b, 108c, and 108d. The system controller 160 may instruct the lighting control devices of the lighting fixtures 108a, 108b, 108c, and 108d in the lighting control device group to turn on or off, as a group.

Multiple load control discovery devices 190 may be implemented to perform discovery and/or association of control devices. Each of the load control discovery devices 190 may transmit discovery messages to the same devices and/or different devices. The system controller 160 may receive the device identifiers of discovered control devices and/or the signal strength associated with the discovered devices and remove duplicate device identifiers. The system controller 160 may keep the associated signal strength of a device identifier that is the greatest signal strength. The system controller 160 may organize the device identifiers (e.g., in an ascending or descending list by signal strength) after the duplicate device identifiers have been removed, or the system controller 160 may remove the organized device identifiers that have the lower signal strengths.

The system controller 160 may discover when the established discovery range 134, 158 overlaps with the established range of another load control discovery device 190. For example, the system controller 160 may discover that the established discovery range 134, 158 overlaps with the established range of another load control discovery device 190 when the system controller 160 receives duplicate information from the same device. The system controller 160 may adjust one or more of the discovery ranges to avoid the overlap or may indicate the overlap to the user 132 on the network device 128.

The load control discovery devices may be in communication with one another (e.g., directly in communication with one another or via the system controller 160). The load control discovery device 190 may discover an overlap of established discovery range 134, 158 with the established range of another load control discovery device 190 when the load control discovery device 190 receives a discovery message. The load control discovery device 190 may adjust the discovery range 134, 158 or indicate the overlap to the system controller 160 and/or the network device 128.

Figure 2:
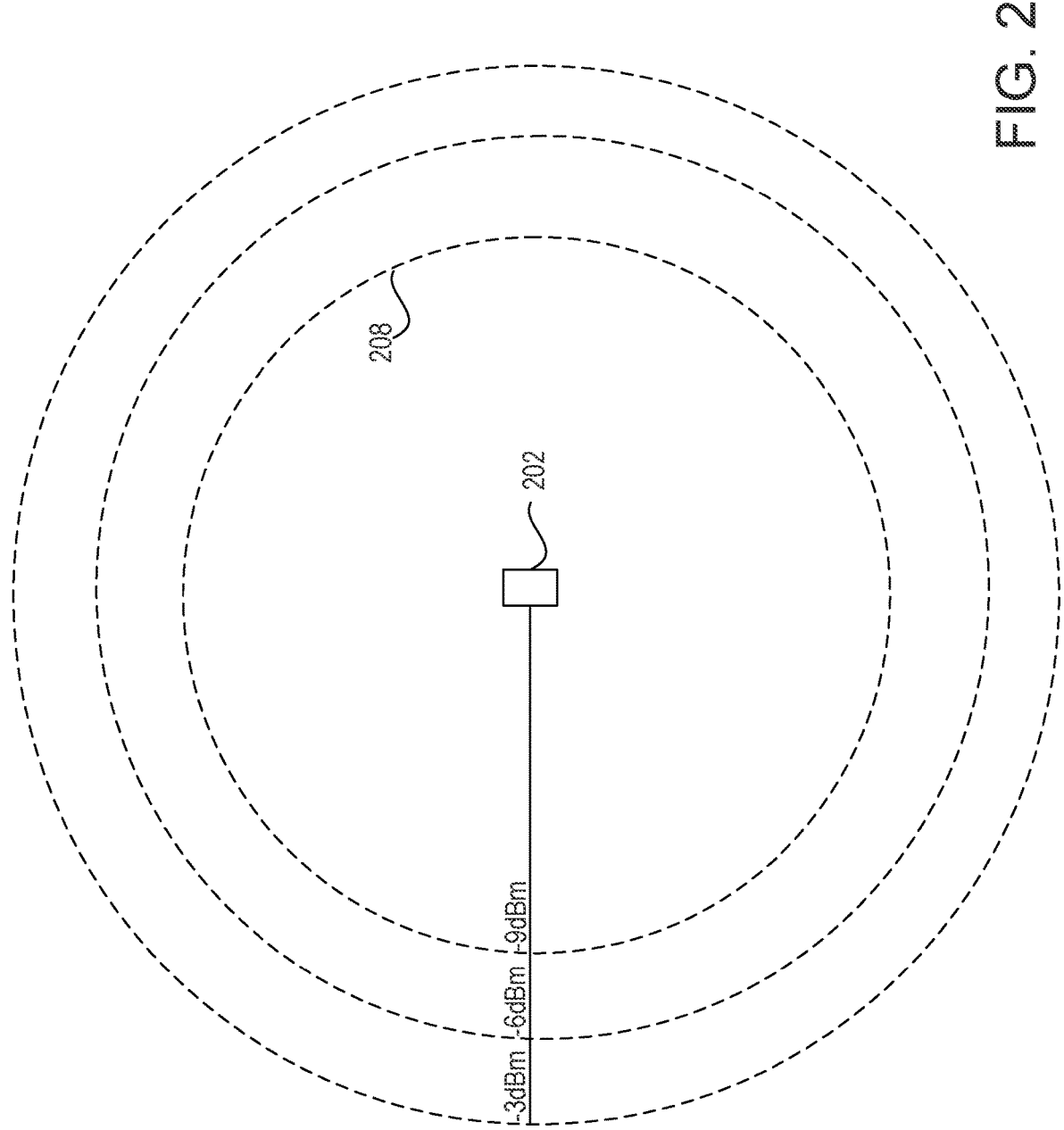
FIG. 2 is a diagram of example discovery ranges for performing discovery and/or association of control devices.

FIG. 2 is a diagram depicting example discovery ranges for performing discovery and/or association of control devices. As shown in FIG. 2, the established discovery range 208 may be adjustable. A user may increase or decrease the established discovery range 208 (e.g., between −3 dBm and −9 dBm) to discover and/or associate control devices within a larger or smaller area. The established discovery range 208 may be measured from a load control discovery device 202. The established discovery range 208 may be determined based on the distance the load control discovery device 202 is configured to transmit and/or receive information. The established discovery range 208 may be determined by adding to, or subtracting from, the distance that the load control discovery device 202 is configured to transmit and/or receive information.

The discovery range 208 may be established by adjusting the signal strength (e.g., transmission power) of the signal transmitted by the load control discovery device 202, and/or by adjusting a threshold value (e.g., the reception power threshold value). For example, the signal strength may be increased or decreased between −9 dBm and −3 dBm. The reception power threshold value may be increased or decreased, e.g., from −9 dBm to −7 dBm. The load control discovery device 202 may broadcast discovery messages to, and/or receive messages from, control devices within the established discovery range 208 and/or within the predefined reception power threshold. The load control discovery device 202 may determine the control devices within the established discovery range 208 and/or the reception power threshold based on the response messages received from control devices. Other devices, such as a system controller, a network device, or a control device receiving the discovery message, may determine whether the control device is within the established discovery range 208 and/or the reception power threshold based on the response message received from control device.

The discovery range 208 may be established (e.g., at the load control discovery device 202, the system controller, or the network device) by disregarding information received from control devices outside of the discovery range 208. For example, the load control discovery device 202 may have a static signal strength of −3 dBm and the established discovery range 208 may be −9 dBm. In this case, the load control discovery device 202 may broadcast a discovery message to, and response messages may be received from, control devices within the −3 dBm area. The distance of each control device may be determined based on the received signal strength of messages from the control device. When the received signal strength of a control device is below a threshold (e.g., the reception power threshold), the control device may be determined to be outside of the established discovery range 208 (e.g., between −9 dBm and −3 dBm) and may be disregarded as a discovered device.

Figure 3:
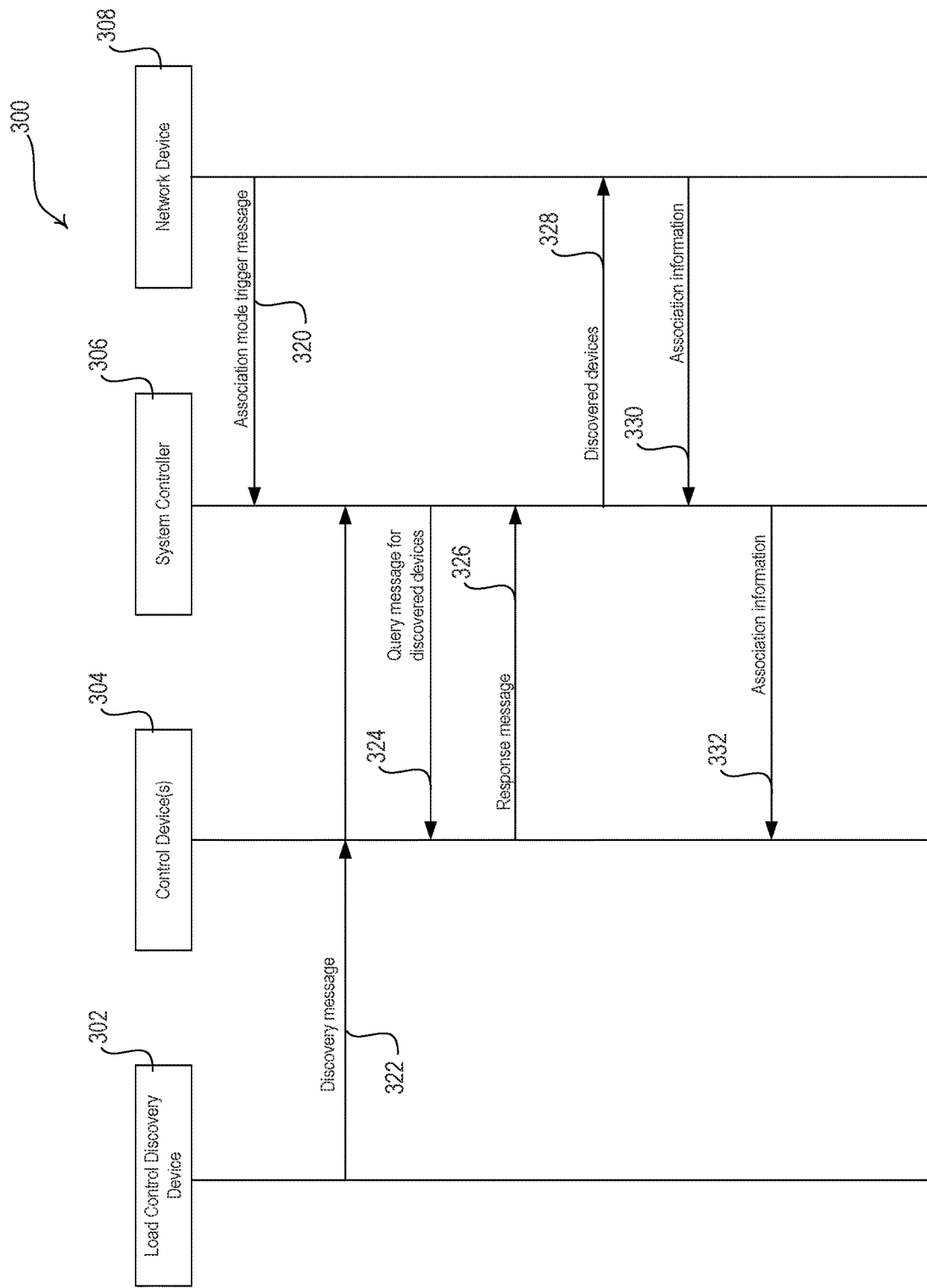
FIG. 3 shows an example flowchart of an example discovery procedure for discovering and associating control devices.

FIG. 3 shows an example flowchart of an example discovery procedure 300 as described herein. The discovery procedure 300 may allow for discovery and/or association of one or more control devices (e.g., control-source devices and/or control-target devices) for one or more areas in a building, for example. The discovery procedure 300 may be performed for specific areas in a building to enable association of one or more control-source devices in an area with one or more control-target devices in that area such that the control-source devices may control the control-target devices in that area, and may further include configuring a system controller such that the system controller may control the discovered devices (e.g., automatically through scheduled programs, through user input via a network device, etc.) in each specific area.

Discovery procedure 300 may be implemented using one or more devices, such as one or more control devices 302 and/or 304 (e.g., control-source devices and/or control-target devices), a system controller 306, and/or a network device 308. The network device 308 may interface/communicate over a communications network with the system controller 306 over a web based interface, for example, that is provided by the system controller 306 (although other interfaces may be used). The system controller 306 may in turn communicate with control devices 302 and/or 304 over a communications network that may be the same or different network as used by the network device 308. The control devices 304 may be control-source devices (e.g., one or more remote control devices, occupancy sensors, a daylight sensors, window sensors, etc.) and/or control-target devices (e.g., one or more lighting control devices of lighting fixtures, motorized window treatments, temperature control devices, AC plug-in load control devices, etc.). One of the control devices 304 may be assigned as the load control discovery device 302, which may be operable to communicate with the other control devices 304 and/or the system controller 306. The procedure 300 may include additional, fewer, or other devices and/or messages as discussed herein. The procedure 300 may include steps in other orders.

As shown in FIG. 3, an association mode trigger message may be communicated, at 320, to the system controller 306 to put the system controller 306 in an association mode. The system controller 306 may alternatively be put in association mode by actuation of a button on the system controller 306 and/or by an association mode trigger message received from another device, such as a control device 304, for example. During the association mode at the system controller 306, the system controller 306 may listen for discovery messages from load control discovery devices.

A discovery message may be communicated, at 322, from a load control discovery device 302. The discovery message may include the unique identifier of the load control discovery device 302. Communication of the discovery message by the load control discovery device 302 by may be triggered by actuation of a button on the load control discovery device 302, receipt of a discovery trigger message from another device (e.g., from the system controller), or another trigger. The discovery message communicated at 322 may be a broadcast message received by the one or more control devices 304 and/or the system controller 306. In response to receiving the discovery message, the one or more control devices 304 may compute an RSSI value of the discovery message. In response to receiving the discovery message communicated at 322, the system controller 306 may broadcast a query message at 324 looking for devices that have received the discovery message from the load control discovery device 302. The query message may include a unique identifier of the load control discovery device 302 and may request devices to respond indicating whether the devices received the discovery message from the identified load control discovery message. The query for the discovered devices may include discovery criteria for discovering control devices that meet the discovery criteria. The discovery criteria may include the RSSI or signal strength at which the discovery message was received, an amount of time since power up of the device, a load state (e.g., on state, off state, dimming level, etc.) of an electronic load controlled by a control device, an occupancy state or a level of activity identified by an occupancy sensor, identification of a previously associated location and/or device, and/or another discovery criteria. The discovery criteria may be used to narrow down a large group of devices to reduce a group of discovered devices that may be communicating at the same time on the network. The discovery criteria may also be user selected to enable the user to reduce the list of devices being discovered for association.

In addition to comparing the identifiers as received in the discovery message and query message to determine if they should respond to the query, the control devices 304 that also meet the discovery criteria may respond to the query at 326. The response may include the computed RSSI value and a unique identifier of the control device. Each control device may communicate its respective response message at a random time. Though the discovery criteria may be described as being in the query message sent at 324, the discovery criteria may be indicated in the discovery message sent at 322 or may be otherwise pre-stored in the control devices 304. The system controller 306 may identify the control devices 304 that responded at 326 and generate an organized dataset of the discovered control devices for being sent to the network device 308. The organized dataset may be a list of the discovered devices in an ascending or descending order based on RSSI value. The organized dataset may include the unique identifier of each of the discovered devices, or a subset thereof. The devices may be relatively organized by signal strength of the RSSI value or according to other discovery criteria.

The system controller 306 may provide the discovered devices, at 328, to the network device 308. The discovered devices may be provided via a display on a web interface, or the discovered devices may be provided, at 328, via other digital messages that are used to display an interface locally at the network device 308. Though the system controller 306 may be described as generating the organized dataset of the discovered devices, the discovered devices may be provided, at 328, to the network device 308 with the responses to the discovery criteria and/or the network device 308 may generate the organized dataset of the discovered devices locally.

The network device 308 may generate association information that includes an association of the discovered devices. For example, the network device 308 may receive user selections of control-source devices and control-target devices for being associated for a defined area. The network device 308 may also, or alternatively, receive user selections of control-source devices or control-target devices for being associated with the load control discovery device 302 that is assigned for a defined area. The association information may be sent to the system controller 306 at 330 for being stored locally thereon. The association information, or portions thereof, may be sent at 332 to the control devices 304 for enabling communication of messages between associated devices.

As described in the discovery procedure 300, a load control discovery device 302 may be used to send a discovery message to control devices 304 in a given area and the discovered devices may be displayed to a user on a network device 308 for commissioning the system. The association information, or portions thereof, may be used by the system controller 306 for relaying digital messages to the appropriate devices within the load control system. The association information may be used by the control devices 304 for identifying messages to which the control devices 304 may respond. The load control discovery device 302 may be a control device capable of sending and/or receiving digital messages for controlling an electrical load. The load control discovery device 302 may be assigned based on the device's proximity within an area (e.g., to discover devices in the area to which the load control discovery device has a relatively closer proximity). The use of a control device in the system for discovering other devices and enabling the display of the discovered devices on the network device 308 in a manner that indicates the relative proximity of the devices according to the discovery criteria enables for efficient discovery and association of devices while commissioning of the system.

Figure 4:
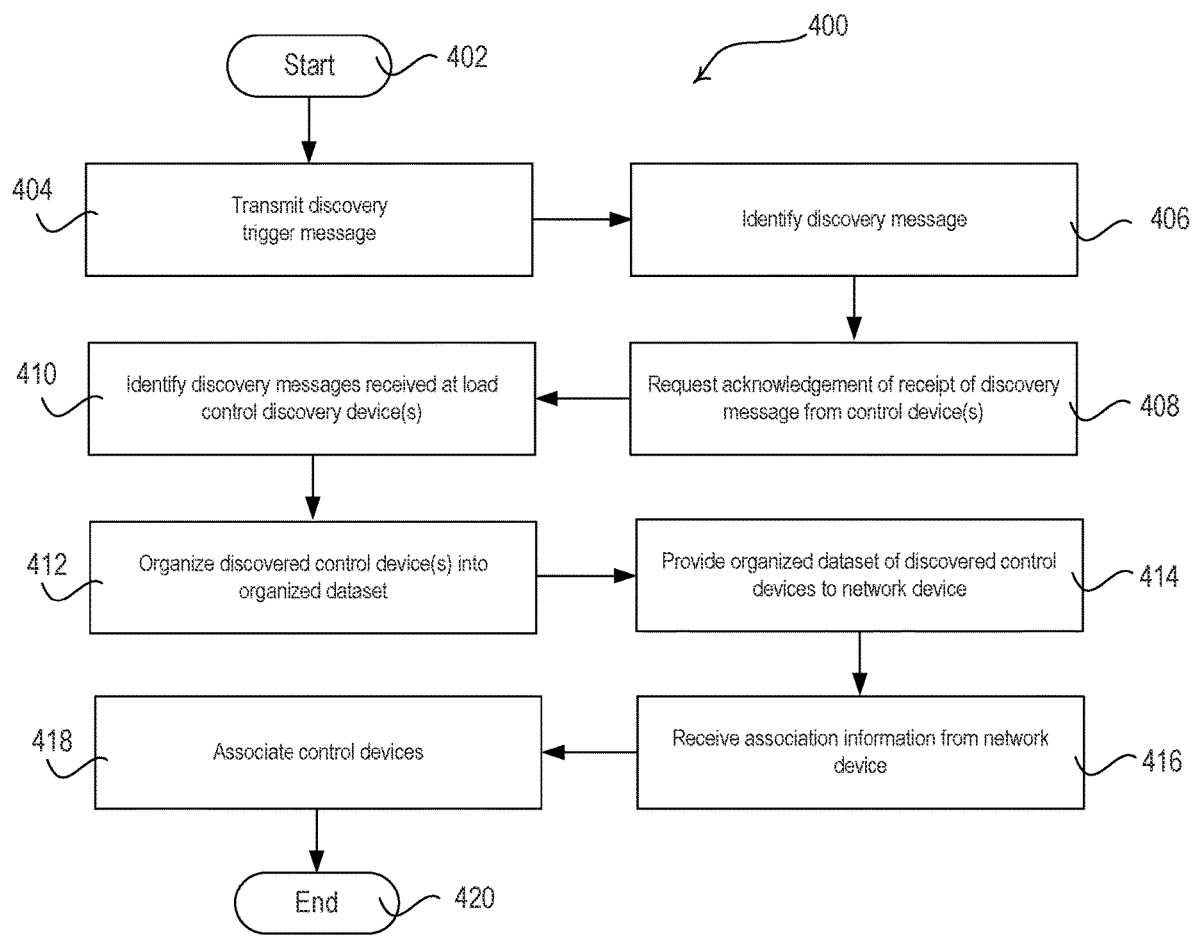
FIG. 4 is a flow diagram of an example method for discovering and associating control devices.

FIG. 4 is a block diagram depicting an example method 400 for discovery and association of control devices. As shown in FIG. 4, the method 400 may begin at 402. At 404, a discovery trigger message may be transmitted. The discovery trigger message may be sent by a system controller, such as the system controller 160, 306. For example, the discovery trigger message may be sent by the system controller 160, 306 upon receipt of an indication from a network device 128, 308. The control devices 304 may identify the discovery trigger message and enter a discovery mode to listen for discovery messages, or a separate message may be sent from the system controller 160, 306 to enter the control devices 304 into a discovery mode.

The transmission of the discovery message may be identified at 406. The discovery message may be identified by the system controller 160, 306 upon receipt. The system controller 160, 306 may request acknowledgement of receipt of the discovery message at 408. The control devices 304 that received the discovery message, or received the discovery message above a predefined threshold (e.g., the reception power threshold), may acknowledge receipt of the discovery message by communicating a digital message with the identifier of the control device 304 and/or the signal strength at which the discovery message was received (e.g., the RSSI) at 408.

The system controller 160, 306 may identify the discovery messages received at the load control discovery device 190, 202, 302 at 410. For example, the one-way communication devices may communicate a discovery message that includes the device identifier of the transmitting device to the load control discovery device 190, 202, 302 to be discovered. The load control discovery device 190, 202, 302 may store the signal strength at which the discovery messages are received and may provide the device identifiers of the control devices 304 from which the messages were received and the corresponding signal strengths to the system controller 160, 306. In another example, the system controller 160, 306 may identify the discovery messages received from the one-way communication devices and the signal strength at which the devices were received. Though method 400 may describe the identification of discovery messages and coordination of control devices 304 as being performed at the system controller 160, 306, such functionality may be implemented by other devices (e.g., by the control devices 304, etc.).

At 412, the system controller 160, 306 may organize the discovered control devices 304 into an organized dataset.

The organized dataset may be a list of device identifiers and/or the corresponding signal strengths. The identifiers of the discovered devices may be ordered according to signal strength (e.g., ordered from highest signal strength to lowest signal strength). The system controller 160, 306 and/or the network device 128, 308 may remove the control devices 304 that have a corresponding signal strength that is below a predefined threshold (e.g., the reception power threshold) from the organized dataset. The system controller 160, 306 and/or the network device 128, 308 may include the control devices 304 that have a corresponding signal strength that is above a predefined threshold in the organized dataset. The organized dataset may be determined by the network device 128, 308 or the organized dataset may be provided to the network device 128, 308 at 414 by the system controller 160, 306. For example, the organized list of device identifiers and/or the corresponding signal strengths may be provided to the network device 128, 308.

The system controller 160, 306 may receive association information from the network device 128, 308 at 416. Control devices 304 may be associated with one another via a command on the network device 128, 308. For example, the network device 128, 308 may have a push button (e.g., soft button or hard button) for associating one control device (e.g., control-source device) with another control device (e.g., control-target device). The network device 128, 308 may provide a push button for control devices that have signal strengths above a predefined threshold. A user may associate a control device with another control device by selecting the respective control devices displayed on the network device 128, 308, and/or the user selecting the associate push button on network device 128, 308.

The association information received from the network device 128, 308 may include associations of device identifiers with location identifiers. The association information may also include associations between control devices 304. The system controller 160, 306 may also, or alternatively, receive control configuration information from the network device 128, 308 that includes preset control instructions for identified control devices 304. The system controller 160, 306 may associate the control devices 304 at 418. For example, the system controller 160, 306 may store the association information locally and/or transmit associated device identifiers to control devices 304 for being stored locally thereon. The control configuration information may also be stored at the system controller 160, 306 and/or at the corresponding control devices 304. The method 400 may end at 420.

Figure 5:
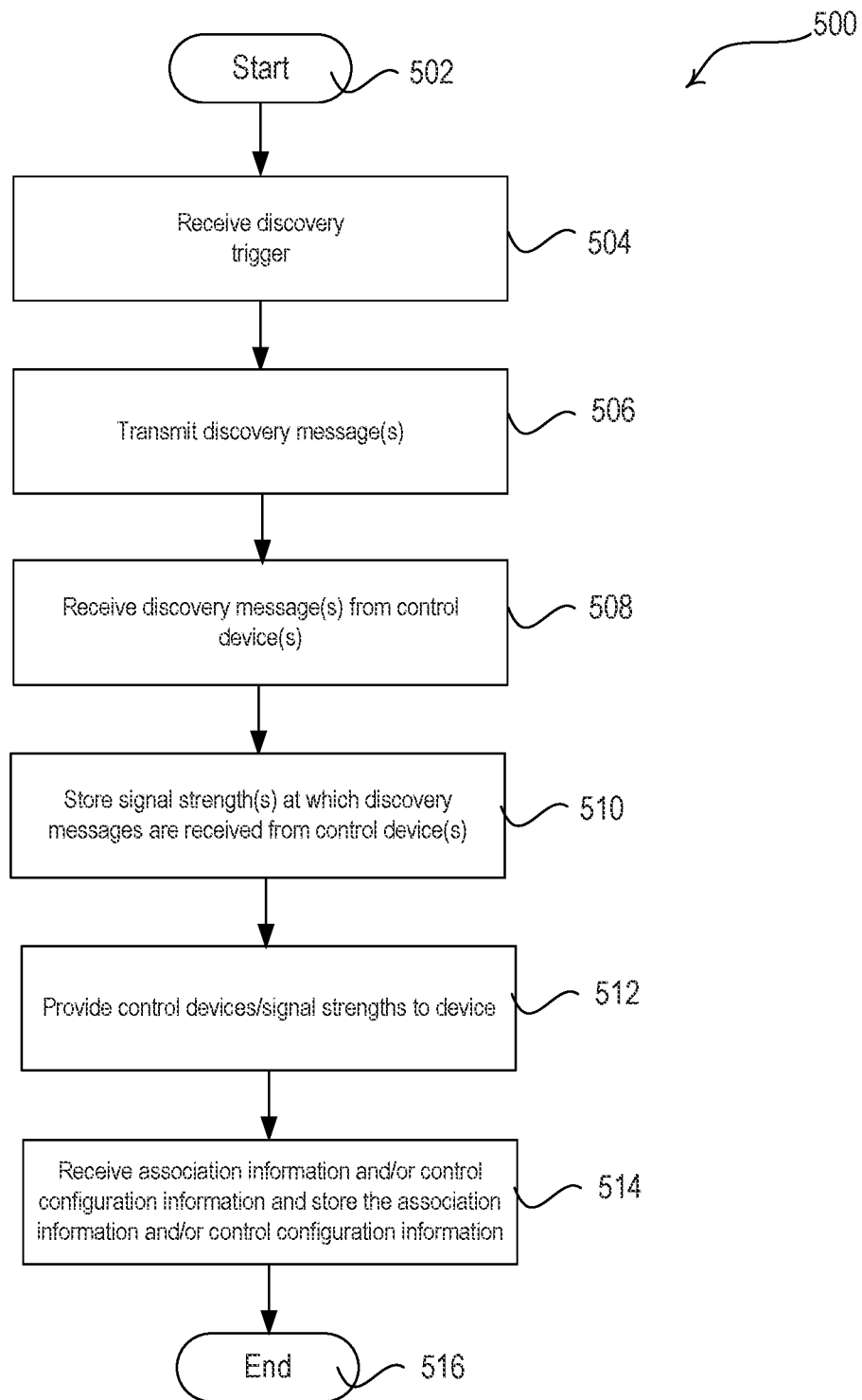
FIG. 5 is a flow diagram of an example discovery procedure for discovering and associating control devices.

FIG. 5 is a block diagram depicting an example method 500 for discovery and association of control devices. As shown in FIG. 5, the method 500 may begin at 502. At 504, a discovery trigger may be received. The discovery trigger may be received, e.g., as a message by the load control discovery device 190, 202, 302 and/or as an actuation of a button of the load control discovery device 190, 202, 302. The discovery trigger may indicate the discovery range for transmitting discovery messages or the discovery range may be preconfigured. For example, the discovery message may indicate the size of the location in which the control devices are being discovered, or the discovery range may be explicitly identified. The discovery range may be established by configuring a wireless signal to cover a defined area or by disregarding information obtained from outside of the defined area, for example.

The load control discovery device 190, 202, 302 may transmit, at 506, discovery messages. The load control discovery device 190, 202, 302 may transmit the discovery messages at an identified transmission power (e.g., identified in the discovery trigger message, predefined locally, etc.). Discovery messages may include an identifier of the load control discovery device 190, 202, 302 and/or a location identifier for a defined location. The discovery messages may include a discovery message identifier identifying the message as a discovery message. The discovery message may be the association message for the control device identified as the load control discovery device 190, 202, 302. The discovery message may identify a discovery range from the discovery trigger message and/or local storage. The discovery messages may be sent directly from a load control discovery device 190, 202, 302. For example, the load control discovery device 190, 202, 302 may send the discovery messages to control devices 304 in response to the load control discovery device 190, 202, 302 receiving the discovery trigger message at 504.

The load control discovery device 190, 202, 302 may receive discovery messages from control devices 304 at 508. For example, the load control discovery device 190, 202, 302 may receive discovery messages from one-way communication devices and/or control devices outside of the discovery range. The discovery messages may also, or alternatively, be sent in response to a request from the load control discovery device 190, 202, 302. The discovery messages may include a device identifier of the control device 304 from which the discovery messages are transmitted. The discovery messages may be the association message from the control devices 304.

The load control discovery device 190, 202, 302 may identify and store the signal strength at which the discovery messages are received from the control devices 304 at 510. The signal strengths may be identified by an RSSI at which the discovery messages are received. At 512, the control device identifiers of the control devices 304 from which the discovery messages have been received may be provided to the system controller 160, 306. The signal strengths at which the discovery messages are received at the load control discovery device 190, 202, 302 may also be provided to the system controller 160, 306. The control device identifiers and/or the signal strengths may be provided in response to a request from the system controller 160, 306. The control device identifiers and/or the signal strengths may also, or alternatively, be provided to the network device 128, 308 (e.g., in response to a request) when the network device 128, 308 and the load control discovery device 190, 202, 302 communicate via the same communication signals. The signal strengths may be organized in a list (e.g., ordered from highest signal strength to lowest signal strength) at the system controller 160, 306. The control devices 304 and/or signal strengths may be provided in the organized list (e.g., ordered from highest signal strength to lowest signal strength) to the network device 128, 308.

The system controller 160, 306 may receive association information and/or control configuration information from the network device 128, 308 and store the association information and/or control configuration information at 514. The association information and/or control configuration information may be configured by user selections at the network device 128, 308. The system controller 160, 306 may send the updated association information and/or control configuration information to the respective devices. The system controller 160, 306 may use the association information and/or control configuration information to send digital messages to control electrical loads in a load control environment. The method 500 may end at 516.

Though the signal strengths may be implemented in the method 500 as the discovery criteria for discovering control devices, other discovery criteria may also, or alternatively, be implemented. The system controller 160, 306 may discover an initial set of control devices using an initial discovery criteria. The system controller 160, 306 and/or the network device 128, 308 may further filter the discovered devices using subsequent discovery criteria. The discovery criteria may be prompted to the user at the network device 128, 308 and the discovered devices may be further filtered based on each criteria selected by the user.

Figure 6:
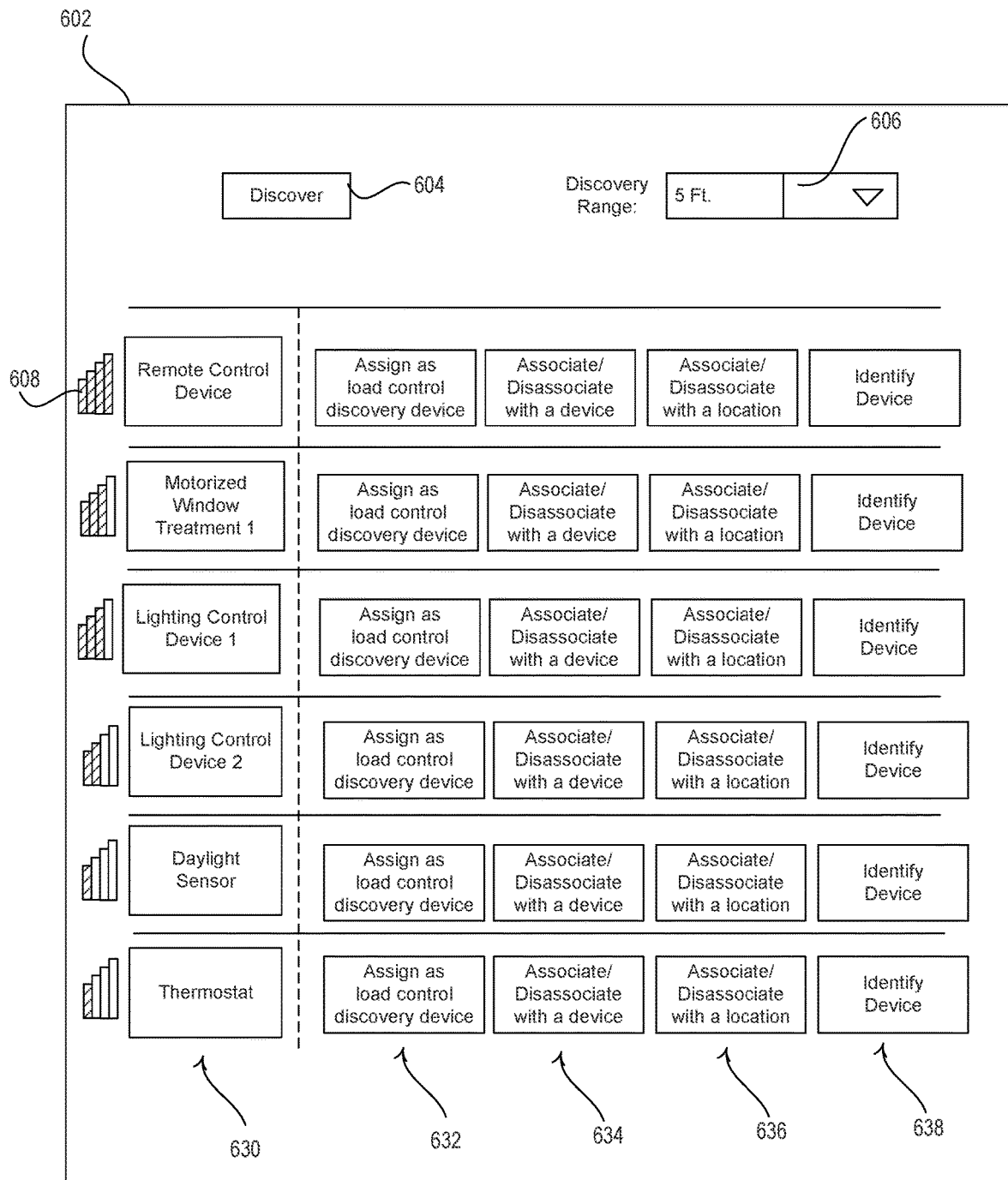
FIG. 6 is an example graphical user interface (GUI) that may be implemented for discovery and/or association of control devices.

FIG. 6 depicts an example graphical user interface (GUI) 602 that may be used to perform associations of control devices at a network device, such as network device 128, 308. As shown in FIG. 6, the example GUI 602 may present options for selection by a user. Though the options may be presented to a user via buttons in the GUI 602, the options may be presented via drop-down lists, check boxes, etc. The options may include an option for selecting a device, an option for assigning the device as a load control discovery device 190, 202, 302 an option for assigning the device with another device, an option for assigning the device with a location, and/or an option for identifying the device. Devices may relate to control devices (e.g., control-source devices and/or control-target devices).

The GUI 602 may include a list of discovered control devices 630. The list of discovered control devices 630 may be displayed in response to selection of a discovery button 604. The discovery button 604 may be selected for requesting (e.g., to the system controller 160, 306 and/or the load control discovery device 190, 202, 302) discovery of control devices within a discovery range 606. Devices in the discovery range 606 may be organized in an organized dataset according to signal strength. For example, the control devices may be ordered on the network device 128, 308 according to signal strengths (e.g., ordered from highest signal strength to lowest signal strength). The network device 128, 308 may display the control devices that have a corresponding signal strength that is above a predefined threshold in the organized dataset. The control devices may be displayed with a corresponding signal strength indicator 608 that indicates the relative signal strength of the discovered control devices 630. The discovered control devices 630 may be displayed to indicate the device type and/or whether the device is a control-target device and/or a control-source device. The load control discovery device 190, 202, 302 may be included in the discovered control devices 630 for being associated with locations and/or devices.

The GUI 602 may display a corresponding load control discovery device assignment button 632 for one or more of the discovered control devices 630. The load control discovery device assignment button 632 may be selected by a user to assign the corresponding discovered control device 630 as the load control discovery device 190, 202, 302 at the network device 128, 308. The network device 128, 308 may communicate messages to other devices (e.g., system controller 160, 306, the identified load control discovery device 190, 202, 302, other control devices, etc.) to identify the assigned control device 630 as the load control discovery device 190, 202, 302. For example, assigning the remote control device 116 as load control discovery device 190, 202, 302 may designate that remote control device 116 be transmitter and/or originator of a discovery message, as described herein.

A control device that has been assigned as the load control discovery device 190, 202, 302 may be removed from being the load control discovery device 190, 202, 302 by selecting the load control discovery device assignment button 632. When the load control discovery device assignment button 632 is selected for an identified load control discovery device 190, 202, 302, the network device 128, 308 may communicate messages to other devices (e.g., system controller 160, 306, the identified load control discovery device 190, 202, 303, other control devices, etc.) to remove the identification of the control device 630 as the load control discovery device 190, 202, 302.

The user may select the discovery range 606 for the load control discovery device 190, 202, 302. The discovery range 606 may be established using a dropdown box or other button (not shown) on the GUI 602. Referring again to FIG. 1, assigning the remote control device 116 as the load control discovery device 190, 202, 302 may designate that the discovery range 134 be centered on the remote control device 116. For example, if the load control discovery device assignment button 632 is selected that corresponds to the remote control device, the discovery range 134 may be sent to the system controller 160, 306 and/or the remote control discovery device 116 for calculating the transmission power or receive threshold for the discovery range of discovery messages transmitted from the load control discovery device 190, 202, 302. The options for the discovery range 606 may change depending on the type of device or devices being assigned as the load control discovery device 190, 202, 302. The discovery range 606 may be configurable based on the transmission power of the device listed and/or selected as the load control discovery device 190, 202, 302. For example, if the device listed and/or selected is capable of transmitting and/or receiving transmissions up to a distance of twenty feet, the discovery range 606 may be established between zero and twenty feet, or at a predefined number of locations corresponding to the selected device.

As shown on FIG. 6, the GUI 602 may include a device association button 634 for one or more of the discovered control devices 630. The device association button 634 may be selected by a user to associate the corresponding discovered control device 630 with other control devices. For example, the device association buttons 634 that correspond to the remote control device and the motorized window treatment may be selected to associate the device identifiers of the discovered remote control device and the motorized window treatment. The network device 128, 308 may communicate messages to other devices (e.g., the system controller 160, 306, the associated devices, other control devices, etc.) to identify the association.

The GUI 602 may identify control-source devices and control-target devices and may allow association between control-source devices and control-target devices. The GUI 602 may disallow association between the same type of devices (e.g., control-source devices and control-source devices, control-target devices and control-target devices, etc.).

The device association button 634 may be selected by a user to disassociate previously associated control devices 630. When the device association button 634 is selected for discovered control devices 630 that are already associated or selected for being associated, the association may be removed and the network device 128, 308 may communicate messages to other devices (e.g., the system controller 160, 306, the associated devices, other control devices, etc.) to remove the association. The associated devices may be indicated such that the user may remove the associations.

The discovered control devices 630 may be selected to identify other association information for the selected control device. For example, the discovered control devices 630 may be selected to identify device identifiers of devices with which the selected control device is currently associated, which may include undiscovered devices. The user may select one or more of the device identifiers and the device association button 634 of a corresponding discovered control device 630 to associate or disassociate the discovered control device 630 with the selected devices. The network device 128, 308 may communicate messages to other devices (e.g., the system controller 160, 306, the associated devices, other control devices, etc.) to update the association information.

The GUI 602 may include a location association button 636 for one or more of the discovered control devices 630. The location association button 636 may be selected by a user to associate the corresponding discovered control device 630 with a location. For example, referring again to FIG. 1, remote control device 116 may be associated with a conference room (e.g., conference room A), a living room, etc. The location may be a preconfigured location (e.g., such as the predefined location of the load control discovery device 190, 202, 302) or the user may be prompted to select the location for assignment. The network device 128, 308 may communicate messages to other devices (e.g., the system controller 160, 306, the associated devices, other control devices, etc.) to identify the association with the location. The location association may be included in the association information for a device and may be updated with the device association.

The location association button 636 may be selected by a user to disassociate a discovered control device 630 with previously associated locations. When the location association button 636 is selected for discovered control devices that are already associated with a location or are selected for being associated with a location, the association may be removed and the network device 128, 308 may communicate messages to other devices (e.g., the system controller 160, 306, the associated devices, other control devices, etc.) to remove the association with the location.

The discovered control devices 630 may be selected to identify other locations with which the discovered control devices 630 are associated. For example, the discovered control devices 630 may be selected to identify location identifiers of locations with which the selected control device is currently associated. The user may select one or more of the location identifiers and the device association button 634 of a corresponding discovered control device 630 to associate or disassociate the discovered control device 630 with the selected location. The network device 128, 308 may communicate messages to other devices (e.g., the system controller 160, 306, the associated devices, other control devices, etc.) to update the association information.

The GUI 602 may include a device identification button 638 for one or more of the discovered control devices 630. The device identification button 638 may be selected by a user to identify the corresponding discovered control device 630 to the user. Selection of the device identification button 638 for a corresponding device may cause the network device 128, 308 to send a digital message to the system controller 160, 306 and/or the device for which the device identifies itself to the user. The digital message may include load control instructions that correspond to the control device for controlling an electrical load (e.g., controlling a corresponding electrical load, turning on an LED on the device, turning off an LED on the device, flashing the LED on the device, performing an audible identification, etc.) to identify the device. Alternatively, the digital message may be a request for the device to identify itself and the system controller 160, 306 and/or the device may determine the load control instructions locally.

The device may be identified for configuration and/or association. For example, upon selecting the device identification button 638 corresponding to the remote control device on the GUI 602, the remote control device may be instructed to identify itself to a user. The remote control device may identify itself visually or audibly. A light control device may identify itself by flashing a corresponding lighting fixture. A thermostat may identify itself by flashing an indicator light, providing a message on the thermostat display, and/or providing an identification via the HVAC system controlled by the thermostat. The thermostat may provide an indication via the HVAC system by turning the HVAC system on or off, increasing or decreasing the temperature of the HVAC system, or the like. A motorized window treatment may identify itself by moving the corresponding covering material that it controls.

Though the GUI 602 includes a corresponding button 632, 634, 636, 638 for each of the discovered control devices 630 to identify selection of the corresponding function for an identified device, the GUI 602 may include one or more load control discovery device assignment buttons 632, device association buttons 634, location association buttons 636, and/or device identification buttons 638. For example, the GUI 602 may include a single load control discovery device assignment button 632, device association button 634, location association button 636, and/or device identification button 638, which correspond to the discovered control devices 630 and/or an identified location. The discovered control devices 630 may be displayed as buttons to be selected to identify the device and the buttons 632, 634, 636, 638 may be selected to indicate the corresponding function for the identified device.

Figure 7:
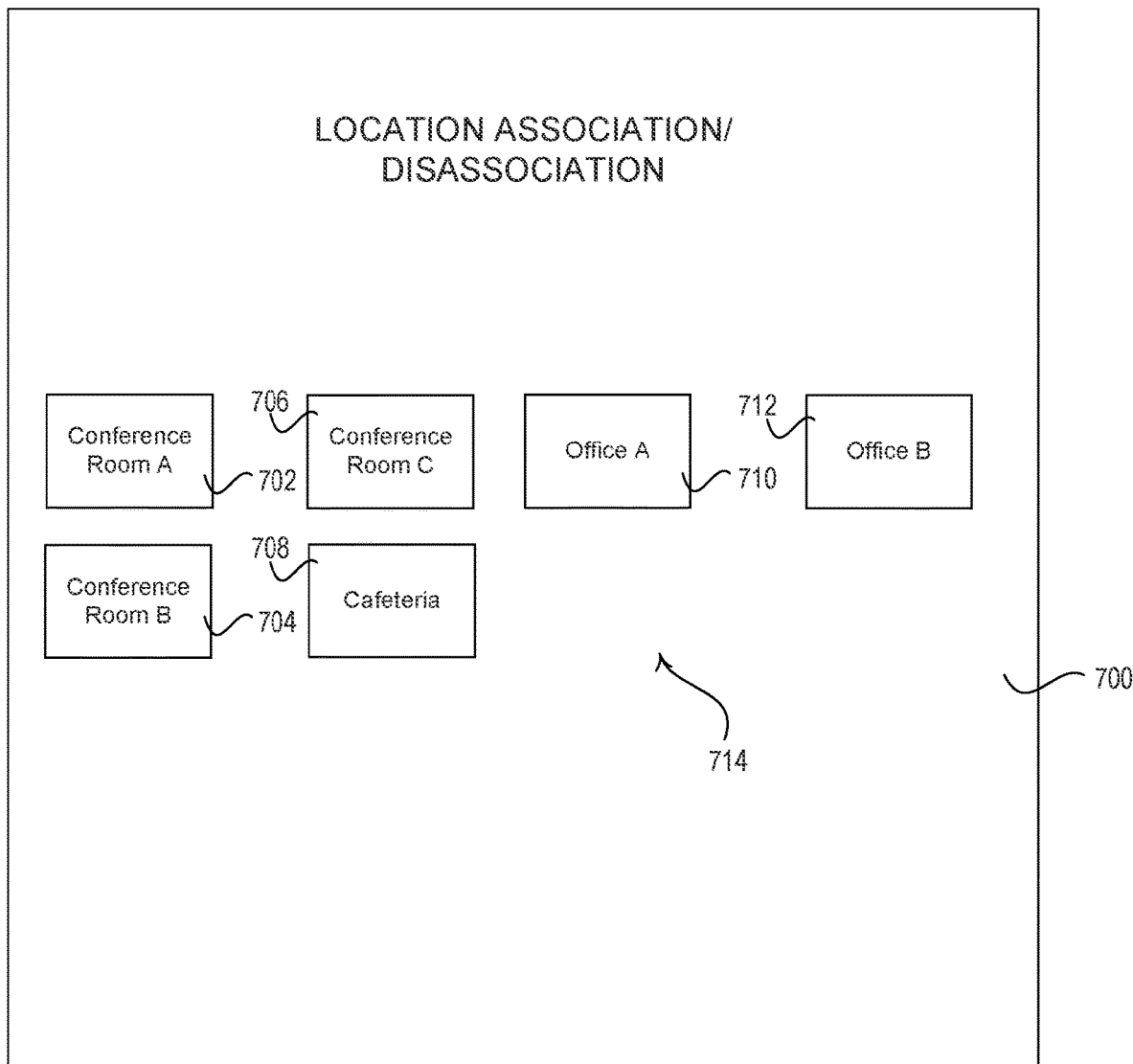
FIG. 7 is an example GUI that may be implemented for discovery and/or association of control devices with a location.

FIG. 7 depicts an example graphical user interface (GUI) 700 that may be used to perform location association at a network device, such as the network device 128, 308 for example. The GUI 700 may be used to select a location 714 with which a discovered control device may be associated or disassociated. For example, the GUI 700 may be displayed at the network device 128, 308 upon selecting location association button 636 (shown in FIG. 6). Different locations 714 may be displayed on the GUI 700 for being associated with control devices. The locations 714 may be displayed by name and/or by identifier.

The locations 714 may be displayed to indicate the identity and/or category of the location. For example, as shown in FIG. 7, the locations 714 may include conference rooms (e.g., conference room A 702, conference room B 704, conference room C 706, etc.), cafeteria 708, offices (e.g., office A 710, office B 712, etc.), and/or the like. The locations 714 may be presented as buttons that a user may select for associating a discovered control device with one or more of the locations 714.

FIGS. 8A-8J illustrate example graphical user interfaces (GUIs) that may be displayed by a visual display of a network device (e.g., the visual display 110 of the network device 128 shown in FIG. 1) during an area configuration procedure. The GUIs may be displayed via a web interface (e.g., generated by a system controller or other remote device) and/or a control application executed by the network device. The area configuration procedure illustrated in the GUIs may allow a user to associate one or more control-source devices (e.g., input devices, such as the remote control device 116, the remote control device 142, the remote control device 154, the occupancy sensor 112, and/or the daylight sensor 150 shown in FIG. 1) with one or more control-target devices (e.g., the lighting control devices in the lighting fixtures shown in FIG. 1, the motorized window treatment 120, the plug-in load control device 124, the temperature control device 136 shown in FIG. 1) in a specific area.

As shown in FIG. 8A, a user interface 800 may be displayed during an area configuration procedure on a network device. The user interface 800 may allow the user to select an option 802 (e.g., a "Create an area" option) on the network device to create an area in a load control system. The area may be defined for associating and controlling devices in the system. The network device may assign a name (e.g., a unique name) to the area being configured. The network device may receive a name in an area name text field 812 of an area name screen 810 as shown in FIG. 8B.

The network device may receive the type of control-source device (e.g., the type of input device) to associate with one or more of the control-target devices (e.g., the lighting control devices of the lighting fixtures) in the defined area from an input device selection screen 820, shown in FIG. 8C. For example, the network device may display the input device selection screen 820 from which the user may select a remote control device option 822 (e.g., a Pico® remote control device option), an occupancy sensor option 824, or a daylight sensor option 826. The remote control device option 822 may allow a user to select a type of remote control device to be added to the defined area. The occupancy sensor option 824 may allow a user to select a type of occupancy sensor to be added to the defined area. The daylight sensor option 826 may allow a user to select a type of daylight sensor to be added to the defined area. The types of devices may be predefined for each option as devices that may be configurable within the system. The input device selection screen 820 may include an option 828 indicating that none of indicated devices may be included in the area. If none of the indicated devices are included in the area, the network device may request the system controller to again query the control devices to identify devices that received the discovery message. The signal strength of the query may be changed to incorporate a larger range in an attempt to discover other devices.

The input device options may allow the user to select the type of device to be assigned as the load control discovery device. The network device may display a button actuation instruction screen 830, as shown in FIG. 8D, to assign the device as the load control discovery device and/or transmit a discovery message. The button actuation instruction screen may include an image 832 illustrating to the user instructions for entering the discovery mode for the selected device. The image 832, for example, may instruct the user to actuate a button of the selected input device after which the user may press and hold the appropriate button of the input device located in the area. For example, if the remote control device option 822 is selected on the input device selection screen 802, the image 832 of the button actuation instruction screen 830 may be an image of a remote control device (e.g., a 5-button Pico® remote control device) instructing the user to press and hold the bottom button of the remote control device for the defined period of time (e.g., six seconds), as shown in FIG. 8D. The selected device may send a discovery message upon performance of the instructions for discovering control devices in the area.

The network device may display one or more alternate device options 834 for the identified device type. The alternate device options 834 may each be selected to change the image 832 on the button actuation instruction screen 830 to an image of the selected remote control device and corresponding instructions for the device. The remote control devices may have a different number of buttons and appropriate instructions for the identified remote control device may be displayed. If the occupancy sensor option 824 or the daylight sensor option 826 is selected on the device input selection screen 820, the image 832 of the button actuation instruction screen 830 may be an image of an occupancy sensor or a daylight sensor, respectively, with appropriate instructions for actuating a button on each of those sensor devices.

The network device may receive and display a list of control devices within a discovery range of the input device. The list of control devices may include a number of different types of control devices, or the types of control devices may be displayed on separate screens. As shown in FIG. 8E, the list of discovered control devices may include a list of lighting fixtures comprising the lighting control devices that responded to the transmitted discovery message. The network device may display a fixture identification screen 840 (e.g., upon the user selecting to view the list of fixtures to be added) having a list 842 of fixture identifiers 844. Though a fixture identification screen 840 is provided as an example, screens of other discovered control devices or a generic control device screen may similarly be displayed.

The list 842 of fixture identifiers 844 may be displayed in an order determined by decreasing signal strength based on the proximity of the fixtures to the input device on which the button was actuated (e.g., as described herein). The fixture identifier 844 of the lighting control device characterized by the highest signal strength may be located at the top of the list 842. The network device may display additional fixtures upon identification of the selection of the more fixtures option 843. The additional fixtures may be the next set of fixtures in the list of fixtures organized according to signal strength. The lists of fixtures may be cycled through until returning to the original list of fixtures that include the fixtures that received the discovery message with the highest signal strength.

The network device may receive an indication to identify of one of the lighting control devices in a lighting fixture by a user selection of the flash option 845 next to the corresponding fixture identifier 844 for that lighting control device in the list 844. The network device may send a message to the system controller, or directly to the lighting control device, to cause the lighting control device to flash the lighting load in the lighting fixture. Other identification options may be displayed and/or selected to otherwise identify control devices displayed in a list.

The user may select one or more of the lighting control devices to be associated with the selected input device by selecting a selection icon 846 next to the fixture identifier 844 for the respective lighting control devices in the list 842. As shown in FIG. 8F, when the network device receives a selection of one of the selection icons 846 in the list 842, the selection icon may change to a check icon 848 indicating that the lighting control device having that fixture identifier 844 is selected to be associated with the identified input device. The network device may receive a selection of the flash option 845 to confirm each lighting control device to be associated with the input device. The user may confirm that the lighting control devices are in a present area (e.g., in the load control environment 100 and/or room 102 shown in FIG. 1).

When the user has selected the lighting control devices in the lighting fixtures to associate with the identified input device (e.g., on which the button was actuated), the network device may receive a selection of a next option 849 on the fixture identification screen 840. The network device may identify the selected fixture identifiers of the lighting control devices in the lighting fixtures to associate with the input device. The input device and the selected fixture identifiers may be stored in association information at the network device. The network device may send the association information to the system controller and/or the identified devices (e.g., or control-target devices) in the association information for storage thereon. Though the next option 849 may be identified for generating association information and/or sending the association message to other devices, the association information may be generated and/or sent for a device upon selection of a corresponding selection icon 846.

If the lighting control devices in the selected lighting fixtures are not already included in the presently defined area, the network device may add the fixture identifiers to a list of fixture identifiers for the defined area. The network device may add an input device identifier of the input device to a list of input device identifiers for the defined area and store association information regarding the association between the input device and the lighting control devices in the selected lighting fixtures. A system controller (e.g., the system controller 160 shown in FIG. 1) may also build and store the list of fixture identifiers, the list of input devices, and the association information.

After the association information has been generated for an input device in a defined area, the network device may allow the user to associate other types of control-target devices with the identified input device, select another input device to add to the defined area for generating association information, or define another area. For example, the user may actuate a button on an occupancy sensor to identify the occupancy sensor as the load control discovery device and send a discovery message from the occupancy sensor. The occupancy sensor may be associated with one or more discovered control devices in the area.

As shown in FIG. 8G, the network device may receive and display a list (e.g., the list 842) of lighting control devices in lighting fixtures within a discovery range of the occupancy sensor. The network device may include an already-associated indication 850 below the fixture identifiers 844 of the load control devices of those lighting fixtures that were previously associated with an input device. For example, the already-associated indication 850 may indicate that the load control devices in the lighting fixtures were previously associated with a remote control device. The already-associated indication 850 may identify to the user the fixture identifiers 844 of the load control devices in the lighting fixtures that may be associated with the occupancy sensor. For example, the user may wish to associate the occupancy sensor with the load control devices in the lighting fixtures that were previously associated with the remote control device. The network device may receive a selection of the selection icons 846 next to the fixture identifiers 844 having the already-associated indication 850, such that the check icons 848 are displayed, as shown in FIG. 8H. The already-associated indication 850 may also, or alternatively, indicate the location with which the control devices may already be associated. The already-associated indication 850 may be displayed to identify the fixtures that are already configured for a given area, as such information may be unapparent from the list of fixtures 842, as the list may identify the devices in order of signal strength at which the discovery message was received.

The area configuration procedure may be repeated for each area of a building. To associate an input device in an area (e.g., a presently-configured area) that is adjacent to a previously-configured area, the network device may display information regarding control devices, such as load control devices in the lighting fixtures, in the previously-configured area (e.g., the previously-associated or already-assigned lighting fixtures). The network device or the system controller may identify control devices for previously-configured areas and allow for user selection of previously configured devices for association.

Figure 8J:
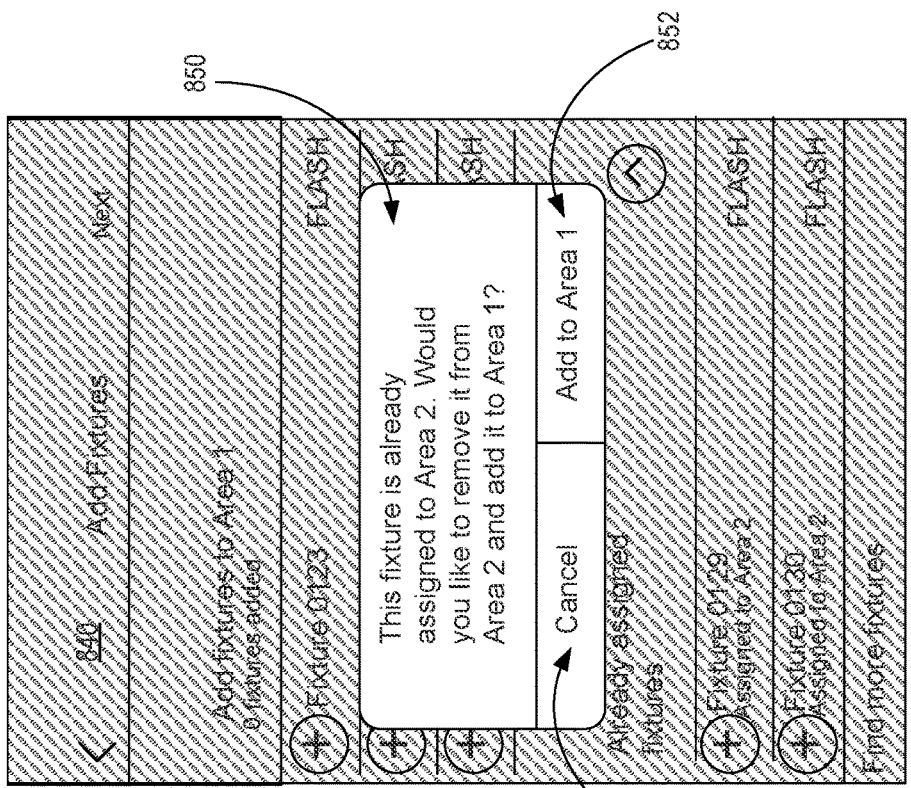
Figure 8I:
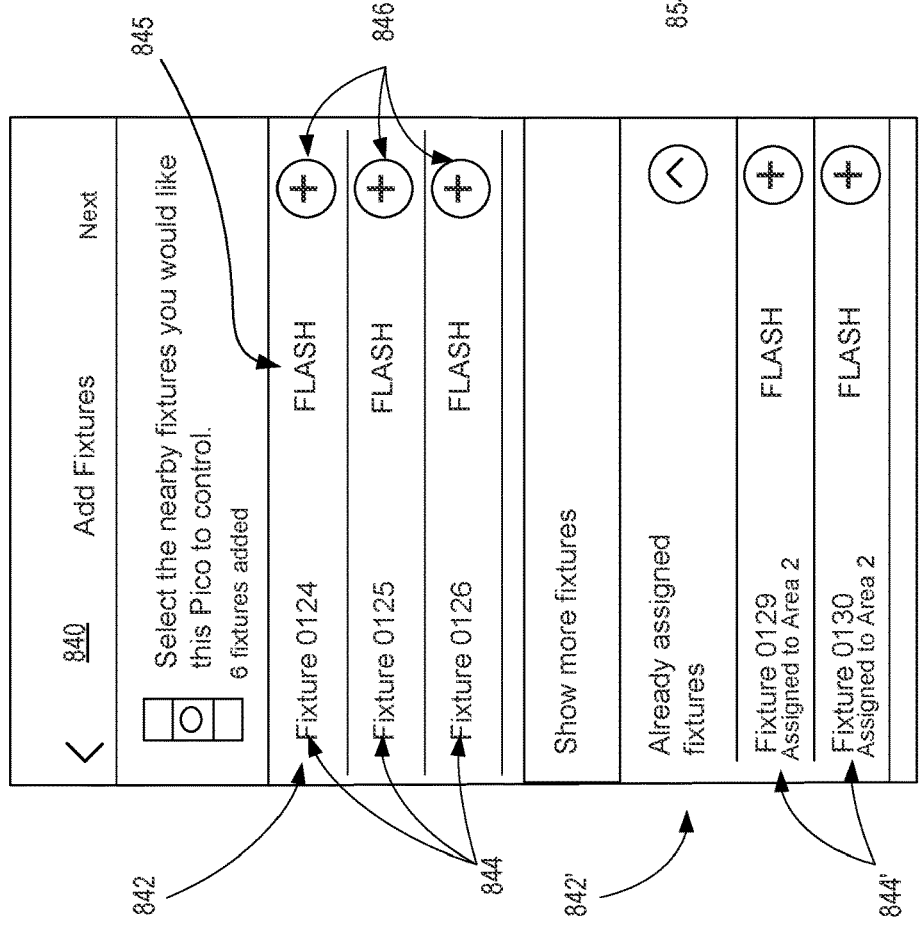

As shown in FIG. 8I, the network device may display fixture identifiers 844' of lighting control devices in previously-associated lighting fixtures in the previously associated device list 842' on the fixture identification screen 840. The previously associated control devices may be displayed without performing additional discovery of the devices, or the previously discovered devices may displayed if discovered in response to a discovery message. The previously discovered messaged may be omitted from the device list 842 of discovered devices. If the network device identifies a selection of the fixture identifier 844' of a load control device in one of the previously associated lighting fixtures, the network device and/or the system controller may add the identified device to the association information for the input device in the defined area.

As shown in FIG. 8J, the network device may display a warning window 850 to allow the user to confirm that the user wants to associate the input device with the load control device in the previously associated lighting fixture. The warning window 850 may be overlaid on top of the screens for adding the fixtures, or may be provided in a separate screen. If the network device identifies a selection of a confirm option 852 on the warning window 850, the network device may remove the fixture identifier of the load control device in the previously associated lighting fixture from the list 842' of fixture identifiers for the previously-configured area and add the fixture identifier to the list 842 of fixture identifiers for the presently-configured area. If the user selects a cancel option 854 on the warning window 850, the network device may maintain the lists of fixture identifiers for the previously-configured area and the presently-being-configured area.

The display configuration on the display screens illustrated in FIGS. 8A-8J may enable association of control devices in a load control environment. The display screens may be presented sequentially as user selections are identified at the network device, or in another order than displayed. The display configuration may enable an area configuration procedure to define or redefine control areas within a load control system after installation of the devices, and the control areas may be defined according to the devices being used for control and their respective locations. As many control devices may be installed in the load control system, many devices and options for configuring those devices may be provided to a user when commissioning the load control system or otherwise updating the configuration of the load control system. The display configuration illustrated in FIGS. 8A-8J may be used to optimize the limited display area on the network device.

Figure 9A:
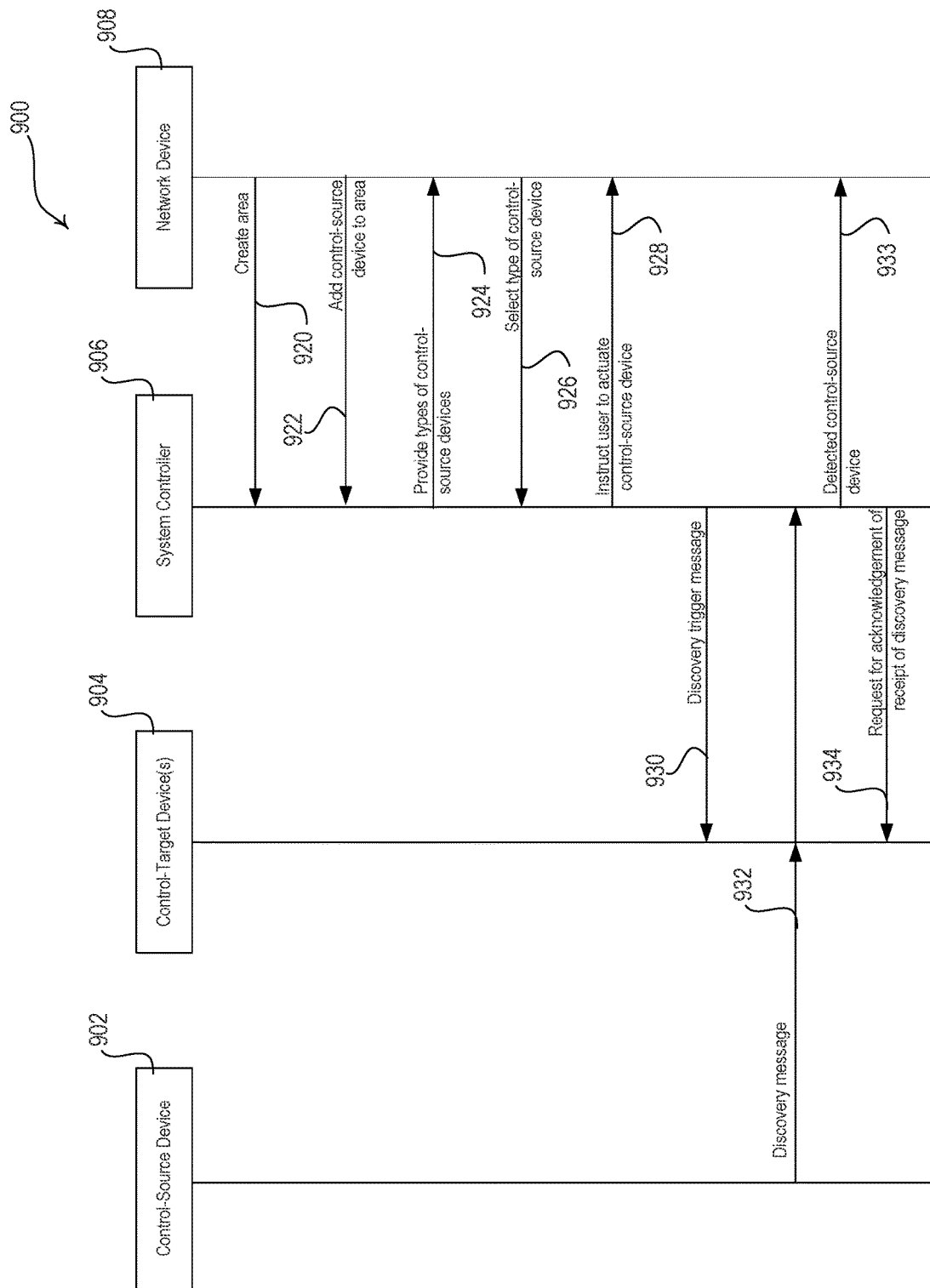
FIGS. 9A-9C illustrate an example flowchart of an example discovery procedure for discovering and associating control devices.
Figure 9B:
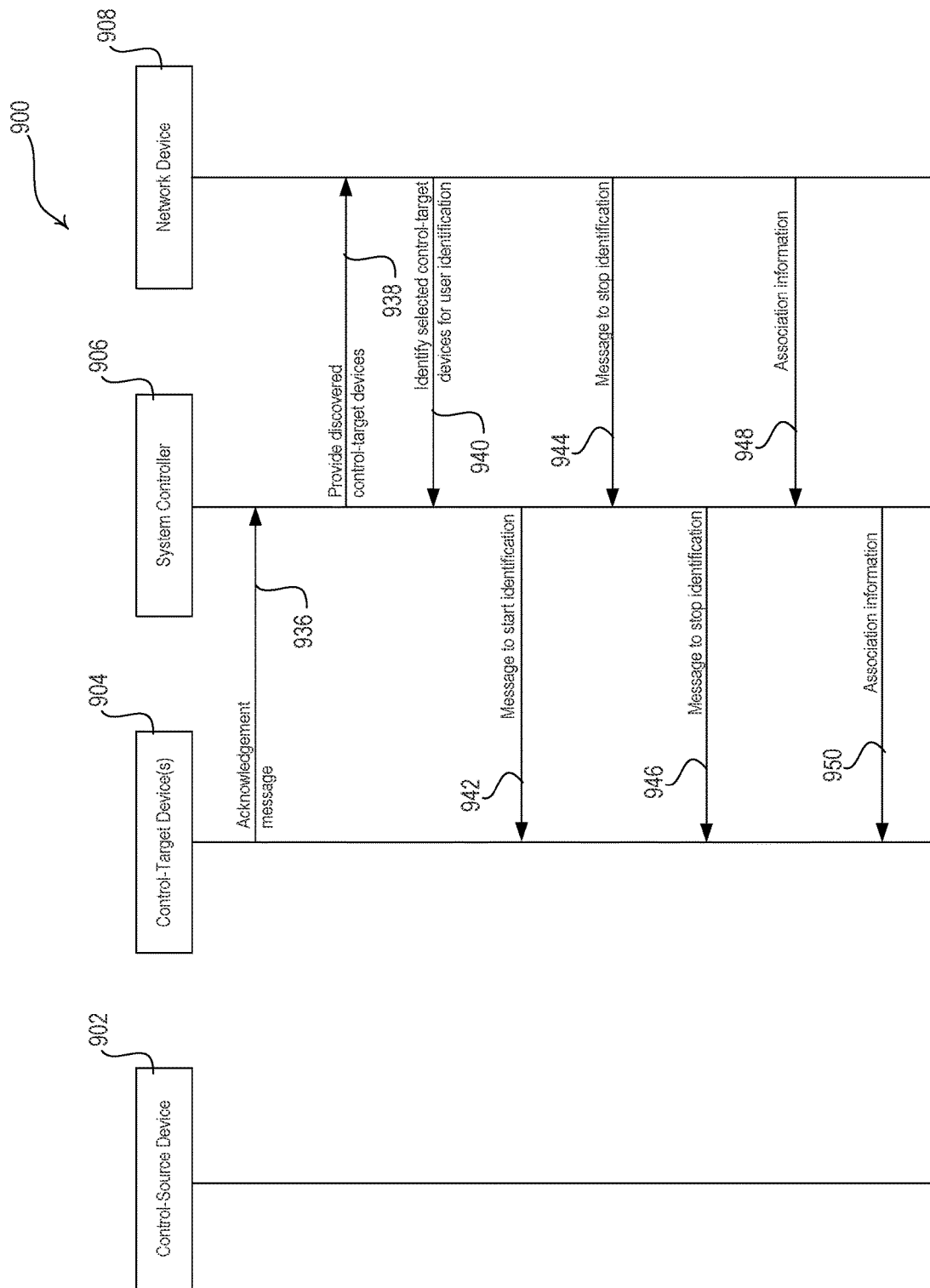
Figure 9C:
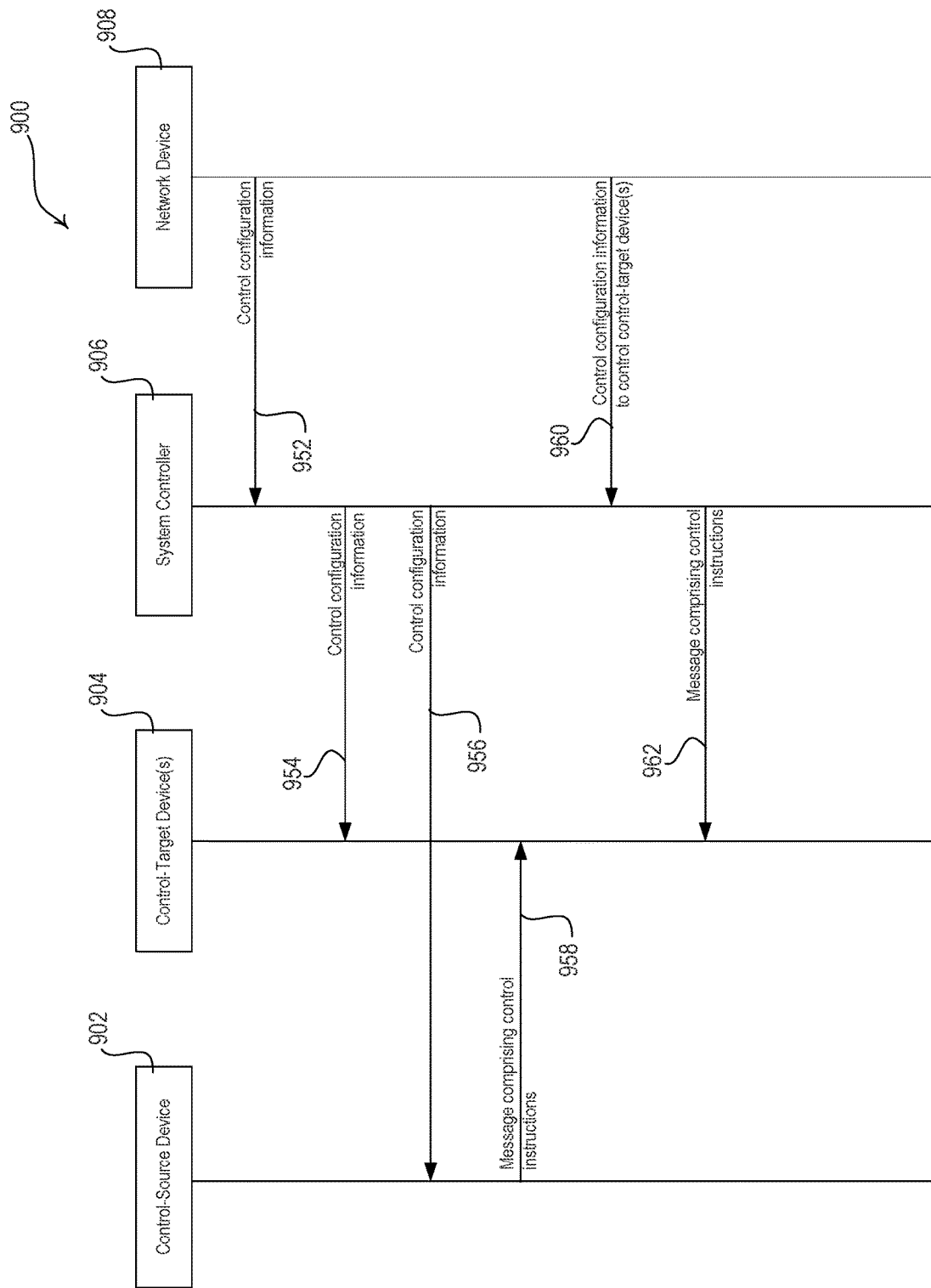

FIGS. 9A-9C show a further example flowchart of an example area configuration procedure 900 as described herein that may allow a user (e.g., user 132 of FIG. 1) to configure one or more control-source devices (e.g., one or more remote control devices, occupancy sensors, a daylight sensors, window sensors, etc.) and control-target devices (e.g., one or more lighting control devices of lighting fixtures, motorized window treatments, temperature control devices, AC plug-in load control devices, etc.) for one or more areas in a building, for example. Such configuration may include, for each area in a building, associating one or more control-source devices in the area with one or more control-target devices in that area such that the control-source devices may control the control-target devices in that area. The configuration may further include configuring a system controller such that the system controller may control the devices (e.g., automatically through scheduled programs, through user input via a network device, etc.) in each area.

As described herein, configuration procedure 900 may be implemented using one or more devices, such as a control-source device 902, one or more control-target devices 904, a system controller 906, and/or a network device 908. The network device 908 may interface/communicate over a communications network with the system controller 906 over a web based interface, for example, that is provided by the system controller 906 (although other interfaces may be used). The system controller 906 may in turn communicate with control devices 904 over a communications network that may be the same or different network as used by the network device 908. The system controller 906 may be in communication with the control-source device 902 and/or one or more control-target devices 904. The control-source devices 902 may be assigned as the load control discovery device, which may be in communication with the control-target devices 904 and/or the system controller 906. The procedure 900 may include additional, fewer, or other devices and/or messages as discussed herein. The procedure 900 may include steps in other orders.

Beginning at 920, an area or location may be created at the network device 908 and the area may be defined at the system controller 906 by being sent to the system controller 906. The area may be created by a user, via the network device 908 (such as through a graphical user interface), which may instruct the system controller 906 that the user wishes to create/define an area. The defined area may correspond to a specific area (such as room 102 of FIG. 1). The system controller 906 may assign this area the name received in the message at 920. The system controller 906 may define within a database, for example, the area according to the identifier in the message received at 920.

At 922, the network device 908, e.g., in response to user selection, may instruct the system controller 906 to add a control-source device to the defined area. In response, at 924, the system controller 906 may present to the user, via the network device 908, a list of possible control-source devices that the user may add to the area. At 926, the network device 908 may send, e.g., in response to user selection, a selected type of control-source device. The selected type of control-source device may correspond to the control-source device 902 (e.g., as a remote control device or sensor), which may be installed in the defined area.

Responsive to selecting a type of control-source device, at 928 the system controller 906 may instruct the user, e.g., via the network device 908, to actuate control-source device 902 located in the defined area, such as by pressing a button on the device, etc. At 930, the system controller 906 (e.g., automatically or via request by the user via the network device) may communicate/transmit on the network a discovery trigger message to one or more control-target devices 904 that may be in communication range of the system controller 906. Upon receipt of the message, a control-target device 904 may enter a discovery mode in which it will listen for a discovery message. Some control-target devices 904 may be in the area being configured (e.g., area 102) and other control-target devices 904 may be in other areas (e.g., area 104 shown in FIG. 1) that may not currently be configured. Control-target devices 904 installed in the area being configured (e.g., area 102) and control-target devices 904 located in other areas (e.g., area 104) not yet being configured, for example, may receive the discovery trigger message and enter discovery mode to listen for a discovery message.

At 932, a discovery message may be transmitted from the control-source device 902. For example, the user may actuate a button or combination of buttons on the control-source device 902 located in the defined area, or a trigger message may be sent to the control-source device 902 (such as by the system controller 906). Upon receiving an actuation or trigger message, the control-source device 902 may communicate/transmit a discovery message on the network. The discovery message may be a broadcast message. As described herein, the discovery message may include a unique identifier of the control-source device, a device type of the control-source device, an indication of the message type, etc. The system controller 906 and control-target devices 904 in transmission range, for example, of the control-source device 902 may receive the discovery message. The control-target devices 904 installed in the specific area being configured (e.g., area 102) and control-target devices 904 located in other areas (e.g., area 104) not currently being configured, for example, may receive the discovery message at 932.

Responsive to receiving the discovery message, the control-target devices 904 may compute an RSSI value of the discovery message as received by the device. Responsive to receiving the discovery message, at 933 the system controller 906 may communicate to the user, e.g., via the network device 908, that control-source device 902 has been detected. The message identifying the detection of the control-source device may include specific information on the device (e.g., information included in the discovery message, such as device type, unique identifier, discovery criteria, etc.). At 934, the system controller 906 may communicate/transmit on the network to control-target devices 904, that may be in communication range of the system controller 906, a request for acknowledgement of receipt of discovery message. This message may include the unique identifier of control-source device 902 as a request for acknowledgment of receipt of the discovery message from the identified control-source device 902.

Responsive to receiving the request for acknowledgement message from the system controller 906, each respective control-target device 904 may determine whether it received a discovery message and if so, compare the identifier in the discovery message to the identifier in the request for acknowledgement message. If the identifiers match, the control-target device 904 may communicate/transmit an acknowledgement message to the system controller 906, as shown in FIG. 9B at 936. If the identifiers do not match, a control-target device may fail to respond (e.g., to reduce network traffic) or may respond with a negative acknowledgement. As described herein, the acknowledgement message may include a unique identifier of the respective control-target device 904, a device type of the control-target device 904, the respective computed RSSI value, etc. According to a further example, each control-target device 904 may compute/determine a respective random value and transmit its respective acknowledgement message relative to the computed random value. Such a process may result in the control-target devices 904 communicating their respective acknowledgement messages at random times relative to one another, thereby reducing and/or precluding network interference/contention resulting from the devices transmitting at substantially the same time and the system controller 906 missing one or more messages.

At 936, the system controller 906 may receive from one or more control-target devices 904 the communicated acknowledgement messages. The system controller 906 may wait a pre-configured time duration since communicating the request for acknowledgement message to ensure reception of each of the communicated acknowledgement messages. At 938, the system controller 906 may communicate/present to the user, e.g., via the network device 908, information on the control-target devices 904 from which the system controller 906 received an acknowledgement message. This information may include the unique identifier of the respective control-target devices 904, the type of the respective control target devices 904, etc. As discussed herein, the system controller 906 may report/list each of the control-target devices 904 from which it received an acknowledgement message.

As noted elsewhere herein, control-target devices 904 may be detected that are in the area being configured (e.g., area 102) and control-target devices 904 may be detected that are located in other areas (e.g., area 104). In order assist the user in identifying/distinguishing the control-target devices of interest, the system controller 906 may filter the control target-devices 904 by RSSI value to show the user the control-target devices that are relatively closer to the control-source device from which the discovery message was transmitted. The control-target devices 904 with higher/stronger RSSI values have a greater likelihood of being in the area currently being configured. The filtering may include ordering the list of control-target devices 904 by RSSI value (e.g., in a decreasing order), showing those control-target devices with a determined RSSI value above a predefined reception power threshold, and/or showing the top "X" control-target devices having the highest RSSI value, etc. Other variations are possible.

Assuming, for example, that the system controller 906 reports to the network device 908 multiple control-target devices 904 and the user is unable to discern which control-target devices 904 in the area being configured (e.g., area 102) correspond to ones present on the network device, the user, e.g., via the network device 908, may select one or more of the listed control-target devices 904 and instruct the system controller 906 at 940 to cause the selected control-target device(s) 904 to identify themselves to the user. The control-target devices 904 may identify themselves by conveying an audible and/or visual signal to the user. This may include for example, the control-target device 904 itself providing the signal (e.g., make an audible sound, blink an LED(s)), or the control-target device 904 causing its corresponding load to provide a signal (e.g., light turn on, turn off, or blink, shade move up/down, etc.).

Upon receiving the request from the user, at 942 the system controller 906 may communicate/transmit over the network one or more messages to the noted control-target device(s) 904 instructing the control-target device(s) 904 to provide identification. Responsive to the message, the noted control-target device(s) 904 may provide an audible and/or visual signal to the user. At 944, the user, e.g., via the network device 908, may instruct the system controller 906 to cause one or more of control-target devices 904 selected at 940 to stop conveying an audible and/or visual signal to the user. Upon receiving the request, at the system controller 906 may communicate over the network one or more messages at 946 to the noted control-target device(s) 904 instructing the control-target devices to stop providing a signal. Responsive to the message, the control-target device(s) 904 may stop providing an audible and/or visual signal to the user. The identification of the devices may assist the user in associating the correct devices at the network device 908.

At 948, the user, e.g., via the network device 908, may provide association information to the system controller 906. The association information may be provided to instruct the system controller 906 to associate control-source device 902 with one or more control-target devices 904 presented to the user at 938, for example, and to associate the control-source device and one or more control-target devices with the defined area (e.g., are 102).

Upon receiving the request, at 950 the system controller 906 may store in a database, for example, the association information (e.g., identifier, type, etc.) on the control-source device 902 and the noted one or more control-target devices 904, an indication that the control-source device 902 and one or more control-target devices 904 are associated such that the control-source device 902 may control the one or more control-target devices 904, and that the control-source device 902 and one or more control-target devices 904 are associated with the defined area (e.g., are 102). The system controller 906 may communicate association information to the one or more control-target devices 904 noted by the user at 950. The association information may include various pieces of information that a control-target device 904 may store within its memory/database. The information may include, for example, the identifier of the control-source device 902 thereby instructing the control-target device 904 to listen for and act on control messages (e.g., dim/raise light, raise/lower shade, etc.) communicated by the control-source device 902, an identifier of the system controller 906 thereby instructing the control-target device 904 to listen for and act on control messages (e.g., dim/raise light, raise/lower shade, etc.) communicated by the system controller 906, an indication of the area to which the control-target device has been assigned, etc. The information may include, for example, one or more identifiers that associate the control-target device 902 with one or more broadcast control groups. A control group may allow, for example, the system controller 906 to broadcast a control message using the respective identifier. Control-target devices 904, upon receiving such a message and recognizing its part of the group, may act upon the message. For example, such messages may be used to dim each dimmable ballasts/driver in a given area.

As shown in FIG. 9C, at 952 the network device 908 may send control configuration information to the system controller 906. The control configuration information may be configured by the user at the network device 908. In response to such information, at 954 and/or 956 the system controller 906 may communicate via the network one or more control configuration information messages to the control-source device 902 and/or control target device(s) 904.

As a result in part of the messages at 952, 954, 956, for example, at 958 the control-source device 902 may control the one or more associated control-target devices. For example, assuming the control-source device 902 is a remote control, actuation of a button(s) on the device by the user may cause the device to communicate a message on the network. The associated on or more control target devices 904, being configured to listen for messages from the control-source device 902, may receive the message and perform the noted instruction.

At 960, as the user associates the control-source device 902 and control-target device(s) 904 and associates the devices with the defined area (e.g., area 102), the user may use the network device 908 to configure the system controller 906 to control one or more control target device(s) 904. For example, the user may configure the system controller 906 to automatically control one or more control-target devices 904 (e.g., automatically control lighting control devices of lighting fixtures to dim the fixtures at a set time). The system controller 906 may be configured in response to control configuration information received from the network device 908 at 960. In response to such configurations, when a set time occurs for example, the system controller 906 may communicate control instructions, at 962, via the network one or more control messages to one or more control-target devices 904. The one or more control target devices 904, being configured to listen for messages from the system controller 906, may receive the message and perform the noted instruction. In response to such commands, the system controller 906 may communicate via the network one or more configuration messages to the one or more lighting control devices to dim the lighting fixtures. Other configuration examples are possible.

Reference is now made to an example variation to configuration procedure 900 of FIGS. 9A-9C. As mentioned above, the system controller 906 may report/list each control-target device 904 from which it received an acknowledgement message. However, as noted above a user may detect control-target devices in the area being configured (e.g., area 102) and in other areas (e.g., area 104). As noted, it may be desirable to assist the user in identifying/distinguishing the control-target devices 904 of interest. Alternatively and/or in addition, as noted above as control-target devices 904 communicate acknowledgement messages, there may be network interference if a large number of devices communicate the message, even if random transmission is used. According to an example variation to procedure 900, the process may proceed similar to the process described above through step 933. However, at 934 the system controller 906, when communicating the request for acknowledge message, may include in the message a discovery range or band that may correspond to a minimum and a maximum RSSI value, for example (e.g., 10 to −50 dBm). As an additional criteria for a control-target device 904 communicating an acknowledgement message to the system controller 906, the respective control-target device 904 may determine whether its respective RSSI value is within the noted range. The control-target device 904 may communicate the acknowledgement message as described in step 936 to the system controller 906 if its respective RSSI value is within the range. Again, messages may be communicated at random times. Mechanisms other than a range may be used. For example, the system controller 906 may communicate a single value (e.g., −50 dBm) and a control-target device 904 may communicate the acknowledgement message to the system controller 906 if its respective RSSI value is higher than the value.

The system controller 906 may again wait a pre-configured time duration since communicating the request for acknowledgement message to receive acknowledgement messages from the control-target devices. If at the end of the time duration the system controller 906 fails to receive an acknowledgement messages from the control-target devices 904 (or less than a predefined threshold number), the system controller 906 may repeat step 934 and may automatically communicate on the network a subsequent (e.g., second) request for acknowledge message but with the discovery range modified. Alternatively, the system controller 906 may report the lack of responses to the user, e.g., via the network device 908 and cause the user to initiate the system controller 906 to communicate a subsequent request for acknowledge message. The modified range may be a range that is inclusive (in whole or part) of the previously communicated range, or may be a range that is successive to the prior range (e.g., the prior range may be 10 to −50 dBm and the next range may be −51 dBm to −54 dBm, etc.).

Similar to step 936, responsive to receiving the subsequent request for acknowledgement message from the system controller 906, a respective control-target device 904 may determine whether its respective RSSI value is within the modified range specified in the subsequent request for acknowledgement message and communicate an acknowledgement message to the system controller 906 if its respective RSSI value is within the modified range. Again, messages may be communicated at random times. The system controller 906 may again wait a pre-configured time duration since communicating the subsequent request for acknowledgement message to receive acknowledgement messages from the control-target devices 904. If at the end of the time duration the system controller 906 has failed to receive an acknowledgement message from the control-target devices 904, the system controller 906 may again repeat step 934 and may automatically communicate on the network an additional (e.g., third) request for acknowledgement message but with the discovery range again modified, (e.g., the first range may be 10 to −50 dBm, the second range may be −51 dBm to −54 dBm, and the third range may be −55 to −57 dBm, etc.), etc. Assuming the system controller 906 does receive acknowledgement messages from the control-target devices 904, the process may continue as similarly discussed at step 938.

According to a further aspect of this example, the user may determine that one or more control-target devices of interest are not being shown in the discovered devices provided to the user via the network device 908 at 938 (e.g., because the control-target device 904 did not respond with an acknowledgement message at step 936). Here, the user, e.g., via the network device 908, may instruct the system controller 906 to find additional control-target devices 904. In response to such a request, the system controller 906 may communicate on the network another request for acknowledgement message as similarly communicated at step 934, but with the discovery range modified as discussed above.

Figure 10:
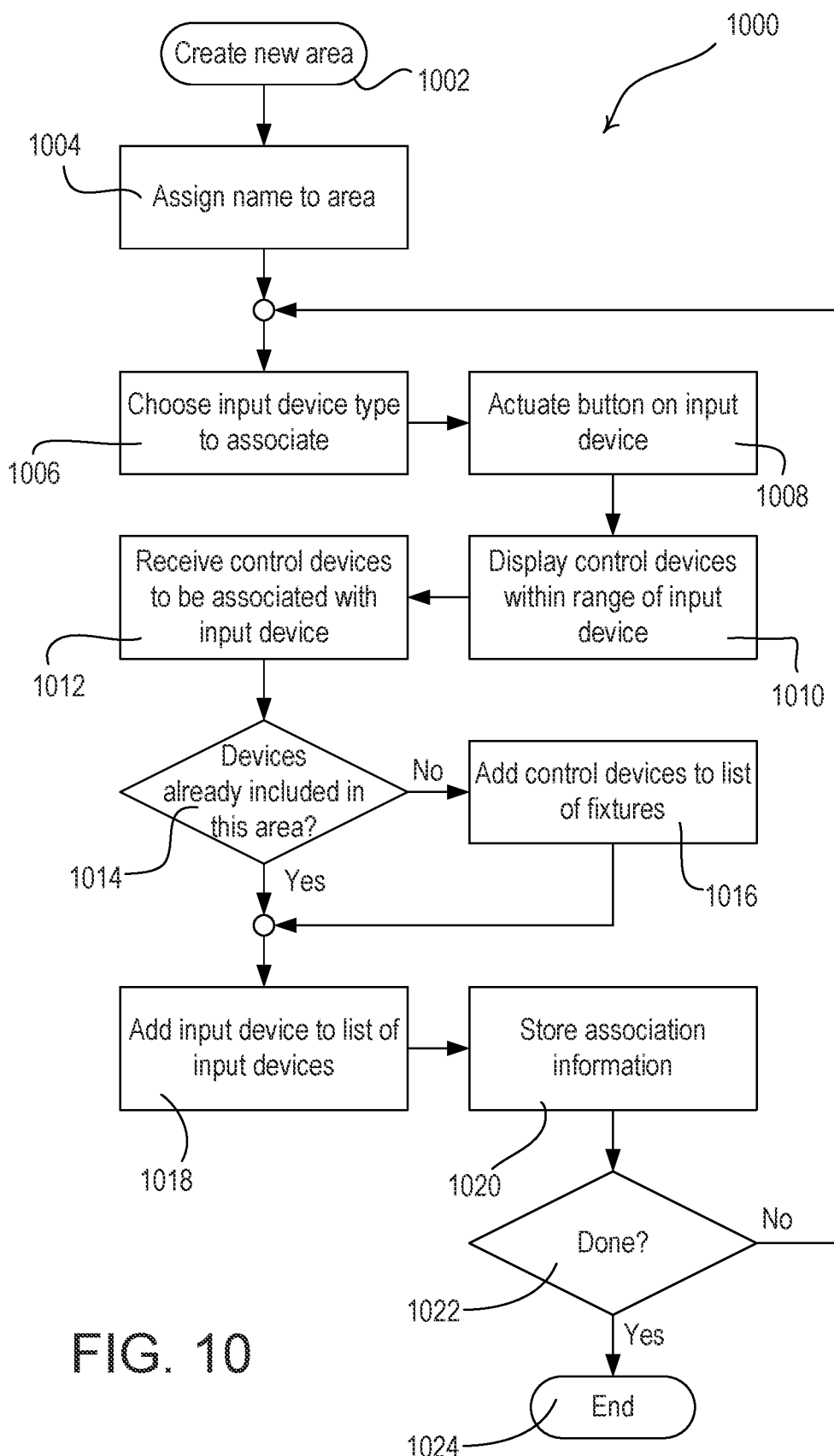
FIG. 10 is a flowchart of an example area configuration procedure for associating control devices in a load control environment.

FIG. 10 is a flowchart of an example area configuration procedure 1000 for associating control-source devices with control-target devices in a load control area (such as the load control environment 100 shown in FIG. 1). The area configuration procedure 1000 may be implemented using one or more devices, such as a network device, a system controller, one or more control devices, etc. The area configuration procedure 1000 may allow a user (e.g., the user 132 shown in FIG. 1) to associate one or more control-source devices (e.g., input devices) with one or more control-target devices in a specific area. The area configuration procedure 1000 may be repeated for different areas of a building.

The area configuration procedure 1000 may start at 1002, such as when the user selects a "Create an area" option on an area creation screen, such as the area creation screen 800 shown in FIG. 8A. The user may assign a name (e.g., a unique name) to the area presently being configured at 1004. The user may choose the type of control-source device (e.g., the type of input device) to associate with one or more of the control-target devices (e.g., the lighting control devices of the lighting fixtures) in the area at 1006. For example, the network device may display an input device selection screen, such as the input device selection screen 820 shown in FIG. 8C, from which the user may select a control device option. The control device options may be different types of control-source devices for adding to the area.

At 1008, a button on the input device may be actuated to put the input device in an association and/or discovery mode. The network device may display a button actuation instruction screen, such as the button actuation instruction screen 830 shown in FIG. 8D, to instruct the user how to put the input device in an association and/or discovery mode. After the button on the input device is actuated appropriately at 1008, the network device may receive and display, at 1010, a list of control devices within a discovery range of the input device. The network device may display a control device identification screen, which may include a list of control-source and/or control target devices. The control device identification screen may be similar to the fixture identification screen 840 shown in FIG. 8E. The list of control devices may be displayed in an order determined by increasing or decreasing signal strength based on the proximity to the input device on which the button was actuated at 1008.

When the network device receives a selection of each of the control devices to associate with the input device, the network device may associate the selected control devices with the input device at 1012 of the area configuration procedure 1000. If the selected control devices are not already included in the present area at 1014, the network device may add the fixture identifiers to a list of fixture identifiers for that area at 1016. The network device may add an input device identifier of the input device to a list of input device identifiers for that area at 1018 and store association information regarding the association between the input device and the selected control devices at 1020. Though steps are described as being performed by a network device herein, a system controller or a control device may also build and store the list of control devices, the list of input devices, and the association information.

If the area configuration procedure 1000 is incomplete at 1022 (e.g., if there are more input devices to associate with the control devices in the present area), the area configuration procedure 1000 may loop around to allow the network device to receive selections of another input device to associate with one or more of the control-target devices in the area at 1006. For example, the user may actuate a button on another control-source device to associate the control-source device with one or more control-target devices in the area. When the user has completed configuration of the present area at 1022, the area configuration procedure 1000 may exit. The area configuration procedure 1000 may be repeated for each area of a building.

Figure 11B:
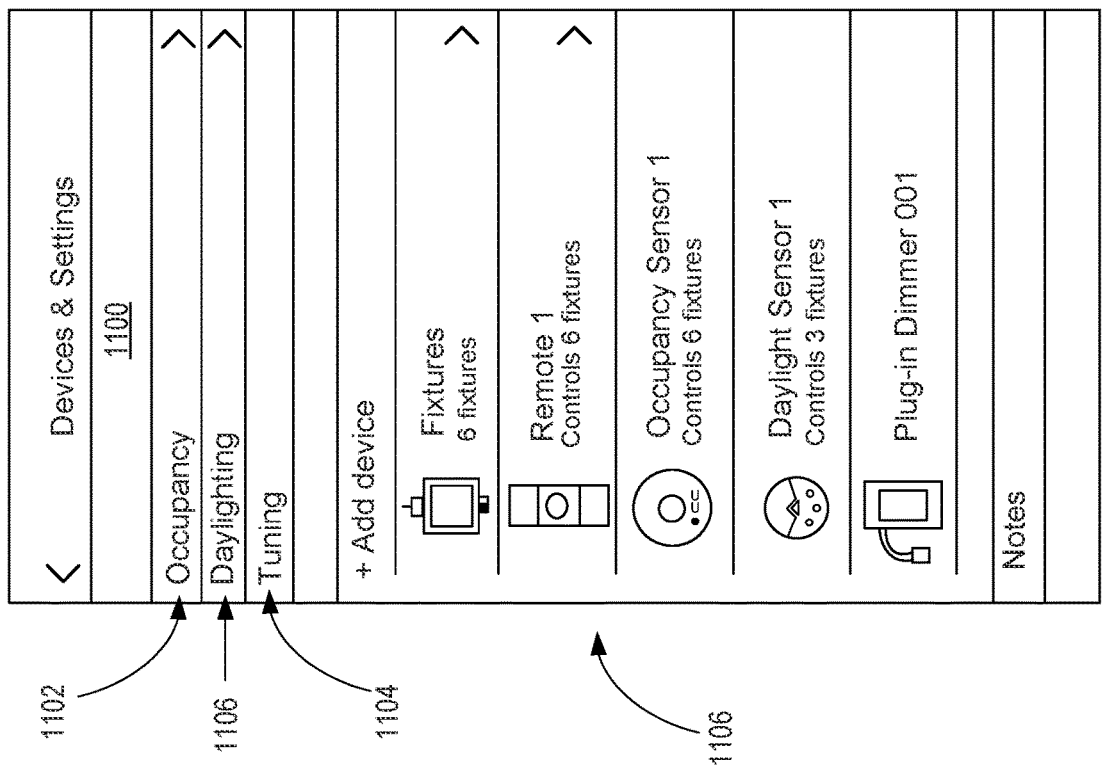
FIGS. 11A and 11B illustrate example GUIs that may be displayed by a visual display of a network device for configuring operational settings of an area.
Figure 11A:
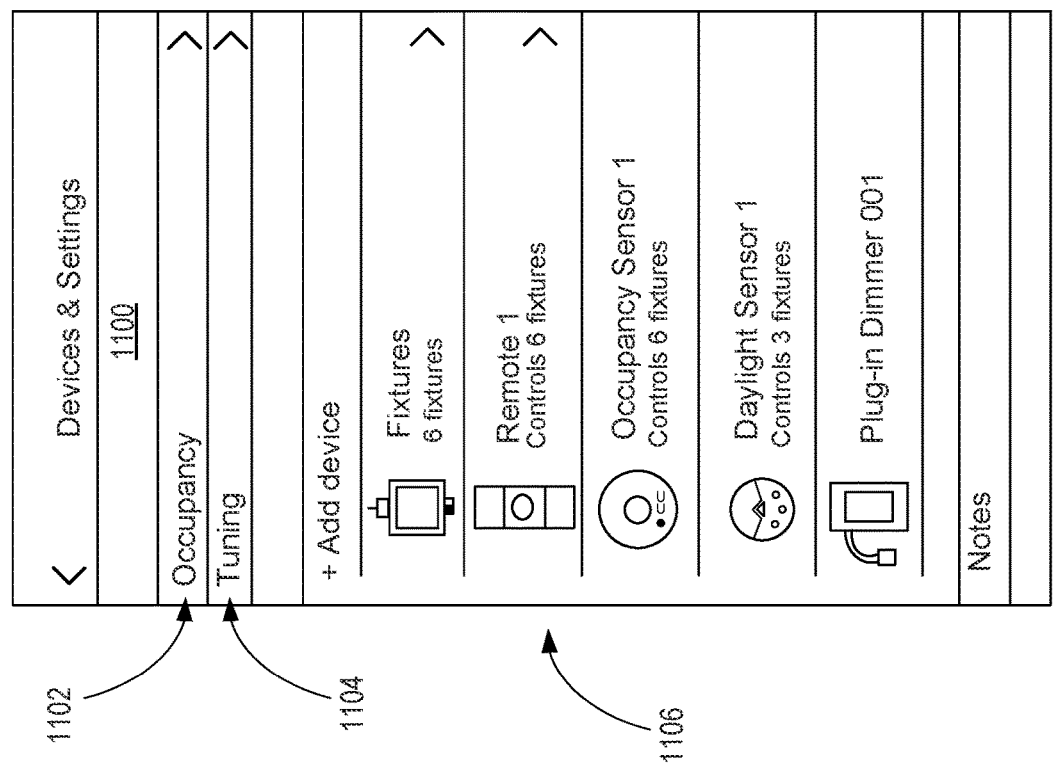

FIGS. 11A and 11B illustrate example graphical user interfaces (GUIs) that may be displayed on a visual display of a network device (e.g., the visual display 110 of the network device 128 shown in FIG. 1) for configuring operational settings of an area (e.g., during or after the area configuration procedure 1000). The GUIs may be displayed via a web interface (e.g., generated by a system controller or other remote device) and/or a control application executed by the network device. The network device may be configured to display a device settings screen 1100. The device settings screen 1100 may display configuration options (e.g., an area occupancy configuration option 1102 and an area tuning configuration option 1104) for configuring the present area. The configuration options may be displayed on the device settings screen 1100 depending upon the types of input devices that have been associated with the control-target devices in the area. For example, if the at least one remote control device and at least one occupancy sensor have been associated with the load control devices in the lighting fixtures in the area, the area occupancy configuration option 1102 and the area tuning configuration option 1104 may be displayed on the device settings screen 1100 as shown in FIG. 11A. If at least one daylight sensor is associated with the control-target devices in the area, such as the lighting control devices in the lighting fixtures, an area daylighting configuration option 1106 may be displayed on the device settings screen 1100 as shown in FIG. 11B.

In response to the selection of the area occupancy configuration option 1102, the network device may display an area occupancy configuration screen (not shown) that allows for adjustment of the occupancy settings (e.g., sensitivity, timeouts, etc.) for the area. In response to the selection of the area tuning configuration option 1104, the network device may display an area tuning configuration screen (not shown) that allows for adjustment of the dimming range settings (e.g., high-end trim, low-end trim, etc.) for the area. In response to the selection of the area daylighting configuration option 1106, the network device may display an area daylighting configuration screen (not shown) that allows for adjustment of the daylighting settings (e.g., daylighting gain, etc.) for the area.

The network device may receive a selection of one of the input devices in the list 1106 of previously discovered and/or associated control devices. The list 1106 of previously discovered and/or associated control devices may include the devices for a common area or for different areas. The selection of a previously discovered and/or associated control device may allow for configuration information (e.g., association information and/or control configuration information) to be displayed and/or modified for storage.

Figure 12C:
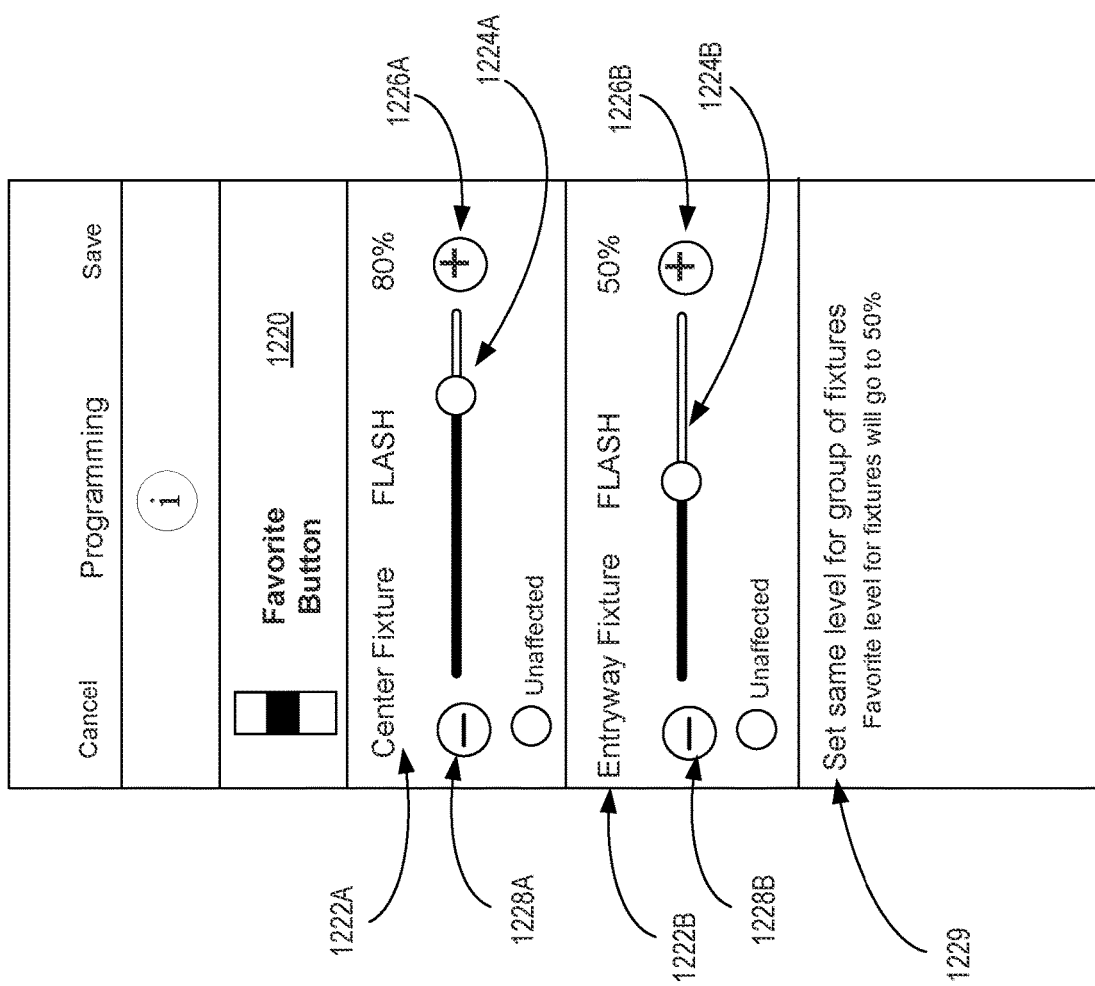

FIGS. 12A-12C illustrate example graphical user interfaces (GUIs) that may be displayed on a visual display of a network device (e.g., the visual display 110 of the network device 128 shown in FIG. 1) for configuring a control device of an area (e.g., during or after the area configuration procedure 1000). The GUIs may be displayed via a web interface (e.g., generated by a system controller or other remote device) and/or a control application executed by the network device.

The network device may display a control device configuration screen 1200 that displays configuration options for configuring a presently-selected control device. For example, the control device configuration screen may display configuration options for configuring presently-selected remote control device (such as the remote control device 130) as shown in FIG. 12A. The control device configuration screen 1200 may be displayed upon selection of a previously discovered and/or associated control device in the list 1106 displayed in FIGS. 11A and 11B. The network device may receive a name for the control device and assign the name to the control device presently being configured, e.g., by entering a name in a control device name text field 1202. The network device may receive instructions for program the operation of the control device by user selection of a programming option 1204. The control device configuration screen 1200 may include an associated device identifier 1206 that indicates the number of associated devices controlled by the input device currently being configured. The control device configuration screen 1200 may include an identification button 1208 that causes instructions to be sent to the associated devices controlled by the input device for the associated devices to identify themselves. For example, lighting control devices in associated lighting fixtures may be instructed to flash a corresponding lighting load.

The network device may display a control device programming screen 1210 in response to a selection of the programming option 1214. As shown in FIG. 12B, the control device programming screen 1210 may display a preset intensity adjustment window 1212, which may allow for the adjustment of a preset intensity for the lighting control devices of the lighting fixtures of the area. During a control operation, the lighting control devices may control the intensities of the controlled lighting loads to the preset intensity in response to an actuation of a preset button of the remote control device presently being programmed. The preset intensity adjustment window 1212 may include a single slider control 1214 for adjusting (e.g., simultaneously adjusting) the preset intensities of each of the lighting control devices of the lighting fixtures in the area (e.g., adjusting the preset intensities of each of the lighting control devices in the area at one time to a single level). The preset intensity adjustment window 1212 may include a raise icon 1216 for raising the preset intensity by a predetermined amount (e.g., in response to a single actuation of the raise icon), and a lower icon 1218 for lowering the preset intensity by a predetermined amount (e.g., in response to a single actuation of the raise icon).

The control device programming screen 1210 may display an individual device configuration option 1219 (e.g., a "Set by fixture" option) to allow for adjustment of the preset intensities of the load control devices of each of the individual lighting fixtures in the area. As shown in FIG. 12C, the network device may display a preset adjustment screen 1220 in response to a selection of the individual device configuration option 1219. The preset adjustment screen 1220 may display separate preset intensity adjustment windows 1222A, 1222B for each of the lighting control devices in the lighting fixtures in the area (e.g., two fixtures as shown in FIG. 12C). Each preset intensity level adjustment window 1222A, 1222B may include a slider control 1224A, 1224B for adjusting the preset intensity of the lighting control device of the respective lighting fixture. Each preset intensity adjustment window 1222A, 1222B may include a raise icon 1226A, 1226B for raising the preset intensity by a predetermined amount and a lower icon 1228A, 1228B for lowering the preset intensity by a predetermined amount. In response to an actuation of preset button of the remote control device during a control operation, the lighting control devices may each control the intensity of the controlled lighting load to the respective preset intensity set in the preset adjustment screen 1220. The preset intensities may be stored at the network device, the system controller, and/or the lighting control devices themselves. The preset adjustment screen 1220 may display a fixture group level control option 1229 (e.g., "Same level for group of fixtures" option) to provide for returning to the control device programming screen 1210 to allow for adjustment of each of the preset intensities of the load control devices of the lighting fixtures in the area in response to the single slider control 1214 of the preset intensity adjustment window 1212.

Figure 13:
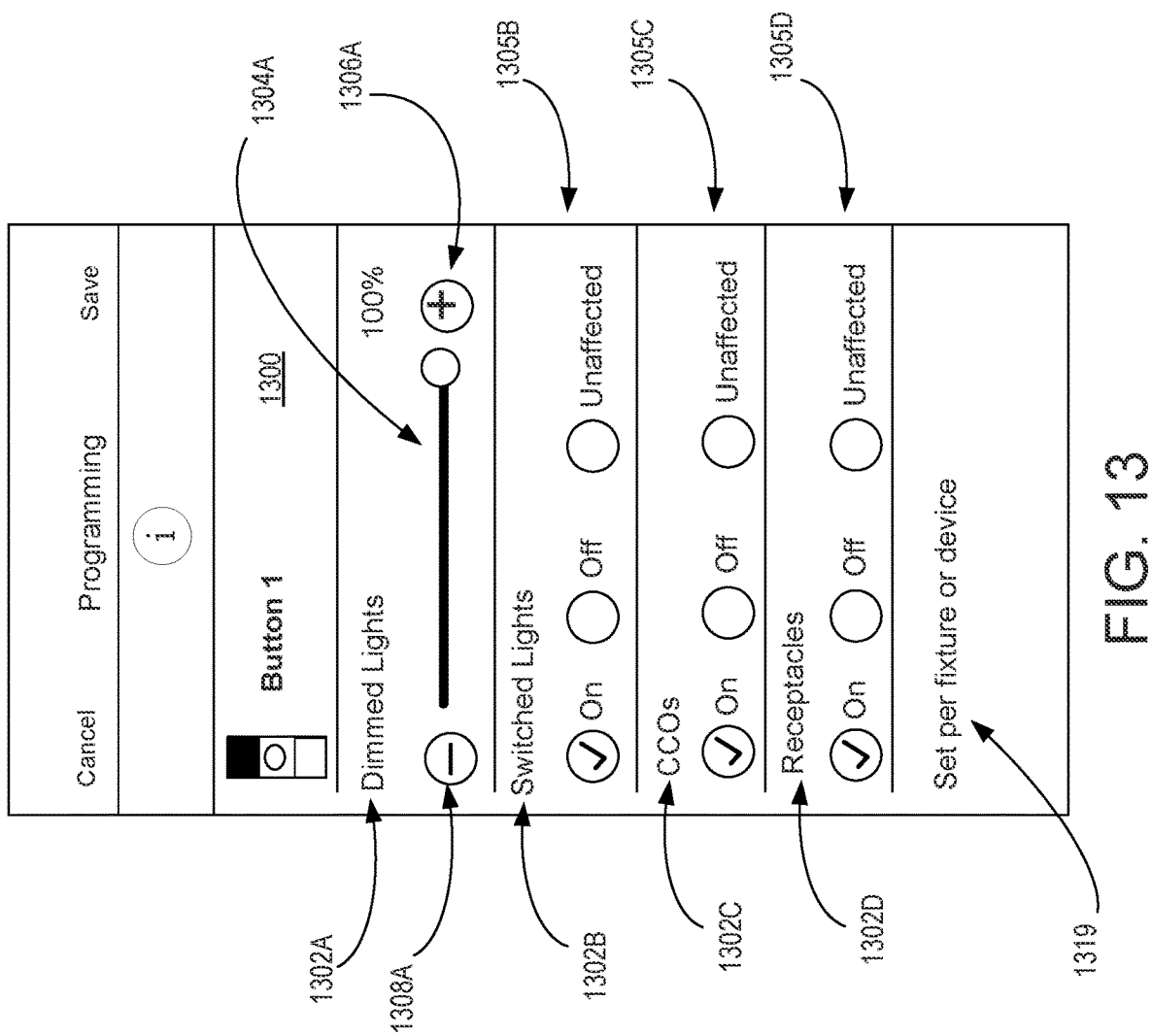
FIG. 13 illustrates an example GUI displayed by a visual display of a network device for configuring a preset for a button of a control device in an area having more than one type of load control device.

FIG. 13 illustrates another example graphical user interface (GUI) that may be displayed on a visual display of a network device (e.g., the visual display 110 of the network device 128 shown in FIG. 1) for configuring a preset for a button of a control device in an area having more than one type of load control device. The GUI may be displayed via a web interface (e.g., generated by a system controller or other remote device) and/or a control application executed by the network device.

The area being configured may include one or more load control devices. For example, the area may include one or more of the following types of load control devices: lighting control devices of dimmable lighting fixtures (e.g., dimmed lights), lighting control devices of switched lighting fixtures (e.g., switched lights), contact closure output (CCO) devices, and controllable receptacles. The network device may display a preset programming screen 1300, which may allow for the adjustment of preset settings for the load control devices of the area. During a control operation, the load control devices may control the controlled electrical loads according the preset settings in response to an actuation of the button of the remote control device, or other control-source device, that is presently being programmed. The preset programming screen 1300 may display multiple preset adjustment windows 1302A, 1302B, 1302C, 1302D for each of the different types of load control devices in the area.

As shown in FIG. 13, the preset programming screen 1300 may display a dimmed lights preset adjustment window 1302A to allow for the adjustment of a preset intensity level for the lighting control devices of the dimmable lighting fixtures of the area. The dimmed lights preset adjustment window 1302A may include a slider control 1304A for adjusting the preset intensity level of each of the lighting control devices of the dimmable lighting fixtures in the area. The dimmed lights preset adjustment window 1302A may include a raise icon 1306A for raising the preset intensity level by a predetermined amount and a lower icon 1308A for lowering the preset intensity level by a predetermined amount.

The preset programming screen 1300 may display a switched lights preset adjustment window 1302B for the adjustment of the preset state of the lighting control devices of the switched lighting fixtures, a contact closure output preset adjustment window 1302C for the adjustment of the preset state of contact closure output devices, and a receptacle preset adjustment window 1302D for the adjustment of the preset state of controlled receptacle devices. The switched lights preset adjustment window 1302B, the contact closure output preset adjustment window 1302C, and the receptacle preset adjustment window 1302D may each display preset state options 1305B, 1305C, 1305D. For example, the display preset state options 1305B, 1305C, 1305D may be on, off, and unaffected as shown in FIG. 13.

Figure 14:
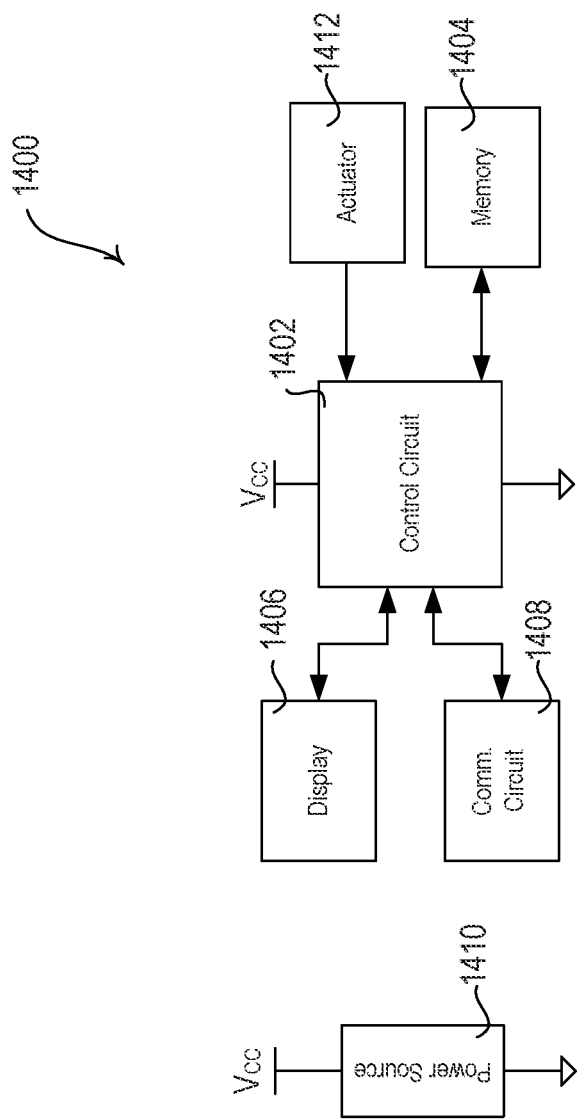
FIG. 14 is a block diagram of an example network device.

FIG. 14 is a block diagram illustrating an example network device 1400 as described herein. The network device 1400 may include the network device 128 shown in FIG. 1, for example. The network device 1400 may include a control circuit 1402 for controlling the functionality of the network device 1400. The control circuit 1402 may include one or more general purpose processors, special purpose processors, conventional processors, digital signal processors (DSPs), microprocessors, integrated circuits, a programmable logic device (PLD), application specific integrated circuits (ASICs), or the like. The control circuit 1402 may perform signal coding, data processing, power control, input/output processing, or any other functionality that enables the network device 1400 to perform as described herein. The control circuit 1402 may store information in and/or retrieve information from the memory 1404. The memory 1404 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory.

The network device 1400 may include a communications circuit 1408 for transmitting and/or receiving information. The communications circuit 1408 may perform wireless and/or wired communications. The communications circuit 1408 may include an RF transceiver or other circuit capable of performing wireless communications via an antenna. Communications circuit 1408 may be in communication with control circuit 1402 for transmitting and/or receiving information.

The control circuit 1402 may also be in communication with a display 1406 for providing information to a user. The processor 1402 and/or the display 1406 may generate GUIs for being displayed on the network device 1400. The display 1406 and the control circuit 1402 may be in two-way communication, as the display 1406 may include a touch screen module capable of receiving information from a user and providing such information to the control circuit 1402. The network device may also include an actuator 1412 (e.g., one or more buttons) that may be actuated by a user to communicate user selections to the control circuit 1402.

Each of the modules within the network device 1400 may be powered by a power source 1410. The power source 1410 may include an AC power supply or DC power supply, for example. The power source 1410 may generate a supply voltage $V_{CC}$ for powering the modules within the network device 1400.

Figure 15:
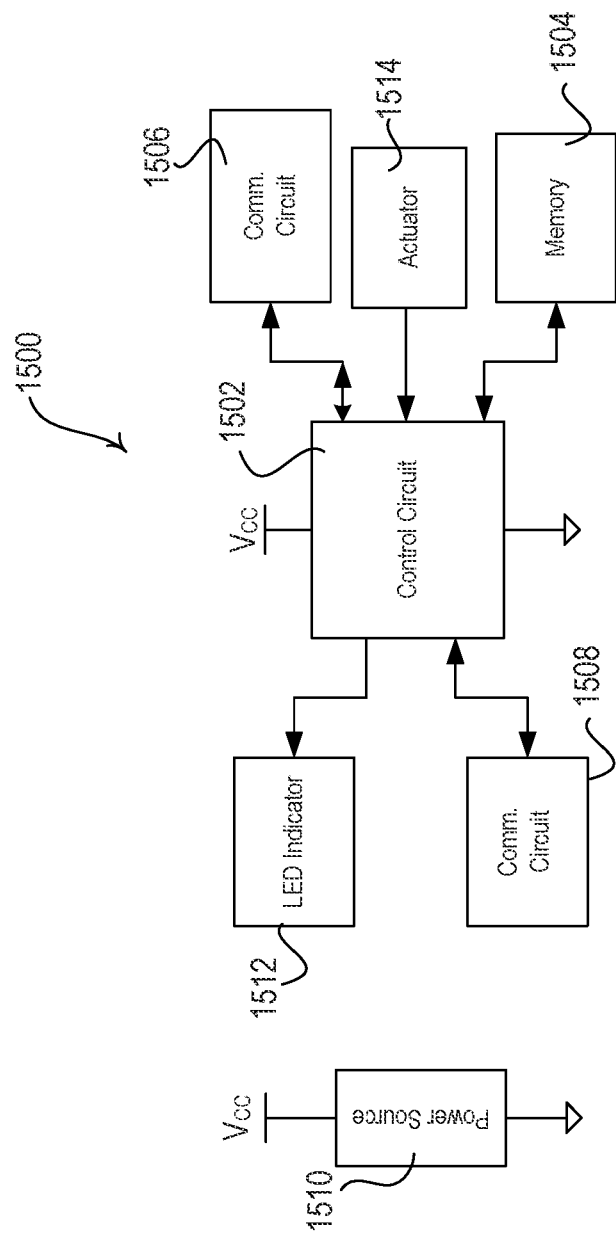
FIG. 15 is a block diagram of an example system controller.

FIG. 15 is a block diagram illustrating an example system controller 1500 as described herein. The system controller 1500 may include a control circuit 1502 for controlling the functionality of the system controller 1500. The control circuit 1502 may include one or more general purpose processors, special purpose processors, conventional processors, digital signal processors (DSPs), microprocessors, integrated circuits, a programmable logic device (PLD), application specific integrated circuits (ASICs), or the like. The control circuit 1502 may perform signal coding, data processing, power control, input/output processing, or any other functionality that enables the system controller 1500 to perform as described herein. The control circuit 1502 may store information in and/or retrieve information from the memory 1504. The memory 1504 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory.

The system controller 1500 may include a communications circuit 1506 for transmitting and/or receiving information. The communications circuit 1506 may perform wireless and/or wired communications. The system controller 1500 may also, or alternatively, include a communications circuit 1508 for transmitting and/or receiving information. The communications circuit 1506 may perform wireless and/or wired communications. Communications circuits 1506 and 1508 may be in communication with control circuit 1502. The communications circuits 1506 and 1508 may include RF transceivers or other communications modules capable of performing wireless communications via an antenna. The communications circuit 1506 and communications circuit 1508 may be capable of performing communications via the same communication channels or different communication channels. For example, the communications circuit 1506 may be capable of communicating (e.g., with a network device, over a network, etc.) via a wireless communication channel (e.g., BLUETOOTH®, near field communication (NFC), WIFI®, WI-MAX®, cellular, etc.) and the communications circuit 1508 may be capable of communicating (e.g., with control devices and/or other devices in the load control system) via another wireless communication channel (e.g., WI-FI® or a proprietary communication channel, such as CLEAR CONNECT™).

The control circuit 1502 may be in communication with an LED indicator 1512 for providing indications to a user. The control circuit 1502 may be in communication with an actuator 1514 (e.g., one or more buttons) that may be actuated by a user to communicate user selections to the control circuit 1502. For example, the actuator 1514 may be actuated to put the control circuit 1502 in an association mode and/or communicate association messages from the system controller 1500.

Each of the modules within the system controller 1500 may be powered by a power source 1510. The power source 1510 may include an AC power supply or DC power supply, for example. The power source 1510 may generate a supply voltage $V_{CC}$ for powering the modules within the system controller 1500.

Figure 16:
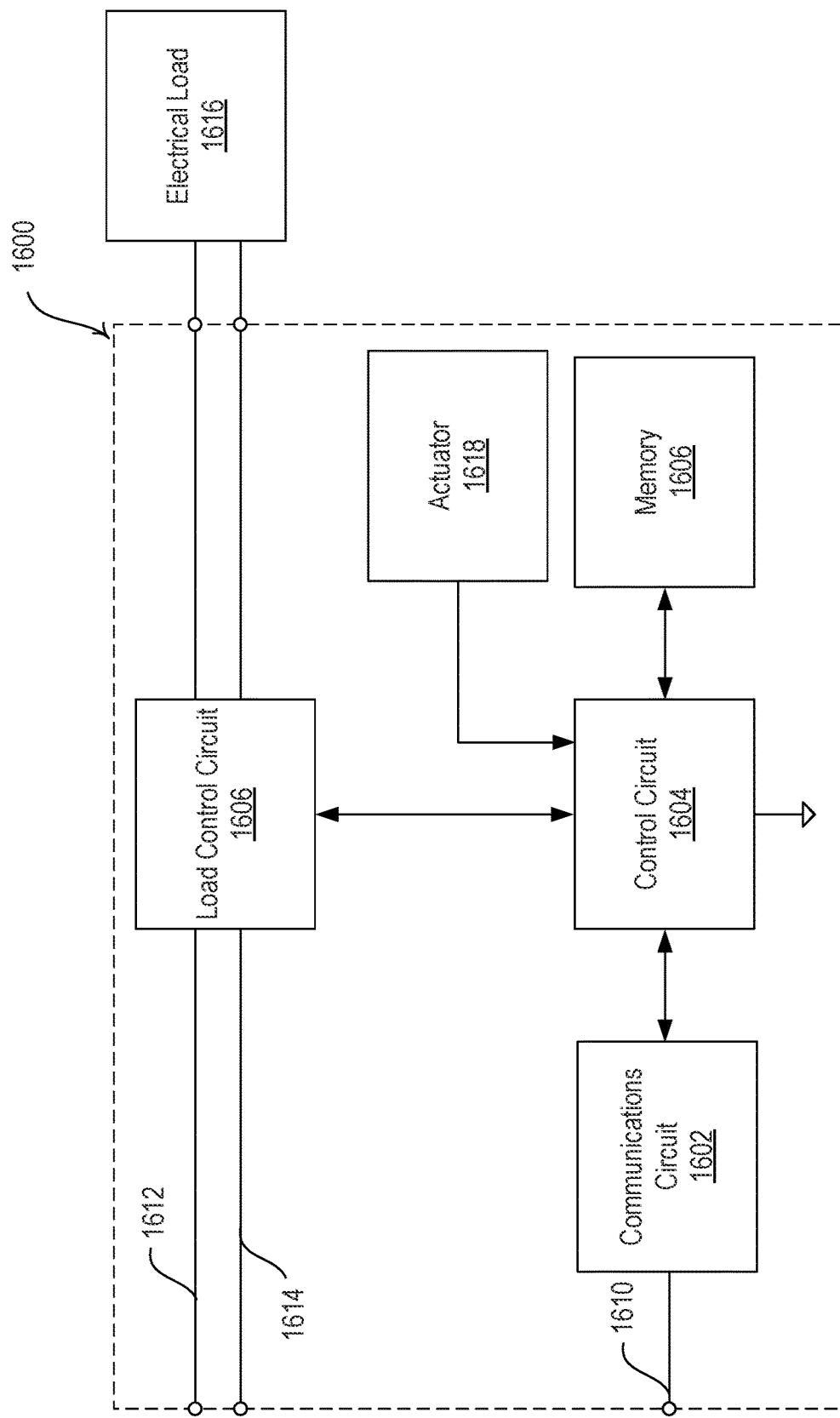
FIG. 16 is a block diagram of an example control-target device.

FIG. 16 is a block diagram illustrating an example control-target device, e.g., a load control device 1600, as described herein. The load control device 1600 may be a dimmer switch, an electronic switch, an electronic ballast for lamps, an LED driver for LED light sources, an AC plug-in load control device, a temperature control device (e.g., a thermostat), a motor drive unit for a motorized window treatment, or other load control device. The load control device 1600 may include a communications circuit 1602. The communications circuit 1602 may include a receiver, an RF transceiver, or other communications module capable of performing wired and/or wireless communications via communications link 1610. The communications circuit 1602 may be in communication with control circuit 1604. The control circuit 1604 may include one or more general purpose processors, special purpose processors, conventional processors, digital signal processors (DSPs), microprocessors, integrated circuits, a programmable logic device (PLD), application specific integrated circuits (ASICs), or the like. The control circuit 1604 may perform signal coding, data processing, power control, input/output processing, or any other functionality that enables the load control device 1600 to perform as described herein.

The control circuit 1604 may store information in and/or retrieve information from the memory 1606. For example, the memory 1606 may maintain a registry of associated control devices and/or control configuration instructions. The memory 1606 may include a non-removable memory and/or a removable memory. The load control circuit 1608 may receive instructions from the control circuit 1604 and may control the electrical load 1616 based on the received instructions. The load control circuit 1608 may send status feedback to the control circuit 1604 regarding the status of the electrical load 1616. The load control circuit 1608 may receive power via the hot connection 1612 and the neutral connection 1614 and may provide an amount of power to the electrical load 1616. The electrical load 1616 may include any type of electrical load.

The control circuit 1604 may be in communication with an actuator 1618 (e.g., one or more buttons) that may be actuated by a user to communicate user selections to the control circuit 1604. For example, the actuator 1618 may be actuated to put the control circuit 1604 in an association mode or discovery mode and may communicate association messages or discovery messages from the load control device 1600.

Figure 17:
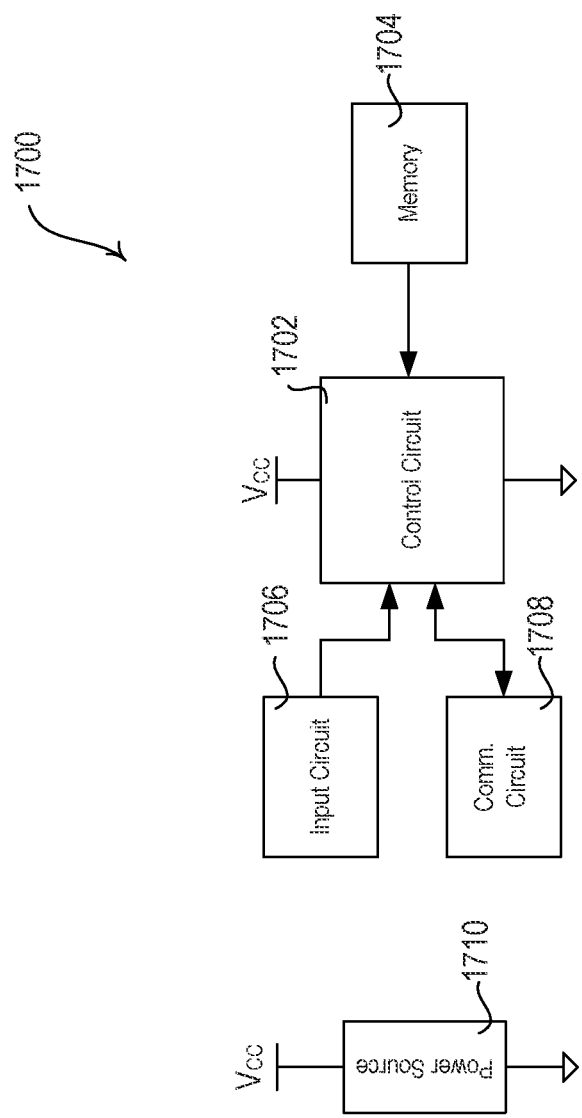
FIG. 17 is a block diagram of an example control-source device.

FIG. 17 is a block diagram illustrating an example control-source device 1700 as described herein. The control-source device 1700 may be a remote control device, an occupancy sensor, a daylight sensor, a window sensor, a temperature sensor, and/or the like. The control-source device 1700 may include a control circuit 1702 for controlling the functionality of the control-source device 1700. The control circuit 1702 may include one or more general purpose processors, special purpose processors, conventional processors, digital signal processors (DSPs), microprocessors, integrated circuits, a programmable logic device (PLD), application specific integrated circuits (ASICs), or the like. The control circuit 1702 may perform signal coding, data processing, power control, input/output processing, or any other functionality that enables the control-source device 1700 to perform as described herein.

The control circuit 1702 may store information in and/or retrieve information from the memory 1704. The memory 1704 may include a non-removable memory and/or a removable memory, as described herein.

The control-source device 1700 may include a communications circuit 1708 for transmitting and/or receiving information. The communications circuit 1708 may transmit and/or receive information via wired and/or wireless communications. The communications circuit 1708 may include a transmitter, an RF transceiver, or other circuit capable of performing wired and/or wireless communications. The communications circuit 1708 may be in communication with control circuit 1702 for transmitting and/or receiving information.

The control circuit 1702 may also be in communication with an input circuit 1706. The input circuit 1706 may include an actuator (e.g., one or more buttons) or a sensor circuit (e.g., an occupancy sensor circuit, a daylight sensor circuit, or a temperature sensor circuit) for receiving input that may be sent to a device for controlling an electrical load. For example, the control-source device may receive input from the input circuit 1706 to put the control circuit 1702 in an association mode and/or communicate association messages from the control-source device. The control circuit 1702 may receive information from the input circuit 1706 (e.g., an indication that a button has been actuated or sensed information). Each of the modules within the control-source device 1700 may be powered by a power source 1710.

Although features and elements are described herein in particular combinations, each feature or element can be used alone or in any combination with the other features and elements. The methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), removable disks, and optical media such as CD-ROM disks, and digital versatile disks (DVDs).

The invention claimed is:

1. A load control discovery device, comprising:
 communication interface circuitry; and
 control circuitry communicatively coupled to the communication interface circuitry, the control circuitry to:
  receive a first input that includes data representative of control device discovery criteria;
  responsive to receipt of the control device discovery criteria, cause a broadcast, via the communication interface circuitry, of a control device discovery message;
  receive, via the communication interface circuitry, a response message from each respective one of a plurality of responding control devices that meet the received control device discovery criteria, the response message including at least data representative of a unique identifier assigned to the respective responding control device; and
  receive a second input that includes data representative of an association between at least two of the plurality of responding control devices; and
  communicate, via the communication interface circuitry, to a system controller communicatively coupled to each of the plurality of responding control devices:
   the received data representative of each of the plurality of responding control devices; and
   data representative of the association between the at least two of the plurality of responding control devices.

2. The load control discovery device of claim 1, the control circuitry to further:
 cause generation of a graphical user interface that includes the data representative of each of the plurality of responding control devices and the data representative of the unique identifier assigned to each respective one of the plurality responding control devices.

3. The load control discovery device of claim 2 wherein to cause the generation of the graphical user interface that includes the data representative of each of the plurality of responding control devices and the data representative of the unique identifier assigned to each respective one of the plurality responding control devices, the control circuitry to further:
 cause the generation of the graphical user interface that includes data representative of each of the plurality of responding control devices, the data representative of the unique identifier assigned to each respective one of the plurality responding control devices, and data representative of the control device discovery criteria from each respective one of the plurality of responding control devices.

4. The load control discovery device of claim 1, wherein to receive the first input that includes the data representative of the control device discovery criteria, the control circuitry to further:
 receive an input that includes the data representative of the control device discovery criteria and data representative of a control device discovery type.

5. The load control discovery device of claim 1, wherein to receive the first input that includes the data representative of the control device discovery criteria, the control circuitry to further:
 receive an input that includes the data representative of a defined strength of the control device discovery message.

6. The load control discovery device of claim 1, wherein to receive the first input that includes the data representative of the control device discovery criteria, the control circuitry to further:
 receive an input that includes the data representative of a defined received signal strength of the control device discovery message at each of a plurality of control devices.

7. The load control discovery device of claim 6, wherein to cause the broadcast of the control device discovery message, the control circuitry to further:
cause a broadcast of a control device discovery message that includes the received data representative of a defined received signal strength of the control device discovery message.

8. The load control discovery device of claim 1:
wherein to broadcast the control device discovery message, the control circuitry to further:
cause a broadcast of a control device discovery message via a first portion of the communication interface circuitry, wherein the first portion of the communication interface circuitry includes a first type of communication interface circuitry that uses a first communication protocol; and
wherein to communicate to the system controller the received data representative of each of the plurality of responding control devices; and the received data representative of the association between the at least two of the plurality of responding control devices, the control circuitry to further:
communicate to the system controller the received data representative of each of the plurality of responding control devices; and the received data representative of the association between the at least two of the plurality of responding control devices via a second portion of the communication interface circuitry, wherein the second portion of the communication interface circuitry includes a second type of communication interface circuitry that uses a second communication protocol different from the first communication protocol.

9. A load control device discovery method, comprising:
receiving, by control circuitry, a first input that includes data representative of control device discovery criteria;
responsive to receipt of the control device discovery criteria, causing by the control circuitry, a broadcast of a control device discovery message via communication interface circuitry communicatively coupled to the control circuitry;
receiving, by the control circuitry via the communication interface circuitry, a response message from each respective one of a plurality of responding control devices that meet the received control device discovery criteria, the response message including at least data representative of a unique identifier assigned to the respective responding control device; and
receiving, by the control circuitry, a second input that includes data representative of an association between at least two of the plurality of responding control devices; and
causing, by the control circuitry, a communication, via the communication interface circuitry, to a system controller communicatively coupled to each of the plurality of responding control devices:
the received data representative of each of the plurality of responding control devices; and
data representative of the association between the at least two of the plurality of responding control devices.

10. The method of claim 9, further comprising:
causing a generation of a graphical user interface that includes the data representative of each of the plurality of responding control devices and the data representative of the unique identifier assigned to each respective one of the plurality responding control devices.

11. The method of claim 10 wherein causing the generation of the graphical user interface that includes data representative of each of the plurality of responding control devices and data representative of the unique identifier assigned to each respective one of the plurality responding control devices, further comprises:
causing, by the control circuitry, generation of a graphical user interface that includes data representative of each of the plurality of responding control devices, the data representative of the unique identifier assigned to each respective one of the plurality responding control devices, and data representative of the control device discovery criteria from each respective one of the plurality of responding control devices.

12. The method of claim 9, wherein receiving the first input that includes the data representative of the control device discovery criteria further comprises:
receiving, by the control circuitry, an input that includes the data representative of the control device discovery criteria and data representative of a control device discovery type.

13. The method of claim 9 wherein receiving the first input that includes the data representative of the control device discovery criteria further comprises:
receiving, by the control circuitry, an input that includes the data representative of a defined strength of the control device discovery message.

14. The method of claim 9 wherein receiving the first input that includes the data representative of the control device discovery criteria further comprises:
receiving, by the control circuitry, an input that includes the data representative of a defined received signal strength of the control device discovery message at each of a plurality of control devices.

15. The method of claim 14 wherein causing the broadcast of the control device discovery message further comprises:
causing, by the control circuitry, a broadcast of a control device discovery message that includes the received data representative of a defined received signal strength of the control device discovery message.

16. The method of claim 9:
wherein causing the broadcast of the control device discovery message further comprises:
causing, by the control circuitry, the broadcast of a control device discovery message via a first portion of the communication interface circuitry, wherein the first portion of the communication interface circuitry includes a first type of communication interface circuitry that uses a first communication protocol; and
wherein causing the communication of the received data representative of each of the plurality of responding control devices and the received data representative of the association between the at least two of the plurality of responding control devices further comprises:
causing, by the control circuitry, the communication to the system controller of the received data representative of each of the plurality of responding control devices; and the received data representative of the association between the at least two of the plurality of responding control devices via a second portion of the communication interface circuitry, wherein the second portion of the communication interface circuitry includes a second type of communication interface circuitry that uses a second communication protocol different from the first communication protocol.

17. A non-transitory, machine-readable, storage device that includes instructions that, when executed by control circuitry in a load control discovery device, cause the control circuitry to:
- receive a first input that includes data representative of control device discovery criteria;
- responsive to receipt of the control device discovery criteria, cause a broadcast of a control device discovery message via communication interface circuitry communicatively coupled to the control circuitry;
- receive, via the communication interface circuitry, a response message from each respective one of a plurality of responding control devices that meet the received control device discovery criteria, the response message including at least data representative of a unique identifier assigned to the respective responding control device;
- receive a second input that includes data representative of an association between at least two of the plurality of responding control devices; and
- cause a communication, via the communication interface circuitry, to a system controller communicatively coupled to each of the plurality of responding control devices:
  - the received data representative of each of the plurality of responding control devices; and
  - data representative of the association between the at least two of the plurality of responding control devices.

18. Non-transitory, machine-readable, storage device of claim 17 wherein the instructions when executed by the control circuitry in the load control discovery device, further cause the control circuitry to:
- cause a generation of a graphical user interface on the load control discovery device, the GUI including the data representative of each of the plurality of responding control devices and the data representative of the unique identifier assigned to each respective one of the plurality responding control devices.

19. The non-transitory, machine-readable, storage device of claim 18 wherein the instructions that cause the control circuitry in the load control discovery device to cause the generation of the graphical user interface that includes data representative of each of the plurality of responding control devices and data representative of the unique identifier assigned to each respective one of the plurality responding control devices, further cause the control circuitry to:
- cause a generation of a GUI that includes data representative of each of the plurality of responding control devices, the data representative of the unique identifier assigned to each respective one of the plurality responding control devices, and data representative of the control device discovery criteria from each respective one of the plurality of responding control devices.

20. The non-transitory, machine-readable, storage device of claim 17, wherein the instructions that cause the control circuitry in the load control discovery device to receive the first input that includes the data representative of the control device discovery criteria further cause the control circuitry to:
- receive an input that includes the data representative of the control device discovery criteria and data representative of a control device discovery type.

21. The non-transitory, machine-readable, storage device of claim 17 wherein the instructions that cause the control circuitry in the load control discovery device to receive the first input that includes the data representative of the control device discovery criteria further cause the control circuitry to:
- receive an input that includes the data representative of a defined strength of the control device discovery message.

22. The non-transitory, machine-readable, storage device of claim 17 wherein the instructions that cause the control circuitry in the load control discovery device to receive the first input that includes the data representative of the control device discovery criteria further comprises:
- receive an input that includes the data representative of a defined received signal strength of the control device discovery message at each of a plurality of control devices.

23. The non-transitory, machine-readable, storage device of claim 22 wherein the instructions that cause the control circuitry in the load control discovery device to cause the broadcast of the control device discovery message further comprises:
- cause the broadcast of the control device discovery message that includes the received data representative of a defined received signal strength of the control device discovery message.

24. The non-transitory, machine-readable, storage device of claim 17:
- wherein the instructions that cause the control circuitry in the load control discovery device to cause causing the broadcast of the control device discovery message further cause the control circuitry to:
  - cause the broadcast of the control device discovery message via a first portion of the communication interface circuitry, wherein the first portion of the communication interface circuitry includes a first type of communication interface circuitry that uses a first communication protocol; and
- wherein the instructions that cause the control circuitry in the load control discovery device to cause the communication of the received data representative of each of the plurality of responding control devices and the received data representative of the association between the at least two of the plurality of responding control devices further comprises:
  - cause the communication to the system controller of the received data representative of each of the plurality of responding control devices; and the received data representative of the association between the at least two of the plurality of responding control devices via a second portion of the communication interface circuitry, wherein the second portion of the communication interface circuitry includes a second type of communication interface circuitry that uses a second communication protocol different from the first communication protocol.

* * * * *